(12) United States Patent
Galitsky

(10) Patent No.: US 11,328,016 B2
(45) Date of Patent: May 10, 2022

(54) CONSTRUCTING IMAGINARY DISCOURSE TREES TO IMPROVE ANSWERING CONVERGENT QUESTIONS

(71) Applicant: Oracle International Corporation, Redwood Shores, CA (US)

(72) Inventor: Boris Galitsky, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 504 days.

(21) Appl. No.: 16/408,224

(22) Filed: May 9, 2019

(65) Prior Publication Data

US 2019/0347297 A1    Nov. 14, 2019

Related U.S. Application Data

(60) Provisional application No. 62/729,335, filed on Sep. 10, 2018, provisional application No. 62/668,963, filed on May 9, 2018.

(51) Int. Cl.
*G06F 16/9032* (2019.01)
*G06F 16/901* (2019.01)
(Continued)

(52) U.S. Cl.
CPC .... *G06F 16/90332* (2019.01); *G06F 16/9027* (2019.01); *G06F 40/289* (2020.01); *G06F 40/35* (2020.01); *G06F 40/49* (2020.01)

(58) Field of Classification Search
CPC .......... G06F 16/90332; G06F 16/9027; G06F 40/35; G06F 40/289; G06F 40/49
See application file for complete search history.

(56) References Cited

U.S. PATENT DOCUMENTS

| 5,495,605 A | 2/1996 | Cadot |
| 6,112,168 A | 8/2000 | Corston et al. |
| (Continued) |

FOREIGN PATENT DOCUMENTS

WO    2015089822    6/2015

OTHER PUBLICATIONS

Galitsky et al., On a Chat Bot Finding Answers with Optimal Rhetoric Representation, Proceedings of Recent Advances in Natural Language Processing, Sep. 2017, p. 253-359 (Year: 2017).*

(Continued)

*Primary Examiner* — Sonia L Gay
(74) *Attorney, Agent, or Firm* — Kilpatrick Townsend & Stockton LLP

(57) ABSTRACT

Systems and methods for improving question-answering recall for complex, multi-sentence, convergent questions. More specifically, an autonomous agent accesses an initial answer that partly answers a question received from a user device. The agent represents the question and the initial answer as discourse trees. From the discourse trees, the agent identifies entities in the question that are not addressed by the answer. The agent forms an additional discourse tree from an additional resource such as a corpus of text. The additional discourse tree rhetorically connects a non-addressed entity with the answer. The agent designates this discourse tree as an imaginary discourse tree. When combined with the initial answer discourse tree, the imaginary discourse tree is used to generate an improved answer relative to existing solutions.

20 Claims, 20 Drawing Sheets

(51) Int. Cl.
*G06F 40/35* (2020.01)
*G06F 40/49* (2020.01)
*G06F 40/289* (2020.01)

(56) References Cited

U.S. PATENT DOCUMENTS

| | | |
|---|---|---|
| 6,181,909 B1 | 1/2001 | Burstein et al. |
| 6,731,307 B1 | 5/2004 | Strubbe et al. |
| 7,152,031 B1 | 12/2006 | Jensen et al. |
| 7,359,860 B1 | 4/2008 | Miller et al. |
| 7,519,529 B1 | 4/2009 | Horvitz |
| 7,551,552 B2 | 6/2009 | Dunagan et al. |
| 7,840,556 B1 | 11/2010 | Dayal et al. |
| 9,037,464 B1 | 5/2015 | Mikolov et al. |
| 9,292,490 B2 | 3/2016 | Kimelfeld et al. |
| 9,449,080 B1 | 9/2016 | Zhang |
| 9,559,993 B2 | 1/2017 | Palakovich et al. |
| 9,582,501 B1 | 2/2017 | Salmon et al. |
| 9,817,721 B1 | 11/2017 | Youngworth |
| 10,175,865 B2 | 1/2019 | Beaver et al. |
| 10,289,974 B1 | 5/2019 | Ouimette |
| 10,545,648 B2 | 1/2020 | Beaver et al. |
| 10,599,885 B2 | 3/2020 | Galitsky |
| 10,679,011 B2 | 6/2020 | Galitsky |
| 10,796,099 B2 | 10/2020 | Galitsky et al. |
| 10,796,102 B2 | 10/2020 | Galitsky |
| 10,817,670 B2 | 10/2020 | Galitsky |
| 10,853,581 B2 | 12/2020 | Galitsky |
| 11,023,684 B1 | 6/2021 | Flor et al. |
| 11,100,144 B2 | 8/2021 | Galitsky |
| 2001/0007987 A1 | 7/2001 | Igata |
| 2001/0053968 A1 | 12/2001 | Galitsky et al. |
| 2002/0040292 A1 | 4/2002 | Marcu |
| 2003/0138758 A1 | 7/2003 | Burstein et al. |
| 2004/0044519 A1 | 3/2004 | Polanyi et al. |
| 2004/0148170 A1 | 7/2004 | Acero et al. |
| 2004/0158452 A1 | 8/2004 | Polanyi et al. |
| 2005/0086592 A1 | 4/2005 | Polanyi et al. |
| 2007/0073533 A1 | 3/2007 | Thione et al. |
| 2007/0136284 A1 | 6/2007 | Cobb et al. |
| 2007/0143098 A1 | 6/2007 | Van Den Berg et al. |
| 2007/0192306 A1 | 8/2007 | Papakonstantinou et al. |
| 2007/0294229 A1 | 12/2007 | Au |
| 2008/0172409 A1 | 7/2008 | Botros et al. |
| 2008/0228467 A1 | 9/2008 | Womack et al. |
| 2009/0089252 A1 | 4/2009 | Galitsky et al. |
| 2009/0100053 A1 | 4/2009 | Boschee et al. |
| 2009/0248399 A1 | 10/2009 | Au |
| 2009/0282019 A1 | 11/2009 | Galitsky et al. |
| 2010/0169359 A1 | 7/2010 | Barrett et al. |
| 2011/0119049 A1 | 5/2011 | Ylonen |
| 2011/0153673 A1 | 6/2011 | Boschee et al. |
| 2012/0041950 A1 | 2/2012 | Koll et al. |
| 2012/0078902 A1 | 3/2012 | Duboue et al. |
| 2013/0046757 A1 | 2/2013 | Salvetti et al. |
| 2013/0151347 A1 | 6/2013 | Baldwin et al. |
| 2013/0204611 A1 | 8/2013 | Tsuchida et al. |
| 2014/0040288 A1 | 2/2014 | Galitsky |
| 2014/0122083 A1 | 5/2014 | Xiaojiang |
| 2014/0136188 A1 | 5/2014 | Wroczynski et al. |
| 2015/0039295 A1 | 2/2015 | Soschen |
| 2015/0046492 A1 | 2/2015 | Balachandran |
| 2015/0051900 A1 | 2/2015 | Kimelfeld et al. |
| 2015/0081277 A1 | 3/2015 | Behi |
| 2015/0134325 A1 | 5/2015 | Skiba et al. |
| 2015/0149461 A1 | 5/2015 | Aguilar Lemarroy et al. |
| 2015/0161512 A1 | 6/2015 | Byron et al. |
| 2016/0034457 A1 | 2/2016 | Bradley et al. |
| 2016/0055240 A1 | 2/2016 | Tur et al. |
| 2016/0085743 A1 | 3/2016 | Haley |
| 2016/0086601 A1 | 3/2016 | Chotimongkol et al. |
| 2016/0099892 A1 | 4/2016 | Palakovich et al. |
| 2016/0232152 A1 | 8/2016 | Mahamood |
| 2016/0245779 A1 | 8/2016 | Khalaj Amineh et al. |
| 2016/0246779 A1 | 8/2016 | Ho et al. |
| 2016/0247068 A1 | 8/2016 | Lin |
| 2016/0283491 A1 | 9/2016 | Lu et al. |
| 2016/0328667 A1 | 11/2016 | Macciola et al. |
| 2017/0032053 A1 | 2/2017 | LeTourneau |
| 2017/0104829 A1 | 4/2017 | Degroat |
| 2017/0116982 A1 | 4/2017 | Gelfenbeyn et al. |
| 2017/0177675 A1 | 6/2017 | Beller et al. |
| 2017/0228368 A1 | 8/2017 | Carter et al. |
| 2017/0277993 A1 | 9/2017 | Beaver et al. |
| 2017/0358295 A1 | 12/2017 | Roux et al. |
| 2018/0052818 A1 | 2/2018 | Bethard et al. |
| 2018/0121062 A1 | 5/2018 | Beaver et al. |
| 2018/0181648 A1 | 6/2018 | Chen |
| 2018/0189385 A1 | 7/2018 | Sun et al. |
| 2018/0260472 A1 | 9/2018 | Kelsey et al. |
| 2018/0314689 A1 | 11/2018 | Wang et al. |
| 2018/0365228 A1 | 12/2018 | Galitsky |
| 2018/0365593 A1 | 12/2018 | Galitsky |
| 2018/0373701 A1 | 12/2018 | McAteer et al. |
| 2019/0005027 A1 | 1/2019 | He et al. |
| 2019/0033957 A1 | 1/2019 | Shionozaki |
| 2019/0057157 A1 | 2/2019 | Mandal et al. |
| 2019/0103111 A1 | 4/2019 | Tiwari et al. |
| 2019/0138190 A1 | 5/2019 | Beaver et al. |
| 2019/0163756 A1 | 5/2019 | Bull et al. |
| 2019/0354544 A1 | 11/2019 | Hertz et al. |
| 2019/0371299 A1* | 12/2019 | Jiang .................. G06N 5/00 |
| 2019/0377605 A1 | 12/2019 | Joseph |
| 2020/0099790 A1 | 3/2020 | Ma et al. |
| 2020/0117858 A1 | 4/2020 | Freeman et al. |
| 2020/0301589 A1 | 9/2020 | Buzzard et al. |
| 2021/0020165 A1 | 1/2021 | Scodary et al. |
| 2021/0027799 A1 | 1/2021 | Scodary et al. |
| 2021/0029248 A1 | 1/2021 | Scodary et al. |

OTHER PUBLICATIONS

Verberne et al., Discourse-based answering of why questions, TAL vol. 47, 21-41 (Year: 2007).*

Sadek et al., A Discourse-Based Approach for Arabic Question Answering, ACM Trans. Asian Low-Resour. Lang. Inf. Process., vol. 16, No. 2, Article 11, Nov. 2016, whole document (Year: 2016).*

Sadek et al., Arabic Rhetorical Relations Extraction for Answering Why and How to Questions, G. Bouma et al. (Eds.): NLDB 2012, LNCS 7337, pp. 385-390 (Year: 2012).*

U.S. Appl. No. 16/240,232, Final Office Action, dated Oct. 21, 2021, 13 pages.

Indian Serial No. IN202047007447, "First Examination Report", dated Sep. 9, 2021, 6 pages.

U.S. Appl. No. JP2019-561757, Office Action, dated Sep. 21, 2021, 3 pages.

U.S. Appl. No. 15/975,683, Notice of Allowance, dated Jun. 12, 2020, 17 pages.

U.S. Appl. No. 15/975,685, Notice of Allowance, dated Jul. 24, 2020, 17 pages.

U.S. Appl. No. 16/010,141, Final Office Action, dated Jul. 30, 2020, 14 pages.

U.S. Appl. No. 16/145,702, Final Office Action, dated May 6, 2020, 19 pages.

U.S. Appl. No. 16/145,702, Notice of Allowance, dated Jul. 1, 2020, 15 pages.

U.S. Appl. No. 16/145,777, Notice of Allowance, dated Jul. 15, 2020, 17 pages.

U.S. Appl. No. 16/260,930, Non-Final Office Action, dated Aug. 12, 2020, 9 pages.

U.S. Appl. No. 16/260,939, Non-Final Office Action, dated May 1, 2020, 10 pages.

U.S. Appl. No. 16/260,939, Notice of Allowance, dated Jun. 12, 2020, 14 pages.

Galitsky et al., "Finding Maximal Common Sub-Parse Thickets for Multi-Sentence Search", IJCAI Workshop on Graphs and Knowledge Representation, IJCAI, 2013, 19 pages.

Hara et al., "Exploring Difficulties in Parsing Imperatives and Questions", Proceedings of the 5th International Joint Conference on Natural Language Processing, Nov. 8-13, 2011, pp. 749-757.

(56) References Cited

OTHER PUBLICATIONS

Kipper et al., "A Large-scale Classification of English Verbs", Kluwer Academic Publishers, Springer Netherland, Dec. 2006, 20 pages.
International Application No. PCT/US2019/015696, International Preliminary Report on Patentability, dated Aug. 13, 2020, 8 pages.
International Application No. PCT/US2019/031580, International Preliminary Report on Patentability, dated Nov. 19, 2020, 8 pages.
U.S. Appl. No. 16/010,123, Non-Final Office Action, dated Feb. 8, 2021, 30 pages.
Mathkour, "A Novel Rhetorical Structure Approach for Classifying Arabic Security Documents", International Journal of Computer Theory and Engineering, vol. 1, No. 3, Aug. 2009, pp. 195-200.
U.S. Appl. No. 16/010,123, Notice of Allowance, dated May 19, 2021, 16 pages.
U.S. Appl. No. 16/240,232, Non-Final Office Action, dated Apr. 9, 2021, 13 pages.
2009 Annual Study: Global Cost of a Data Breach, Ponemon Institute, LLC, PGP, Apr. 2010, 36 pages.
Data Loss Prevention, Trend Micro, Available online at: http://www.trendmicro.co.in/cloud-content/us/pdfs/business/datasheets/ds_data-loss-prevention.pdf, 2010, 2 pages.
Data Loss Prevention & Protection, Symantec, Available online at: http://www.symantec.com/business/theme.jsp?themeid=vontu, Accessed from Internet on Aug. 30, 2018, 6 pages.
Exploring Dialog Management for Bots, Chatbots Magazine, Available online at: https://chatbotsmagazine.com/exploring-dialog-management-for-bots-cbb8665a2fd3, Jul. 11, 2016, 7 pages.
Global Security Report 2010, Trustwave, Available online at: https://www.trustwave.com/Resources/Library/Documents/2010-Trustwave-Global-Security-Report/, 2010, 49 pages.
Ignore, Deny, Downplay: Accounts of Syrians from Douma Have No Place in Western Narrative, Russia Today, Available online at: https://www.rt.com/news/425438-douma-witnesses-gas-attack-syria/, Apr. 28, 2018, pp. 1-8.
Malaysia Airlines Flight 17, Wikipedia, 2016, pp. 1-38.
Koiti, Presentation on Theme: WG2 PWI24617-5 SemAF, Discourse Structure, Berlin HASIDA Koiti AIST, Accessed from Internet on: Oct. 14, 2019, 2 pages.
Shadow Chairman of Investigative Committee, Crime Russia, Available online at: https://crimerussia.com/corruption/tenevoy-direktor-skr/, Aug. 25, 2016, 5 pages.
Start by Selecting a Make, Available Online at: https://web.archive.org/web/20170823095844/https://www.2carpros.com/, Accessed from Internet on: Oct. 14, 2019, 6 pages.
Welcome to Apache Lucene, Apache Lucene 7.5.0 and Apache Solr 7.5.0, Available online at: www.lucene.apache.org, Sep. 24, 2018, 38 pages.
U.S. Appl. No. 15/975,683, Non-Final Office Action dated Oct. 31, 2019, 27 pages.
U.S. Appl. No. 15/975,685, Non-Final Office Action dated Nov. 15, 2019, 23 pages.
U.S. Appl. No. 16/010,091, Non-Final Office Action dated Nov. 18, 2019, 26 pages.
U.S. Appl. No. 16/010,156, Notice of Allowance dated Nov. 7, 2019, 13 pages.
U.S. Appl. No. 16/145,702, Final Office Action dated Sep. 10, 2019, 25 pages.
U.S. Appl. No. 16/145,702, First Action Interview Office Action Summary dated Apr. 29, 2019, 8 pages.
U.S. Appl. No. 16/145,702, First Action Interview Pilot Program Pre-Interview Communication dated Feb. 7, 2019, 6 pages.
Airenti et al., Conversation and Behavior Games in the Pragmatics of Dialogue, Cognitive Science, vol. 17, No. 2, Apr.-Jun. 1993, pp. 197-256.
Allen et al., Analyzing Intention in Utterances, Artificial Intelligence, vol. 15, No. 3, Dec. 1980, pp. 143-178.
Barzilay et al., Modeling Local Coherence: An Entity-Based Approach, Computational Linguistics, vol. 34, No. 1, Mar. 2008, pp. 1-34.
Barzilay et al., Using Lexical Chains for Text Summarization, Proceedings of the ACL/EACL'97 Workshop on Intelligent Scalable Text Summarization, Jul. 1997, pp. 10-17.
Bengio et al., A Neural Probabilistic Language Model, Journal of Machine Learning Research, vol. 3, Feb. 3, 2003, pp. 1137-1155.
Blaylock, Managing Communicative Intentions in Dialogue Using a Collaborative Problem-Solving Model, The University of Rochester, Computer Science Department, Technical Report 774, Apr. 2002, 56 pages.
Blaylock et al., Managing Communicative Intentions with Collaborative Problem Solving, Current and New Directions in Discourse and Dialogue, 2003, pp. 63-84.
Boyer et al., MJRTY-A Fast Majority Vote Algorithm, Chapter 5, Automated Reasoning, 1991, pp. 105-117.
Carlson et al., Discourse Tagging Reference Manual, Available online at: https://www.isi.edu/~marcu/discourse/tagging-ref-manual.pdf, Sep. 11, 2001, 87 pages.
Chali et al., Complex Question Answering: Unsupervised Learning Approaches and Experiments, Journal of Artificial Intelligence Research, vol. 35, May 2009, pp. 1-47.
Chen, Understanding Mental States in Natural Language, Proceedings of the 8th International Conference on Computational Semantics, Jan. 2009, pp. 61-72.
Cohen, Enron Email Dataset, Available online at: https://www.cs.cmu.edu/~enron/, Jul. 10, 2016, 1 page.
Cohen et al., Intention is Choice with Commitment, Artificial Intelligence, vol. 42, Nos. 2-3, Mar. 1990, pp. 213-261.
Cristea et al., Veins Theory: A Model of Global Discourse Cohesion and Coherence, Research Report TR98-Dept. of Computer Science, 1998, pp. 281-285.
Croft et al., Search Engines—Information Retrieval in Practice, Pearson Education, 2010, 542 pages.
Crutzen et al., An Artificially Intelligent Chat Agent That Answers Adolescents' Questions Related to Sex, Drugs, and Alcohol: An Exploratory Study, Journal of Adolescent Health, vol. 48, No. 5, May 2011, pp. 1-6.
De Boni, Using Logical Relevance for Question Answering, Journal of Applied Logic, vol. 5, No. 1, Mar. 2007, pp. 92-103.
De Mori et al., Spoken Language Understanding, IEEE Signal Processing Magazine, vol. 25, No. 3, May 2008, pp. 50-58.
Dijkstra, Programming Considered as a Human Activity, Proc. IFIP Congress, 1965, 7 pages.
Ebrahim, NLP Tutorial Using Python NLTK (Simple Examples), Available online at: https://dzone.com/articles/nlp-tutorial-using-python-nltk-simple-examples, Sep. 24, 2017, pp. 1-10.
Elsner et al., You Talking to Me? A Corpus and Algorithm for Conversation Disentanglement, Proceedings of ACL-08: HLT, Jun. 2008, pp. 834-842.
Endres-Niggemeyer et al., Summarizing Text for Intelligent Communication, Dagstuhl Seminar Report 79, 1995, 36 pages.
Feng et al., A Linear-Time Bottom-Up Discourse Parser with Constraints and Post-Editing, Proceedings of the 52nd Annual Meeting of the Association for Computational Linguistics, Jun. 23-25, 2014, pp. 511-521.
Feng et al., Classifying Arguments by Scheme, Proceedings of the 49th Annual Meeting of the Association for Computational Linguistics, vol. 1, Jun. 19-24, 2011, pp. 987-996.
Feng et al., Distributional Footprints of Deceptive Product Reviews, Proceedings of the Sixth International AAAI Conference on Weblogs and Social Media, The AAAI Press, Jan. 2012, pp. 98-105.
Feng, RST-Style Discourse Parsing and Its Applications in Discourse Analysis, University of Toronto, Jun. 2015, 189 pages.
Feng et al., Syntactic Stylometry for Deception Detection, In ACL 12, Proceedings of the 50th Annual Meeting of the Association for Computational Linguistics, Jul. 8-14, 2012, pp. 171-175.
Ferraiolo et al., Role-Based Access Controls, Proceedings of the 15th NIST-NSA National Computer Security Conference, Oct. 13-16, 1992, pp. 554-563.
Finn et al., A Linear-Time Bottom-Up Discourse Parser with Constraints and Post-Editing, In Proceedings of the 52nd Annual Meeting of the Association for Computational Linguistics, Jun. 23-25, 2014, pp. 511-521.

(56) References Cited

OTHER PUBLICATIONS

Fornaciari et al., Identifying Fake Amazon Reviews as Learning from Crowds, Proceedings of the 14th Conference of the European Chapter of the Association for Computational Linguistics, Apr. 26-30, 2014, pp. 279-287.
Galitsky et al., A Novel Approach for Classifying Customer Complaints Through Graphs Similarities in Argumentative Dialogues, Decision Support Systems, vol. 46, No. 3, Feb. 2009, 28 pages.
Galitsky et al., Concept-Based Learning of Human Behavior for Customer Relationship Management, Information Sciences, vol. 181, No. 10, May 15, 2011, pp. 2016-2035.
Galitsky et al., Improving Text Retrieval Efficiency with Pattern Structures on Parse Thickets, Formal Concept Analysis Meets Information Retrieval, ECIR, 2013, 16 pages.
Galitsky et al., Improving Trust in Automation of Social Promotion, Association for the Advancement of Artificial Intelligence, 2014, pp. 28-35.
Galitsky et al., Inferring the Semantic Properties of Sentences by Mining Syntactic Parse Trees, Data & Knowledge Engineering, vols. 81-82, Nov.-Dec. 2012, 44 pages.
Galitsky et al., Learning Communicative Actions of Conflicting Human Agents, Journal of Experimental & Theoretical Artificial Intelligence, vol. 20, No. 4, Dec. 2008, pp. 277-317.
Galitsky, Learning Noisy Discourse Trees, Computational Linguistics and Intellectual Technologies, Proceedings of the International Conference Dialogue 2017. Available online at: http://www.dialog-21.ru/media/3911/galitskyb.pdf, May 31-Jun. 3, 2017, 14 pages.
Galitsky, Learning Parse Structure of Paragraphs and its Applications in Search, Engineering Applications of Artificial Intelligence, vol. 32, Jun. 2014, pp. 160-184.
Galitsky, Machine Learning of Syntactic Parse Trees for Search and Classification of Text, Engineering Applications of Artificial Intelligence, vol. 26, No. 3, Mar. 2013, pp. 1072-1091.
Galitsky, Matching Parse Thickets for Open Domain Question Answering, Data & Knowledge Engineering, vol. 107, Dec. 9, 2016, pp. 24-50.
Galitsky, Natural Language Question Answering System, Technique of Semantic Headers, Advanced Knowledge International, vol. 2, Apr. 2003, 333 pages.
Galitsky et al., Parse Thicket Representations for Answering Multi-Sentence Search, International Conference on Conceptual Structures, vol. 7735, 2013, pp. 153-172.
Galitsky et al., Rhetoric Map of an Answer to Compound Queries, Proceedings of the 53rd Annual Meeting of the 20 Association for Computational Linguistics and the 7th International Joint Conference of Natural Language Processing, Jul. 26-31, 2015, pp. 681-686.
Galitsky et al., Style and Genre Classification by Means of Deep Textual Parsing, Computational Linguistics and Intellectual Technologies: Proceedings of the International Conference Dialogue 2016, Jun. 2016, pp. 1-45.
Galitsky et al., Text Classification into Abstract Classes Based on Discourse Structure, Proceedings of Recent Advances in Natural Language Processing, Sep. 7-9, 2015, pp. 200-207.
Galitsky et al., Text Integrity Assessment: Sentiment Profile vs Rhetoric Structure, CICLing, Springer International Publishing, Apr. 14-20, 2015, pp. 126-139.
Galitsky, Using Extended Tree Kernels to Recognize Metalanguage in Text, Studies in Computational Intelligence, Feb. 2017, 26 pages.
Grasso, Playing with RST: Two Algorithms for the Automated Manipulation of Discourse Trees, Text, Speech and Dialogue: Second International Workshop, TSD'99 Plzen, Czech Republic, Proceedings, Conference Paper, Jan. 1999, pp. 357-360.
Grefenstette et al., Multi-Step Regression Learning for Compositional Distributional Semantics, Proceedings of the 10th International Conference on Computational Semantics, Mar. 2013, 11 pages.
Grefenstette, Towards a Formal Distributional Semantics: Simulating Logical Calculi with Tensors, University of Oxford, Apr. 2013, 10 pages.
Grosz et al., Attention, Intentions, and the Structure of Discourse, Computational Linguistics, vol. 12, No. 3, Jul.-Sep. 1986, pp. 175-204.
Grosz et al., Centering: A Framework for Modeling the Local Coherence of Discourse, Computational Linguistics, vol. 21, No. 2, 1995, 24 pages.
Grosz et al., Discourse Analysis, in Understanding Spoken Language, Elsevier North-Holland, 1978, pp. 234-268.
Hai et al., Deceptive Review Spam Detection via Exploiting Task Relatedness and Unlabeled Data, Proceedings of the 2016 Conference on Empirical Methods in Natural Language Processing, Nov. 1-5, 2016, pp. 1817-1826.
Hart et al., Text Classification for Data Loss Prevention, Proceedings of the 11th International Conference on Privacy Enhancing Technologies, Hewlett-Packard Development Company, L.P., Jul. 27-29, 2011, 21 pages.
Haussler, Convolution Kernels on Discrete Structures UCSC-CRL-99-10, UCSB Technical Report, Jul. 8, 1999, 38 pages.
Heerschop et al., Polarity Analysis of Texts Using Discourse Structure, In Proceedings of the 20th ACM International Conference on Information and Knowledge Management, CIKM '11, Oct. 2011, 10 pages.
Hernault et al., A Sequential Model for Discourse Segmentation, Proceedings of the 11th International Conference on Computational Linguistics and Intelligent Text Processing, Mar. 21-27, 2010, pp. 315-326.
Hogenboom et al., Using Rhetorical Structure in Sentiment Analysis, Communications of the ACM, vol. 58, No. 7, Jul. 2015, pp. 69-77.
Houngbo et al., An Automated Method to Build a Corpus of Rhetorically-Classified Sentences in Biomedical Texts, Proceedings of the First Workshop on Argumentation Mining, Association for Computational Linguistics, Jun. 26, 2014, pp. 19-23.
Iruskieta et al., A Qualitative Comparison Method for Rhetorical Structures: Identifying Different Discourse Structures in Multilingual Corpora, Lang Resources & Evaluation, vol. 49, No. 2, May 8, 2014, 47 pages.
Jansen et al., Discourse Complements Lexical Semantics for Non-Factoid Answer Reranking, Proceedings of the 52nd Annual Meeting of the Association for Computational Linguistics, Jun. 23-25, 2014, pp. 977-986.
Ji et al., Neural Discourse Structure for Text Categorization, Proceedings of the 55th Annual Meeting of the Association for Computational Linguistics, vol. 1, Jul. 30-Aug. 4, 2017, pp. 996-1005.
Ji et al., Representation Learning for Text-level Discourse Parsing, Association for Computational Linguistics, Available online at: https://www.aclweb.org/anthology/P14-1002, Jun. 2014, pp. 13-24.
John et al., Estimating Continuous Distributions in Bayesian Classifiers, Proceedings of the Eleventh Conference on Uncertainty in Artificial Intelligence, 1995, pp. 338-345.
Johnson et al., Procedural Generation of Linguistics, Dialects, Naming Conventions and Spoken Sentences, Proceedings of 1st International Joint Conference of DiGRA and FDG, 2016, 9 pages.
Jorgensen et al., Challenges of Studying and Processing Dialects in Social Media, Proceedings of the ACL 2015 Workshop on Noisy User-generated Text, Jul. 31, 2015, pp. 9-18.
Joty et al., A Novel Discriminative Framework for Sentence-Level Discourse Analysis, Proceedings of the Joint Conference on Empirical Methods in Natural Language Processing and Computational Natural Language Learning, Jul. 12-14, 2012, pp. 904-915.
Joty et al., CODRA: A Novel Discriminative Framework for Rhetorical Analysis, Computational Linguistics, vol. 41, No. 3, Mar. 18, 2015, pp. 385-435.
Joty et al., Combining Intra- and Multi-Sentential Rhetorical Parsing for Document-Level Discourse Analysis, 51st Annual Meeting of the Association for Computational Linguistics, Aug. 4-9, 2013, pp. 486-496.
Joty et al., Discriminative Reranking of Discourse Parses Using Tree Kernels, Proceedings of the 2014 Conference on Empirical Methods in Natural Language Processing, Oct. 25-29, 2014, pp. 2049-2060.

(56) References Cited

OTHER PUBLICATIONS

Jurafsky et al., Speech and Language Processing: An Introduction to Natural Language Processing, Computational Linguistics, and Speech Recognition, Pearson, Prentice Hall, 2000, pp. 719-761.
Kate et al., Learning to Transform Natural to Formal Languages, Proceedings of the 20th National Conference on Artificial Intelligence, Jul. 2005, pp. 1062-1068.
Kerly et al., Bringing Chatbots into Education: Towards Natural Language Negotiation of Open Learner Models, Knowledge-Based Systems, vol. 20, No. 2, Dec. 2006, 14 pages.
Kipper et al., A Large-Scale Classification of English Verbs, Language Resources and Evaluation, vol. 42, No. 1, Mar. 2008, pp. 21-40.
Kipper et al., VerbNet Overview, Extensions, Mappings and Applications, Proceedings of Human Language Technologies, Annual Conference of the North American Chapter of the Association for Computational Linguistics, Companion, Volume: Tutorial Abstracts, Jun. 2009, pp. 13-14.
Kirschner et al., Linking the Thoughts: Analysis of Argumentation Structures in Scientific Publications, Proceedings of the 2nd Workshop on Argumentation Mining, Jun. 4, 2015, pp. 1-11.
Kohavi, A Study of Cross-Validation and Bootstrap for Accuracy Estimation and Model Selection, International Joint Conference on Artificial Intelligence, Aug. 1995, pp. 1137-1143.
Kong, Are Simple Business Request Letters Really Simple? A Comparison of Chinese and English Business Request Letters, Text-Interdisciplinary Journal for the Study of Discourse, vol. 18, No. 1, 1998, pp. 103-141.
Kong et al., Improve Tree Kernel-Based Event Pronoun Resolution with Competitive Information, Proceedings of the Twenty-Second International Joint Conference on Artificial Intelligence, vol. 3, Jul. 16-22, 2011, pp. 1814-1819.
Kontos et al., Question Answering and Rhetoric Analysis of Biomedical Texts in the Aroma System, National and Kapodistrian University of Athens, Unpublished Manuscript, 2006, 6 pages.
Kovalerchuk et al., Toward Virtual Data Scientist with Visual Means, International Joint Conference on Neural Networks, Feb. 2017, pp. 3073-3080.
Kuyten et al., A Discourse Search Engine based on Rhetorical Structure Theory, Advances in Information Retrieval: 37th European Conference on IR Research, Mar. 2015, 12 pages.
Levinson, Presumptive Meanings: The Theory of Generalized Conversational Implicature, Cambridge, MA: The MIT Press, 2000, 10 pages.
Li et al., Recursive Deep Models for Discourse Parsing, Computer Science Department, Jan. 2014, 10 pages.
Lin et al., Recognizing Implicit Discourse Relations in the Penn Discourse Treebank, Proceedings of the Conference on Empirical Methods in Natural Language Processing, vol. 1, Aug. 6-7, 2009, pp. 343-351.
Lioma et al., Rhetorical Relations for Information Retrieval, SIGIR, Apr. 2012, pp. 931-940.
Litman et al., A Plan Recognition Model for Subdialogues in Conversations, Cognitive Science, vol. 11, No. 2, Apr. 1987, pp. 163-200.
Louis et al., Discourse Indicators for Content Selection in Summaization, SIGDIAL Conference, The Association for Computer Linguistics, Sep. 2010, pp. 147-156.
Lowe et al., On the Evaluation of Dialogue Systems with Next Utterance Classification, Proceedings of the 17th Annual Meeting of the Special Interest Group on Discourse and Dialogue, Available online at: https://arxiv.org/pdf/1605.05414.pdf, Jul. 23, 2016, 6 pages.
Makhalova et al., Pattern Structures for News Clustering, Proceedings of the 4th International Conference on What can FCA do for Artificial Intelligence, vol. 1430, Jan. 2015, pp. 35-42.
Mann et al., Discourse Structures for Text Generation, Proceedings of the 10th International Conference on Computational Linguistics and 22nd annual meeting on Association for Computational Linguistics, Jul. 2-6, 1984, pp. 367-375.
Mann et al., Rhetorical Structure Theory and Text Analysis, University of Southern California, Nov. 1989, 66 pages.
Mann et al., Rhetorical Structure Theory: Towards a Functional Theory of Text Organization, Text-Interdisciplinary Journal for the Study of Discourse, vol. 8, No. 3, Jan. 1988, pp. 243-281.
Marcu et al., An Unsupervised Approach to Recognizing Discourse Relations, Proceedings of the 40th Annual Meeting of the Association for Computational Linguistics (ACL), 2002, 8 pages.
Marir and Haouam, "Rhetorical structure theory for content-based indexing and retrieval of Web documents," ITRE 2004. 2nd International Conference Information Technology: Research and Education, 2004, pp. 160-164.
Mercier et al., Why Do Humans Reason? Arguments for an Argumentative Theory, Behavioral and Brain Sciences, vol. 34, No. 2, Apr. 2011, pp. 57-111.
Mikolov et al., Distributed Representations of Phrases and Their Compositionality, Proceedings of the 26th International Conference on Neural Information Processing Systems, vol. 2, Dec. 5-10, 2013, pp. 1-9.
Mitchell et al., Composition in Distributional Models of Semantics, Cognitive Science, vol. 34, No. 8, Mar. 25, 2010, pp. 1388-1429.
Mitocariu et al., Comparing Discourse Tree Structures, Computational Linguistics and Intelligent Text Processing: 14th International Conference, vol. 7816, Mar. 24-30, 2013, 11 pages.
Mochales et al., Argumentation Mining, Artificial Intelligence and Law, vol. 19, No. 1, Mar. 2011, pp. 1-22.
Morato, et al., Experiments in discourse analysis impact on information classification and retrieval algorithms. Inf. Process. Manage., 39:825-851, Nov. 2003.
Mukherjee et al., Fake Review Detection: Classification and Analysis of Real and Pseudo Reviews, Technical Report, Department of Computer Science, 2013, 11 pages.
Mukherjee et al., What Yelp Fake Review Filter Might Be Doing?, Proceedings of the Seventh International AAAI Conference on Weblogs and Social Media, Jan. 2013, pp. 409-418.
Nguyen et al., A Neural Local Coherence Model, Proceedings of the 55th Annual Meeting of the Association for Computational Linguistics, vol. 1, Jul. 2017, pp. 1320-1330.
Ott et al., Finding Deceptive Opinion Spam by Any Stretch of the Imagination, Proceedings of the 49th Annual Meeting of the Association for Computational Linguistics, vol. 1, Jun. 19-24, 2011, pp. 309-319.
Ott et al., Negative Deceptive Opinion Spam, Proceedings of the Conference of the North American Chapter of the Association for Computational Linguistics, Jun. 9-14, 2013, pp. 497-501.
International Application No. PCT/US2018/031890, International Preliminary Report on Patentability dated Nov. 21, 2019, 9 pages.
International Application No. PCT/US2018/053392, International Search Report and Written Opinion dated Dec. 17, 2018, 11 pages.
International Application No. PCT/US2019/015696, International Search Report and Written Opinion dated Apr. 23, 2019, 12 pages.
International Application No. PCT/US2019/031580, International Search Report and Written Opinion dated Jul. 5, 2019, 12 pages.
Peldszus et al., From Argument Diagrams to Argumentation Mining in Texts: A Survey, International Journal of Cognitive Informatics and Natural Intelligence, vol. 7, No. 1, Jan. 2013, pp. 1-31.
Pelsmaekers et al., Rhetorical Relations and Subordination in L2 Writing, Linguistic Choice Across Genres: Variation in Spoken and Written English, 1998, pp. 191-213.
Pendyala et al., Towards a Truthful World Wide Web from a Humanitarian Perspective, IEEE 2015 Global Humanitarian Technology Conference, Oct. 8-11, 2015, 7 pages.
Poesio et al., Centering: A Parametric Theory and Its Instantiations, Computational Linguistics, vol. 30, No. 3, Sep. 2004, pp. 309-363.
Ponti, Machine Learning Techniques Applied to Dependency Parsing, Available online at: https://vision.unipv.it/AI/AIRG/MachineLearningTechniquesAppliedToDependencyParsingRevised.pdf, Oct. 2015, 45 pages.
Popescu et al., Logic-Based Rhetorical Structuring for Natural Language Generation in Human-Computer Dialogue, Proceedings of the 10th International Conference on Text, Speech and Dialogue, Sep. 3-7, 2007, pp. 309-317.

(56) References Cited

OTHER PUBLICATIONS

Popescu-Belis, Dialogue Acts: One or More Dimensions?, ISSCO Working Paper No. 62, University of Geneva, Nov. 2005, 46 pages.

Radev, A Common Theory of Information Fusion from Multiple Text Sources Step One: Cross-document Structure, Proceedings of the 1st SIGDial Workshop on Discourse and Dialogue, vol. 10, Oct. 7-8, 2000, pp. 74-83.

Radev et al., Centroid-Based Summarization of Multiple Documents: Sentence Extraction, Utility-Based Evaluation, 60 and User Studies, Proceedings of the NAACL-ANLP Workshop on Automatic Summarization, vol. 4, 2000, 10 pages.

Rajpurkar et al., SQuAD: 100,000+ Questions for Machine Comprehension of Text, Proceedings of the Conference on Empirical Methods in Natural Language Processing, Available online at: https://doi.org/10.18653/v1/D16-1264, Oct. 11, 2016, pp. 2383-2392.

Rayana et al., Collective Opinion Spam Detection: Bridging Review Networks and Metadata, Proceedings of the 21st ACM SIGKDD International Conference on Knowledge Discovery and Data Mining, Aug. 11-14, 2015, 10 pages.

Recasens et al., The Life and Death of Discourse Entities: Identifying Singleton Mentions, Proceedings of NAACL-HLT, Jun. 9-14, 2013, pp. 627-633.

Reed et al., Language Resources for Studying Argument, Proceedings of the 6th Conference on Language Resources and Evaluation, LREC2008, ELRA, 2010, pp. 2613-2618.

Reichman, Getting Computers to Talk Like You and Me, Discourse Context, Focus and Semantics (An ATN Model), MIT Press, Jul. 1985, pp. 35-49.

Rose et al., Discourse Processing of Dialogues with Multiple Threads, In Proceedings of the 33rd Annual Meeting of the Association for Computational Linguistics, Jun. 26-30, 1995, pp. 31-38.

Salton et al., On the Specification of Term Values in Automatic Indexing, Journal of Documentation, vol. 29, No. 4, Apr. 1973, pp. 351-372.

Salton et al., Term Weighting Approaches in Automatic Text Retrieval, Information Processing & Management, vol. 24, No. 5, Nov. 1987, 22 pages.

Santhosh et al., Discourse Based Advancement on Question Answering System, International Journal on Soft Computing, Artificial Intelligence and Applications (IJSCAI), vol. 1, No. 2, Oct. 2012, 12 pages.

Scholman et al., Examples and Specifications That Prove a Point: Identifying Elaborative and Argumentative Discourse Relations, Dialogue & Discourse, vol. 8, No. 2, Jul. 2017, pp. 56-83.

Searle, Speech Acts: An Essay in the Philosophy of Language, Cambridge University Press, Jan. 1969, pp. 22-53.

Seo et al., Online Community Search Using Thread Structure, CIKM '09 Proceedings of the 18th ACM conference on Information and knowledge Management, 2009, 4 pages.

Serban et al., A Survey of Available Corpora for Building Data-Driven Dialogue Systems, Available online at: https://arxiv.org/pdf/1512.05742.pdf, Mar. 21, 2017, 56 pages.

Sjoera, The Linguistics Behind Chat Bots, iCapps, Available online at: http://www.icapps.com/the-linguistics-behind-chatbots/, Feb. 22, 2017, 9 pages.

Socher et al., Learning Continuous Phrase Representations and Syntactic Parsing with Recursive Neural Networks, Proceedings of the NIPS Deep Learning and Unsupervised Feature Learning Workshop, Jan. 2010, 9 pages.

Somasundaran et al., Supervised and Unsupervised Methods in Employing Discourse Relations for Improving Opinion Polarity Classification, Proceedings of the 2009 Conference on Empirical Methods in Natural Language Processing, In EMNLP, ACL, Aug. 2009, pp. 170-179.

Soricut et al., Sentence Level Discourse Parsing using Syntactic and Lexical Information, Proceedings of HLT-NAACL, Available Online at: https://www.aclweb.org/anthology/J02-4002, May-Jun. 2003, pp. 149-156.

Sperber et al., Relevance: Communication and Cognition, Blackwell, Oxford and Harvard University Press, Cambridge, MA, 1986, 331 pages.

Sun et al., Discourse Processing for Context Question Answering Based on Linguistic Knowledge, Knowledge-Based System, vol. 20, Aug. 2007, pp. 1-23.

Sun et al., Exploiting Product Related Review Features for Fake Review Detection, Mathematical Problems in Engineering, vol. 2016, Article ID 4935792, Jul. 4, 2016, 7 pages.

Sun et al., Exploring Syntactic Structural Features for Sub-Tree Alignment Using Bilingual Tree Kernels, Proceedings of the 48th Annual Meeting of the Association for Computational Linguistics, Jul. 2010, pp. 306-315.

Surdeanu et al., Two Practical Rhetorical Structure Theory Parsers, Proceedings of the Conference of the North American Chapter of the Association for Computational Linguistics-Human Language Technologies, Jun. 5, 2015, pp. 1-5.

Suwandaratna and Perera, Discourse Marker based Topic Identification and Search Results Refining, In Information and Automation for Sustainability (ICIAFs), 2010 5th International Conference on, pp. 119-125, 2010.

Tai et al., Improved Semantic Representations from Tree-Structured Long Short-Term Memory Networks, Available Online at: https://arxiv.org/pdf/1503.00075.pdf, May 30, 2015, pp. 1-11.

Teufel et al., Summarizing Scientific Articles: Experiments with Relevance and Rhetorical Status, Computational Linguistics, vol. 28, No. 4, Dec. 2002, pp. 409-445.

Traum et al., Conversation Acts in Task-Oriented Spoken Dialogue, University of Rochester Computer Science, Computational Intelligence, vol. 8, No. 3, Aug. 1992, 31 pages.

Traum et al., Discourse Obligations in Dialogue Processing, Proceedings of the 32nd Annual Meeting on Association for Computational Linguistics, Jun. 27-30, 1994, pp. 1-8.

Traum, Rhetorical Relations, Action and Intentionality in Conversation, Proceedings ACL SIG Workshop on Intentionality and Structure in Discourse Relations, Jun. 1993, pp. 132-135.

Trstenjak et al., KNN with TF-IDF Based Framework for Text Categorization, Procedia Engineering, vol. 69, 24th DAAAM International Symposium on Intelligent Manufacturing and Automation, 2014, pp. 1356-1364.

Tsui, English Conversation. Describing English Language, Oxford University Press, 1994, 37 pages.

Uliyar, A Primer: Oracle Intelligent Bots, Powered by Artificial Intelligence, White Paper, Sep. 2017, 28 pages.

Van Der Wees et al., Five Shades of Noise: Analyzing Machine Translation Errors in User-Generated Text, Proceedings of the ACL 2015 Workshop on Noisy User-generated Text, Jul. 31, 2015, pp. 28-37.

Vapnik, The Nature of Statistical Learning Theory, Springer Science, 1995, 201 pages.

Vorontsov et al., Additive Regularization of Topic Models, Machine Learning, vol. 101, 2015, 21 pages.

Walia et al., Semantic Features for Automated Answer Scoring, International Journal if Advance Research in Science and Engineering, vol. 6, No. 10, Oct. 2017, 6 pages.

Walker et al., Quantitative and Qualitative Evaluation of Darpa Communicator Spoken Dialogue Systems, Proceedings of the 39th Annual Meeting of the Association for Computational Linguistics, Jul. 6-11, 2001, pp. 515-522.

Wang et al., A Simple and Generic Belief Tracking Mechanism for the Dialog State Tracking Challenge: On the Believability of Observed Information, Proceedings of the SIGDIAL 2013 Conference, Aug. 2013, pp. 423-432.

Wang et al., An Information Retrieval Approach Based on Discourse Type, Proceedings of the 11th International Conference on Applications of Natural Language to Information Systems, May 31-Jun. 2, 2006, pp. 197-202.

Wang et al., Kernel Based Discourse Relation Recognition with Temporal Ordering Information, Proceedings of the 48th Annual Meeting of the Association for Computational Linguistics, Jul. 11-16, 2010, pp. 710-719.

(56) References Cited

OTHER PUBLICATIONS

Wang et al., Predicting Thread Discourse Structure over Technical Web Forums, Proceedings of the 2011 Conference on Empirical Methods in Natural Language Processing, Jul. 2011, pp. 13-25.
Wang et al., Using Learning Analytics to Understand the Design of an Intelligent Language Tutor-Chatbot Lucy, International Journal of Advanced Computer Science and Applications, vol. 4, No. 11, Nov. 2013, pp. 124-131.
Wolf et al., Representing Discourse Coherence: A Corpus-Based Study, Computational Linguistics, vol. 31, No. 2, Jun. 2005, pp. 134-140.
Wu et al., Enhancing Text Representation for Classification Tasks with Semantic Graph Structures, International Journal of Innovative Computing, Information and Control, vol. 7, No. 5 (B), May 2011, pp. 2689-2698.
Wuchner et al., Data Loss Prevention Based on Data-Driven Usage Control, Proceedings of the IEEE 23rd International Symposium on Software Reliability Engineering, Nov. 27-30, 2012, pp. 151-160.
Yao et al., Online Deception Detection Refueled by Real World Data Collection, Proceedings of Recent Advances in Natural Language Processing, Jul. 28, 2017, 10 pages.
Yessenalina et al., Compositional Matrix-Space Models for Sentiment Analysis, Proceedings of the 2011 Conference on Empirical Methods in Natural Language Processing, Jul. 27-31, 2011, pp. 172-182.
Young et al., POMDP-Based Statistical Spoken Dialogue Systems: A Review, Proceedings of the IEEE, vol. 101, No. 5, May 2013, pp. 1160-1179.
Zanzotto et al., Estimating Linear Models for Compositional Distributional Semantics, Proceedings of the 23rd International Conference on Computational Linguistics (COLING 2010), Aug. 23-27, 2010, pp. 1263-1271.
Zeilenga, Lightweight Directory Access Protocol (LDAP) Read Entry Controls, Standards Track, Network Working Group, IETF, RFC 4527, Jun. 2006, 8 pages.
Zhao et al., Facilitating Discourse Analysis with Interactive Visualization, IEEE Transactions on Visualization and Computer Graphics, vol. 18, No. 12, Dec. 2012, pp. 2639-2648.
Zhao et al., Joint Syntacto-Discourse Parsing and the Syntacto-Discourse Treebank, Oregon State University, Available online at: https://arxiv.org/pdf/1708.08484.pdf, Aug. 28, 2017, pp. 2117-2123.
U.S. Appl. No. 15/975,683, "Non-Final Office Action", dated Mar. 19, 2020, 16 pages.
U.S. Appl. No. 15/975,685, "Non-Final Office Action", dated Apr. 1, 2020, 23 pages.
U.S. Appl. No. 16/010,091, "Notice of Allowance", dated Mar. 19, 2020, 13 pages.
U.S. Appl. No. 16/010,141, "Non-Final Office Action", dated Feb. 24, 2020, 12 pages.
U.S. Appl. No. 16/010,156, "Notice of Allowance", dated Feb. 6, 2020, 13 pages.
U.S. Appl. No. 16/145,702, "Non-Final Office Action", dated Feb. 5, 2020, 30 pages.
U.S. Appl. No. 16/145,777, "Non-Final Office Action", dated Apr. 3, 2020, 18 pages.
Artooras et al., "Stanford NLP-VP vs NP", Stack Overflow Website, Available online at: https://stackoverflow.com/questions/35872324/stanford-nlp-vp-vs-np/35887762, Mar. 8-9, 2016, 2 pages.
Galitsky et al., "Finding Maximal Common Sub-Parse Thickets for Multi-Sentence Search", Graph Structures for Knowledge Representation and Reasoning, 2014, 19 pages.
Galitsky et al., "Text Classification Based on Deep Textual Parsing", Available Online at: http://ceur-ws.org/Vol-1886/paper_8.pdf, 2011, pp. 1-9.
Johnson et al., "The FrameNet Tagset for Frame-Semantic and Syntactic Coding of Predicate-Argument Structure", Proceedings of the 1st North American Chapter of the Association for Computational Linguistics Conference, Apr. 2000, pp. 56-62.
Kittredge et al., "An Advanced English Grammar with Exercises", The Athenaeum Press, 1913, 266 pages.
International Application No. PCT/US2018/053392, "International Preliminary Report on Patentability", dated Apr. 9, 2020, 7 pages.
U.S. Appl. No. 16/240,232 , Non-Final Office Action, dated Jan. 4, 2022, 15 pages.
U.S. Appl. No. 16/736,517 , Non-Final Office Action, dated Dec. 8, 2021, 17 pages.
U.S. Appl. No. 16/995,302 , Notice of Allowance, dated Jan. 7, 2022, 11 pages.
EP Application No. EP18727946.8 , Office Action, dated Dec. 15, 2021, 7 pages.
U.S. Appl. No. 16/902,015, First Action Interview Pilot Program Pre-Interview Communication dated Jan. 21, 2022, 8 pages.
U.S. Appl. No. 16/902,015, First Action Interview Office Action Summary dated Mar. 11, 2022, 5 pages.
U.S. Appl. No. 16/736,517 , Notice of Allowance, dated Feb. 10, 2022, 11 pages.
U.S. Appl. No. 16/789,849 , Non-Final Office Action, dated Feb. 17, 2022, 23 pages.
U.S. Appl. No. 16/822,563 , Notice of Allowance, dated Mar. 2, 2022, 16 pages.
Indian IN201947044096 , "First Examination Report", dated Jan. 13, 2022, 5 pages.

* cited by examiner

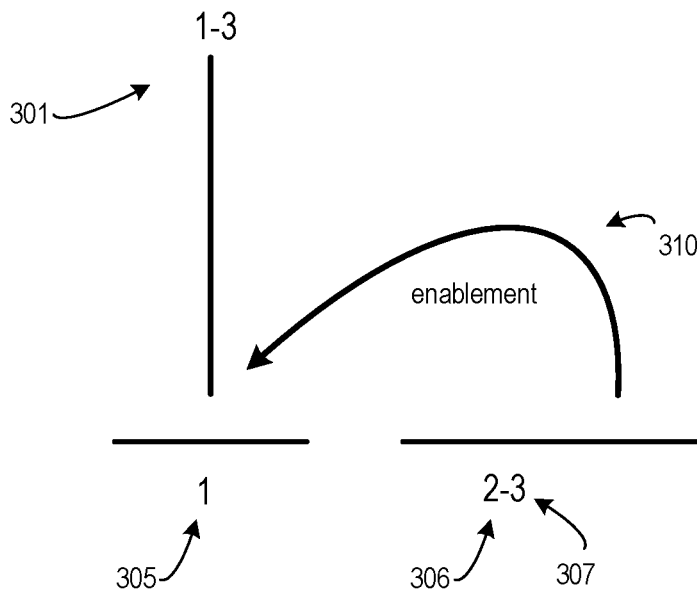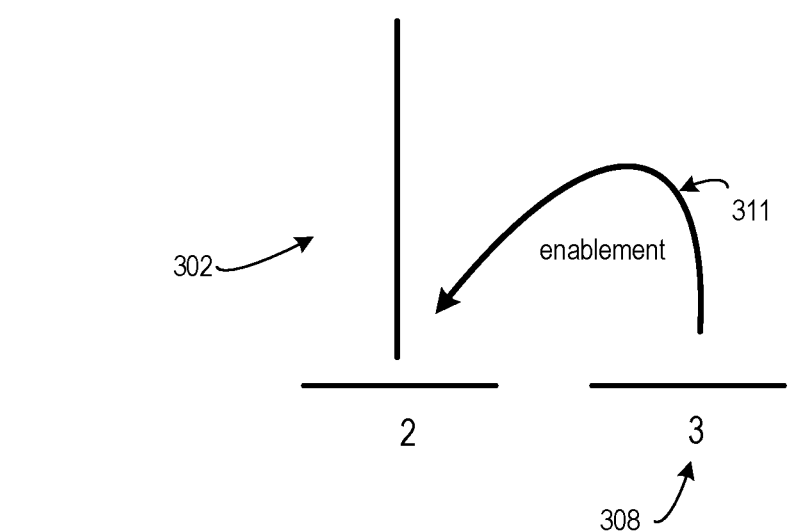
FIG. 3

[Elaboration][N][S]
　{Elaboration][N][S]
　　{Attribution][S][N]
　　　602 — Teixon Corp. said
　　{Joint][N][N]
　　　603 — "its vice president for manufacturing resigned"
　　　604 — "and its Houston work force has been trimmed by 40 people, or about 15%,"))
　{Attribution][S][N]
　　"The maker of hand-held computers and computer systems said"
　{Enablement][N][S]
　　"the personnel changes were needed"
　　"to improve the efficiency of its manufacturing operation."))
{Attribution][S][N]
　"The company said"
{Elaboration][N][S]
　"I hasn't named a successor to Ronald Bufton, the vice president"
　{Attribution][S][N]
　　"who resigned,"
　　"its Houston work force now totals 290."))

CONSTRUCTING IMAGINARY DISCOURSE TREES TO IMPROVE ANSWERING CONVERGENT QUESTIONS

CROSS-REFERENCES TO RELATED APPLICATIONS

This application claims the benefit of U.S. Provisional Application No. 62/729,335, filed Sep. 10, 2018, and U.S. Provisional Application No. 62/668,963, filed May 9, 2018, both of which are incorporated by reference in their entirety.

BACKGROUND

Linguistics is the scientific study of language. One aspect of linguistics is the application of computer science to human natural languages such as English. Due to the greatly increased speed of processors and capacity of memory, computer applications of linguistics are on the rise. For example, computer-enabled analysis of language discourse facilitates numerous applications such as automated agents that can answer questions from users. The use of autonomous agents, or "chatbots," to answer questions, facilitate discussion, manage dialogues, and provide social promotion is increasingly popular.

Autonomous agents can service queries received from user devices by generating answers based on information found with a particular resource such as a database or by querying a search engine. But sometimes, a single resource or search engine result does not fully address a complex user query or a convergent question. Convergent questions are questions that require an answer with a high degree of accuracy.

Accordingly, existing systems are unable to form a complete and accurate answer to a question when the answer is provided in multiple resources. Hence, new solutions are needed.

BRIEF SUMMARY

Aspects described herein use imaginary discourse trees to improve question-answering recall for complex, multi-sentence, convergent questions. More specifically, an improved autonomous agent accesses an initial answer for a question received from a user device. The initial answer addresses the question in part, but not completely. The agent represents the question and the initial answer as discourse trees and identifies the entities in the question that are not addressed in the answer. The agent accesses additional resources such as a corpus of text and determines an answer that rhetorically connects the missing entity and another entity in the answer. The agent selects this additional resource, thereby forming an imaginary discourse tree, that when combined with the discourse tree of the answer, can be used to generate an improved answer over existing solutions.

In an aspect, a method includes constructing, using a computing device and from a question, a question discourse tree including a question entity. The question discourse tree represents rhetorical relationships between elementary discourse units of the question. The method further includes accessing, using the computing device and from a corpus of text, an initial answer. The method further includes constructing, using the computing device, from the initial answer, an answer discourse tree including an answer entity. The answer discourse tree represents rhetorical relationships between elementary discourse units of the initial answer. The method further includes determining, using the computing device, that a score indicating a relevance of the answer entity to the question entity is below a threshold. The method further includes generating an imaginary discourse tree. Generating the imaginary discourse tree includes creating, from the corpus of text, an additional discourse tree. Generating the imaginary discourse tree includes determining that the additional discourse tree includes a rhetorical relation that connects the question entity with the answer entity. Generating the imaginary discourse tree includes extracting a sub-tree of the additional discourse tree including the question entity, the answer entity, and the rhetorical relation, thereby generating an imaginary discourse tree. Generating the imaginary discourse tree includes outputting an answer represented by a combination of the answer discourse tree and the imaginary discourse tree.

In an example, accessing the initial answer includes determining an answer relevance score for a portion of text and, responsive to determining that the answer relevance score is greater than a threshold, selecting the portion of text as the initial answer.

In an example, the imaginary discourse tree includes a node representing the rhetorical relation. The method further includes integrating the imaginary discourse tree into the answer discourse tree by connecting the node to the answer entity.

In an example, creating the additional discourse tree includes calculating, for each of additional discourse trees, a score that indicates a number of question entities that include a mapping to one or more answer entities in the respective additional discourse tree. Creating the additional discourse tree includes selecting, from the additional discourse trees, an additional discourse tree with a highest score.

In an example, creating the additional discourse tree includes calculating, for each of additional discourse trees, a score by applying a trained classification model to one or more of (a) the question discourse tree and (b) the respective additional answer discourse tree; and selecting, from the additional discourse trees, an additional discourse tree with a highest score.

In an example, the question includes keywords, and accessing the initial answer includes obtaining answers based on a search query including the keywords by performing a search of electronic documents. Accessing the initial answer includes determining, for each of the answers, an answer score indicating a level of match between the question and the respective answer. Accessing the initial answer includes selecting, from the answers, an answer having a highest score as the initial answer.

In an example, calculating the score includes applying a trained classification model to one or more of (a) the question discourse tree and (b) the answer discourse tree; and receiving the score from the classification model.

In an example, constructing a discourse tree includes accessing a sentence including fragments. At least one fragment includes a verb and words, each word including a role of the words within the fragment. Each fragment is an elementary discourse unit. Constructing a discourse tree further includes generating a discourse tree that represents rhetorical relationships between the fragments. The discourse tree includes nodes, each nonterminal node representing a rhetorical relationship between two of the fragments, each terminal node of the nodes of the discourse tree is associated with one of the fragments.

In an example, the method further includes determining, from the question discourse tree, a question communicative discourse tree including a question root node. A communicative discourse tree is a discourse tree that includes communicative actions. The generating further includes determining, from the an imaginary discourse tree, an answer communicative discourse tree. The answer communicative discourse tree includes an answer root node. The generating includes merging the communicative discourse trees by identifying that the question root node and the answer root node are identical. The generating includes computing a level of complementarity between the question communicative discourse tree and the answer communicative discourse tree by applying a predictive model to the merged communicative discourse tree. The generating includes responsive to determining that the level of complementarity is above a threshold, outputting a final answer corresponding to the imaginary discourse tree.

In an example, a discourse tree represents rhetorical relationships between fragments of text. The discourse tree includes nodes. Each nonterminal node representing a rhetorical relationship between two of the fragments and each terminal node of the nodes of the discourse tree is associated with one of the fragments. Constructing a communicative discourse tree includes matching each fragment that has a verb to a verb signature. The matching includes accessing verb signatures. The verb signature includes the verb of the fragment and a sequence of thematic roles. The thematic roles describe the relationship between the verb and related words. The matching further includes determining, for each verb signature of the verb signatures, thematic roles of the respective signature that match a role of a word in the fragment. The matching further includes selecting a particular verb signature from the verb signatures based on the particular verb signature, including a highest number of matches. The matching further includes associating the particular verb signature with the fragment.

In an example, a method includes constructing, for a question, a question discourse tree including question entities. The method further includes constructing, from an initial answer, an answer discourse tree including answer entities. The method further includes establishing, between a first question entity of the question entities and an answer entity of the answer entities, a mapping that establishes a relevance of the answer entity to the first question entity. The method further includes responsive to determining that a second question entity of the question entities is not addressed by any of the answer entities, generating an imaginary discourse tree by combining an additional discourse tree corresponding to an additional answer with the answer discourse tree. The method further includes determining, from the question discourse tree, a question communicative discourse tree. The method further includes determining, from the an imaginary discourse tree, an answer communicative discourse tree. The method further includes computing a level of complementarity between the question communicative discourse tree and the answer communicative discourse tree by applying a predictive model, the question communicative discourse tree, and the answer communicative discourse tree. The method further includes responsive to determining that the level of complementarity is above a threshold, outputting a final answer corresponding to the imaginary discourse tree.

The above methods can be implanted as systems including one or processing devices and/or non-transitory computer-readable medium on which program instructions can be stored that can cause one or more processors to perform the operations described with respect to the methods above.

BRIEF DESCRIPTION OF THE DRAWINGS

Illustrative aspects of the present invention are described in detail below with reference to the following drawing figures.

FIG. 3 depicts a further example of a discourse tree in accordance with an aspect.

FIG. 6 depicts an exemplary indented text encoding of the representation in FIG. 5 in accordance with an aspect.

DETAILED DESCRIPTION

Figure 1:
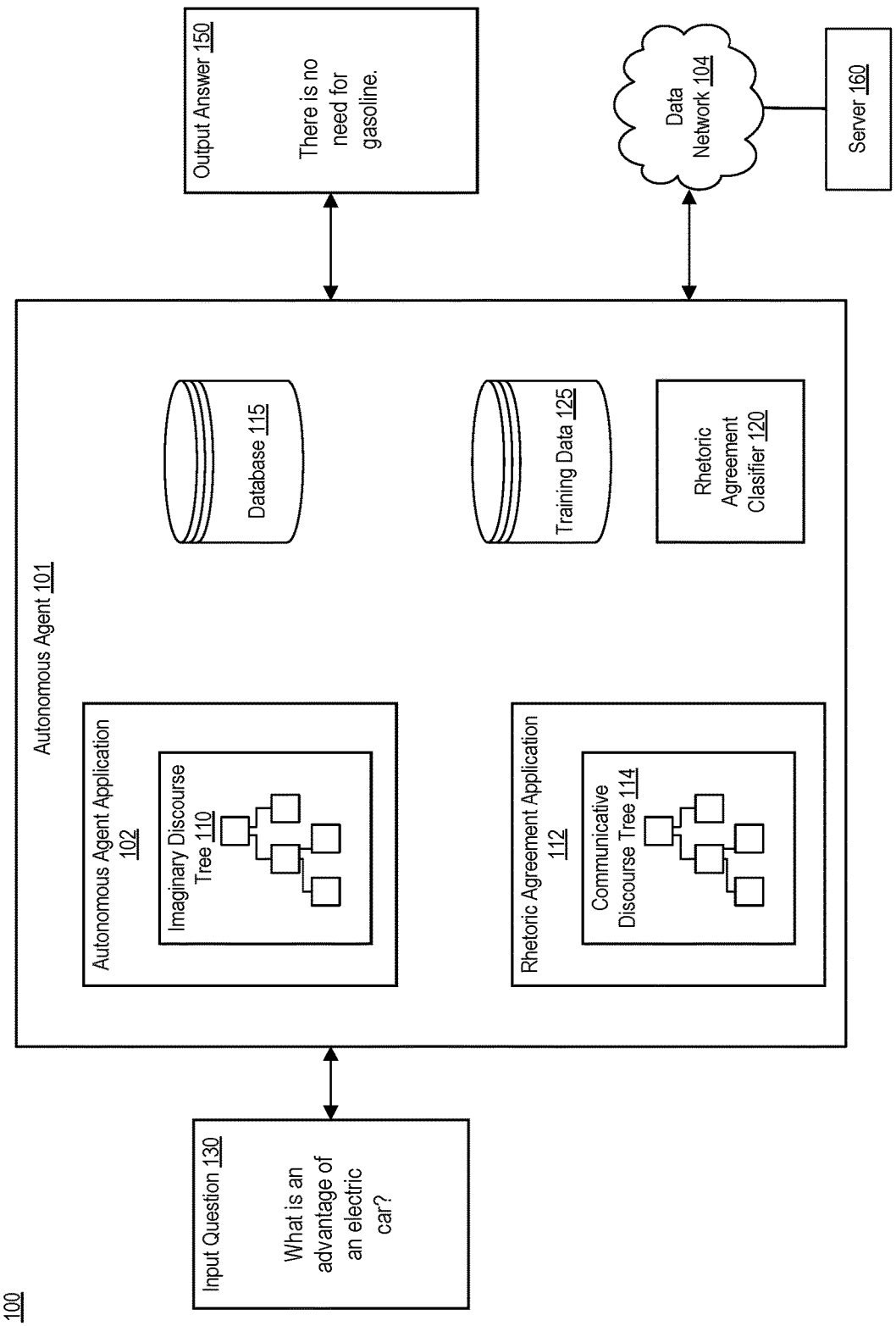
FIG. 1 shows an exemplary rhetoric classification environment, in accordance with an aspect.

As discussed above, existing systems for autonomous agents suffer from deficiencies. For example, such systems are unable to answer complex, multi-sentence, or convergent queries. These systems may also rely on ontologies, or relationships between different concepts in a domain, which are difficult and expensive to build. Further, some existing solutions employ knowledge graph-based approaches, which can limit expressiveness and coverage.

In contrast, aspects described herein are able to answer complex user queries by employing domain-independent discourse analysis. Aspects described herein use imaginary discourse trees to verify and, in some cases, complete rhetorical links between a question and an answer, hereby improving question-answering recall for complex, multi-sentence, convergent questions. An imaginary discourse tree is a discourse tree that represents a combination of an initial answer to a question supplemented with additional answers. In this manner, an imaginary discourse tree represents a complete answer to a user query.

For a given answer to be relevant to a given question, the entities of the answer should cover the entities of the question. An "entity" has an independent and distinct existence. Examples includes objects, places, and persons. An entity can also be a subject or topic such as "electric cars," "brakes," or "France."

But in some cases, one or more entities in a question are unaddressed in an initial answer. For example, a user could ask about his car's "engine," but the initial answer does not discuss the "engine," at all. In other cases, more specific entities occur in the answer instead, but their connection to the question entities is not immediately apparent. Continuing the previous example, an initial answer might contain an entity "spark plug" or "transmission" without connecting these entities to "engine." In other cases, some answer entities are might not be explicitly mentioned in the question, but rather be assumed in the question. To provide a complete answer, missing entities should be accounted for and when appropriate, explained.

To bridge this gap, certain aspects of the present disclosure use imaginary discourse trees. For example, an autonomous agent application can identify answers that provide links between entities present in the question that are missing in the answer. The application combines relevant fragments of the imaginary answer discourse trees into an imaginary discourse tree that represents a complete answer to the question. The imaginary discourse tree thus provides a rhetorical link that can be used to verify the answer and in some cases, augment the answer. The application can then present the complete answer to a user device.

By creating an imaginary discourse tree that is augmented with tree fragments obtained from documents mined on demand from different sources, disclosed solutions remove the need for an ontology. For example, considering a domain of automobiles, an ontology might represent relationships between brakes and wheels or transmission and engine. In contrast, aspects obtain a canonical discourse representation of an answer that is independent of a thought structure of a given author.

In another example, disclosed solutions can use communicative discourse trees to verify rhetorical agreement between two portions of text. For example, the a rhetorical agreement application working in conjunction with the autonomous agent application can verify rhetorical agreement, e.g., style, between a question and an answer, a question and part of an answer, or an initial answer and an answer represented by an imaginary discourse. tree.

"Communicative discourse trees" or "CDTs" include discourse trees that are supplemented with communicative actions. A communicative action is a cooperative action undertaken by individuals based on mutual deliberation and argumentation, or as otherwise known in the art. By incorporating labels that identify communicative actions, learning of communicative discourse trees can occur over a richer features set than simply rhetoric relations and syntax of elementary discourse units (EDUs). With such a feature set, additional techniques such as classification can be used to determine a level of rhetoric agreement between questions and answers or request-response pairs, thereby enabling improved automated agents. In so doing, computing systems enable autonomous agents that are capable of intelligently answering questions and other messages.

Certain Definitions

As used herein, "rhetorical structure theory" is an area of research and study that provides a theoretical basis upon which the coherence of a discourse could be analyzed.

As used herein, "discourse tree" or "DT" refers to a structure that represents the rhetorical relations for a sentence of part of a sentence.

As used herein, a "rhetorical relation," "rhetorical relationship," or "coherence relation" or "discourse relation" refers to how two segments of discourse are logically connected to one another. Examples of rhetorical relations include elaboration, contrast, and attribution.

As used herein, a "sentence fragment," or "fragment" is a part of a sentence that can be divided from the rest of the sentence. A fragment is an elementary discourse unit. For example, for the sentence "Dutch accident investigators say that evidence points to pro-Russian rebels as being responsible for shooting down the plane," two fragments are "Dutch accident investigators say that evidence points to pro-Russian rebels" and "as being responsible for shooting down the plane." A fragment can, but need not, include a verb.

As used herein, "signature" or "frame" refers to a property of a verb in a fragment. Each signature can include one or more thematic roles. For example, for the fragment "Dutch accident investigators say that evidence points to pro-Russian rebels," the verb is "say" and the signature of this particular use of the verb "say" could be "agent verb topic" where "investigators" is the agent and "evidence" is the topic.

As used herein, "thematic role" refers to components of a signature used to describe a role of one or more words. Continuing the previous example, "agent" and "topic" are thematic roles.

As used herein, "nuclearity" refers to which text segment, fragment, or span, is more central to a writer's purpose. The nucleus is the more central span, and the satellite is the less central one.

As used herein, "coherency" refers to the linking together of two rhetorical relations.

As used herein, "communicative verb" is a verb that indicates communication. For example, the verb "deny" is a communicative verb.

As used herein, "communicative action" describes an action performed by one or more agents and the subjects of the agents.

FIG. 1 shows an exemplary rhetoric classification environment, in accordance with an aspect. FIG. 1 depicts autonomous agent 101, input question 130, output answer 150, data network 104, and server 160. Autonomous agent 101 can include one or more of: autonomous agent application 102, database 115, rhetoric agreement application 112, rhetoric agreement classifier 120, or training data 125. Server 160 can be a public or private internet server, such as a public database of user questions and answers. Examples of functionality provided by servers 160 includes search engines and databases. Data network 104 can be any public or private network, wired or wireless network, Wide Area Network, Local Area Network, or the Internet. Autonomous agent application 102 and rhetoric agreement application 112 can execute within distributed system 1800, as discussed further with respect to FIG. 18.

Autonomous agent application 102 can access input question 130 and generate output answer 150. Input question 130 can be a single question or a stream of questions such as a chat. As depicted, input question 130 is "What is an advantage of an electric car?" Autonomous agent application 102 can receive input question 130 and analyze input question 130, for example by creating one or more imaginary discourse trees 110.

For example, autonomous agent application 102 creates a question discourse tree from input question 130 and an answer discourse tree from an initial answer obtained from a resource such as a database. In some cases, autonomous agent application 102 can obtain a set of candidate answers and select a best match as the initial answer. By analyzing and comparing entities in the question discourse tree and entities in the answer discourse tree, autonomous agent application 102 determines one or more entities in the question that are unaddressed in the answer.

Continuing the example, autonomous agent application 102 accesses additional resources such as a corpus of text and determines from the text, one or more additional answer discourse trees. The autonomous agent application 102 determines that one of the additional answer discourse trees establishes a rhetorical link between the missing question entity and another entity in the question or the answer, thereby designating the particular additional answer discourse tree as an imaginary discourse tree. The autonomous agent application 102 can then form a complete answer from text represented by the initial answer discourse tree and the imaginary discourse tree. The autonomous agent application 102 provides the answer as output answer 150. For example, autonomous agent application 102 outputs the text "There is no need for gasoline."

In some cases, rhetoric agreement application 112 can work in conjunction with autonomous agent application 102, to facilitate improved rhetoric agreement between input question 130 and output answer 150. For example, rhetoric agreement application 112 can verify a level of rhetoric agreement between one or more discourse trees or portions thereof by using one or more communicative discourse trees 114. By using communicative discourse trees, the rhetorical agreement and communicative actions between the question and answer can be accurately modeled. For example, rhetoric agreement application 112 can verify that an input question and an output answer maintain rhetorical agreement, thereby not only ensuring a complete, responsive answer, but also an answer that is in agreement with respect to style with the question.

For example, rhetoric agreement application 112 can create a question communicative discourse tree representing input question 130 and additional communicative discourse trees for each candidate answer. From the candidate answer, rhetoric agreement application 112 determines the most suitable answer. Different methods can be used. In an aspect, rhetoric agreement application 112 can create a candidate answer communicative discourse tree for each candidate answer and compare question communicative discourse tree with each candidate discourse tree. Rhetoric agreement application 112 can then identify a best match between question communicative discourse tree and the candidate answer communicative discourse trees.

In another example, rhetoric agreement application 112, for each candidate answer, creates a question-answer pair that includes the question 130 and the candidate answer. Rhetoric agreement application 112 provides the question-answer pairs to a predictive model, such as rhetoric agreement classifier 120. Using a trained rhetoric agreement classifier 120, rhetoric agreement application 112 determines whether the question-answer pair is above a threshold level of matching, e.g., indicating whether the answer addresses the question. If not, the rhetoric agreement application 112 continues to analyze additional pairs that include the question and a different answer until a suitable answer is found. In some cases, rhetoric agreement application 112 can train rhetoric agreement classifier 120 with training data 125.

Rhetoric Structure Theory and Discourse Trees

Linguistics is the scientific study of language. For example, linguistics can include the structure of a sentence (syntax), e.g., subject-verb-object, the meaning of a sentence (semantics), e.g. dog bites man vs. man bites dog, and what speakers do in conversation, i.e., discourse analysis or the analysis of language beyond the sentence.

The theoretical underpinnings of discourse, Rhetoric Structure Theory (RST), can be attributed to Mann, William and Thompson, Sandra, "Rhetorical structure theory: A Theory of Text organization," Text-Interdisciplinary Journal for the Study of Discourse, 8(3):243-281, 1988. Similar to how the syntax and semantics of programming language theory helped enable modern software compilers, RST helped enabled the analysis of discourse. More specifically RST posits structural blocks on at least two levels, a first level such as nuclearality and rhetorical relations, and a second level of structures or schemas. Discourse parsers or other computer software can parse text into a discourse tree.

Rhetoric Structure Theory models logical organization of text, a structure employed by a writer, relying on relations between parts of text. RST simulates text coherence by forming a hierarchical, connected structure of texts via discourse trees. Rhetoric relations are split into the classes of coordinate and subordinate; these relations hold across two or more text spans and therefore implement coherence. These text spans are called elementary discourse units (EDUs). Clauses in a sentence and sentences in a text are logically connected by the author. The meaning of a given sentence is related to that of the previous and the following sentences. This logical relation between clauses is called the coherence structure of the text. RST is one of the most popular theories of discourse, being based on a tree-like discourse structure, discourse trees (DTs). The leaves of a DT correspond to EDUs, the contiguous atomic text spans. Adjacent EDUs are connected by coherence relations (e.g., Attribution, Sequence), forming higher-level discourse units. These units are then also subject to this relation linking. EDUs linked by a relation are then differentiated based on their relative importance: nuclei are the core parts of the relation, while satellites are peripheral ones. As discussed, in order to determine accurate request-response pairs, both topic and rhetorical agreement are analyzed. When a speaker answers a question, such as a phrase or a sentence, the speaker's answer should address the topic of this question. In the case of an implicit formulation of a question, via a seed text of a message, an appropriate answer is expected not only maintain a topic, but also match the generalized epistemic state of this seed.

Rhetoric Relations

As discussed, aspects described herein use imaginary discourse trees. Rhetorical relations can be described in different ways. For example, Mann and Thompson describe twenty-three possible relations. See William C. Mann, William & Thompson, Sandra. (1987) ("Mann and Thompson"). Maite "Rhetorical structure theory: A Theory of Text organization," Text-Interdisciplinary Journal for the Study of Discourse, 8(3):243-281, 1988. Other numbers of relations are possible.

| Relation Name | Nucleus | Satellite |
| --- | --- | --- |
| Antithesis | ideas favored by the author | ideas disfavored by the author |
| Background | text whose understanding is being facilitated | text for facilitating understanding |
| Circumstance | text expressing the events or ideas occurring in the interpretive context | an interpretive context of situation or time |
| Concession | situation affirmed by author | situation which is apparently inconsistent but also affirmed by author |
| Condition | action or situation whose occurrence results from the occurrence of the conditioning situation | conditioning situation |
| Elaboration | basic information | additional information |
| Enablement | an action | information intended to aid the reader in performing an action |
| Evaluation | a situation | an evaluative comment about the situation |
| Evidence | a claim | information intended to increase the reader's belief in the claim |
| Interpretation | a situation | an interpretation of the situation |
| Justify | text | information supporting the writer's right to express the text |
| Motivation | an action | information intended to increase the reader's desire to perform the action |
| Non-volitional Cause | a situation | another situation which causes that one, but not by anyone's deliberate action |
| Non-volitional Result | a situation | another situation which is caused by that one, but not by anyone's deliberate action |
| Otherwise (anti conditional) | action or situation whose occurrence results from the lack of occurrence of the conditioning situation | conditioning situation |
| Purpose | an intended situation | the intent behind the situation |
| Restatement | a situation | a reexpression of the situation |
| Solutionhood | a situation or method supporting full or partial satisfaction of the need | a question, request, problem, or other expressed need |
| Summary | text | a short summary of that text |
| Volitional Cause | a situation | another situation which causes that one, by someone's deliberate action |
| Volitional Result | a situation | another situation which is caused by that one, by someone's deliberate action |

Some empirical studies postulate that the majority of text is structured using nucleus-satellite relations. See Mann and Thompson 1988. But other relations do not carry a definite selection of a nucleus. Examples of such relations are shown below.

| Relation Name | Span | Other Span |
| --- | --- | --- |
| Contrast | One alternate (unconstrained) | The other alternate (unconstrained) |
| Joint | | |
| List | An item | A next item |
| Sequence | An item | A next item |

Figure 2:
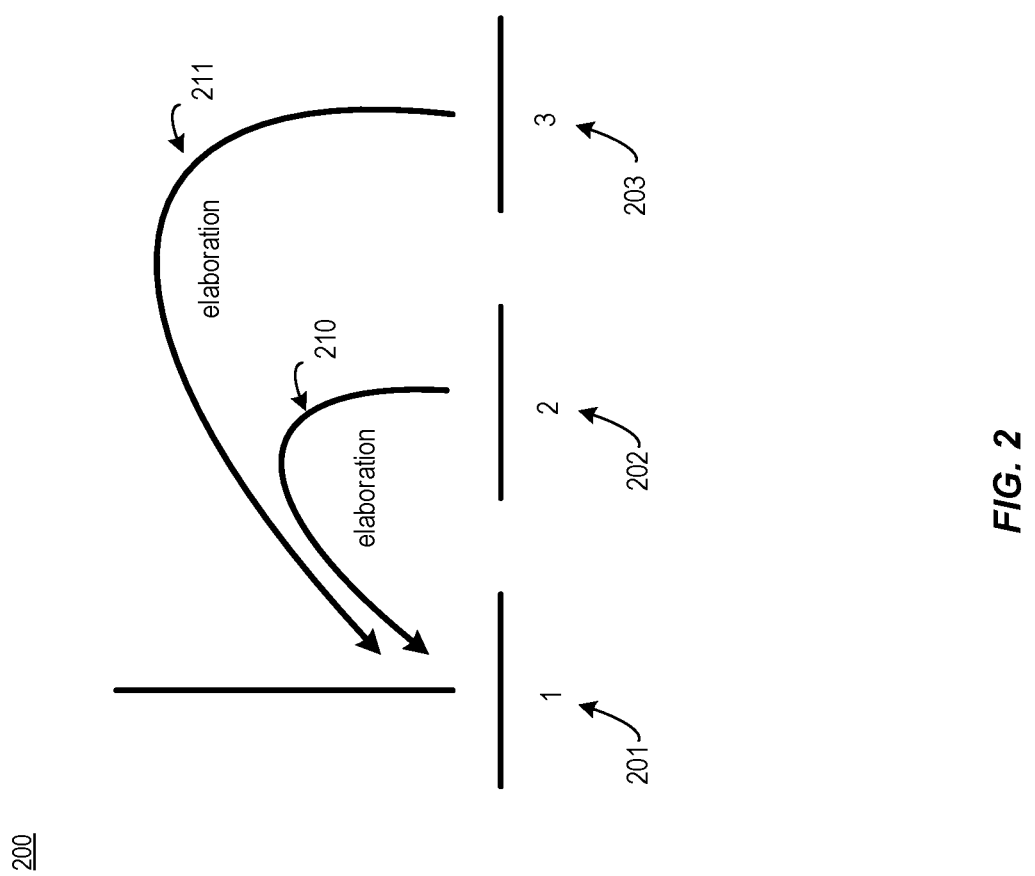
FIG. 2 depicts an example of a discourse tree in accordance with an aspect.

FIG. 2 depicts an example of a discourse tree, in accordance with an aspect. FIG. 2 includes discourse tree 200. Discourse tree includes text span 201, text span 202, text span 203, relation 210 and relation 228. The numbers in FIG. 2 correspond to the three text spans. FIG. 3 corresponds to the following example text with three text spans numbered 1, 2, 3:

1. Honolulu, Hi. will be site of the 2017 Conference on Hawaiian History
2. It is expected that 200 historians from the U.S. and Asia will attend
3. The conference will be concerned with how the Polynesians sailed to Hawaii For example, relation 210, or elaboration, describes the relationship between text span 201 and text span 202. Relation 228 depicts the relationship, elaboration, between text span 203 and 204. As depicted, text spans 202 and 203 elaborate further on text span 201. In the above example, given a goal of notifying readers of a conference, text span 1 is the nucleus. Text spans 2 and 3 provide more detail about the conference. In FIG. 2, a horizontal number, e.g., 1-3, 1, 2, 3 covers a span of text (possibly made up of further spans); a vertical line signals the nucleus or nuclei; and a curve represents a rhetoric relation (elaboration) and the direction of the arrow points from the satellite to the nucleus. If the text span only functions as a satellite and not as a nuclei, then deleting the satellite would still leave a coherent text. If from FIG. 2 one deletes the nucleus, then text spans 2 and 3 are difficult to understand.

FIG. 3 depicts a further example of a discourse tree in accordance with an aspect. FIG. 3 includes components 301 and 302, text spans 305-307, relation 310 and relation 328. Relation 310 depicts the relationship 310, enablement, between components 306 and 305, and 307, and 305. FIG. 3 refers to the following text spans:

1. The new Tech Report abstracts are now in the journal area of the library near the abridged dictionary.
2. Please sign your name by any means that you would be interested in seeing.
3. Last day for sign-ups is 31 May.

As can be seen, relation 328 depicts the relationship between entity 307 and 306, which is enablement. FIG. 3 illustrates that while nuclei can be nested, there exists only one most nuclear text span.

Constructing a Discourse Tree

Discourse trees can be generated using different methods. A simple example of a method to construct a DT bottom up is:

(1) Divide the discourse text into units by:
 (a) Unit size may vary, depending on the goals of the analysis
 (b) Typically, units are clauses
(2) Examine each unit, and its neighbors. Is there a relation holding between them?
(3) If yes, then mark that relation.
(4) If not, the unit might be at the boundary of a higher-level relation. Look at relations holding between larger units (spans).
(5) Continue until all the units in the text are accounted for.

Figure 4:
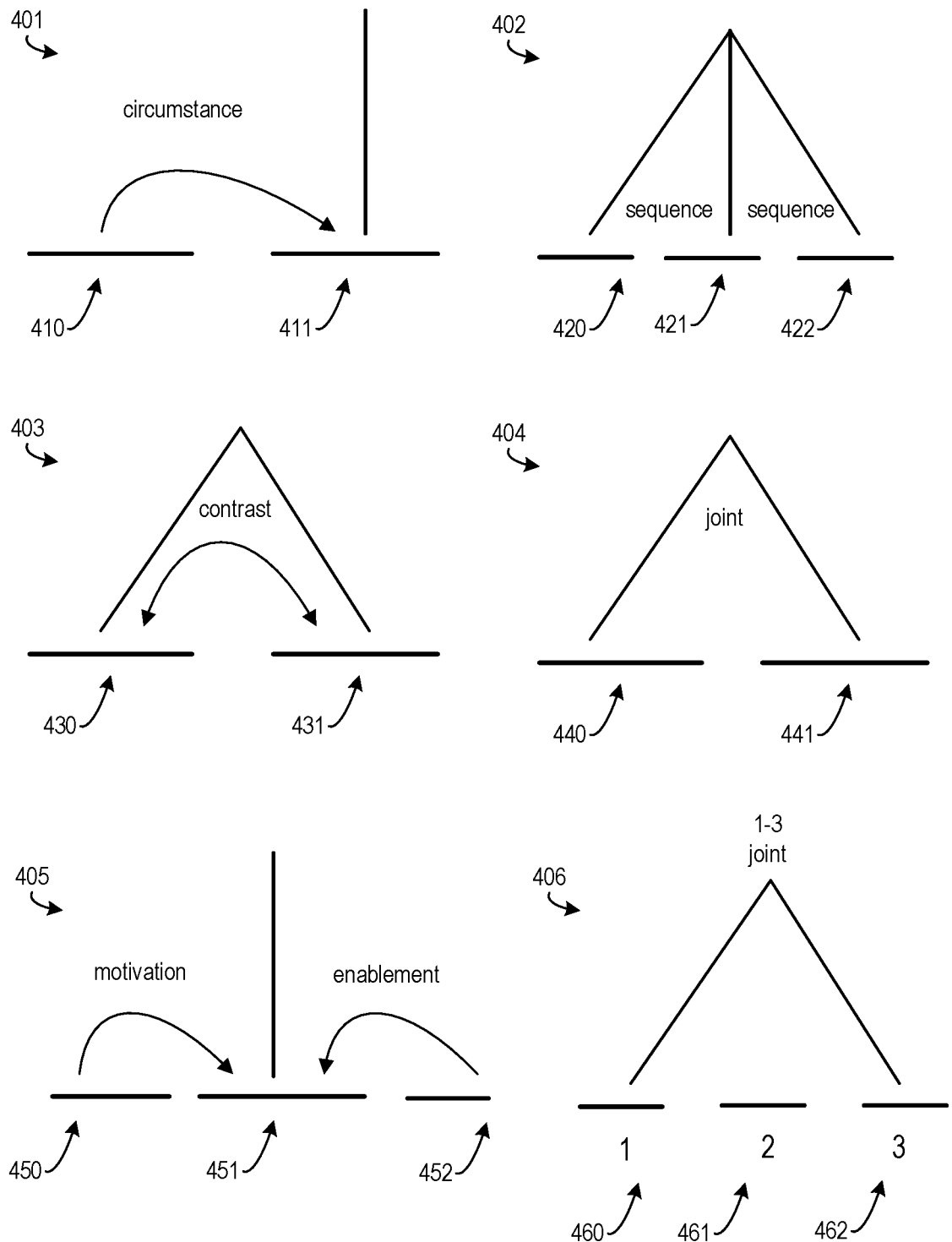
FIG. 4 depicts illustrative schemas, in accordance with an aspect.

Mann and Thompson also describe the second level of building block structures called schemas applications. In RST, rhetoric relations are not mapped directly onto texts; they are fitted onto structures called schema applications, and these in turn are fitted to text. Schema applications are derived from simpler structures called schemas (as shown by FIG. 4). Each schema indicates how a particular unit of text is decomposed into other smaller text units. A rhetorical structure tree or DT is a hierarchical system of schema applications. A schema application links a number of consecutive text spans, and creates a complex text span, which can in turn be linked by a higher-level schema application. RST asserts that the structure of every coherent discourse can be described by a single rhetorical structure tree, whose top schema creates a span encompassing the whole discourse.

FIG. 4 depicts illustrative schemas, in accordance with an aspect. FIG. 4 shows a joint schema is a list of items consisting of nuclei with no satellites. FIG. 4 depicts schemas 401-406. Schema 401 depicts a circumstance relation between text spans 410 and 428. Scheme 402 depicts a sequence relation between text spans 420 and 421 and a sequence relation between text spans 421 and 422. Schema 403 depicts a contrast relation between text spans 430 and 431. Schema 404 depicts a joint relationship between text spans 440 and 441. Schema 405 depicts a motivation relationship between 450 and 451, and an enablement relationship between 452 and 451. Schema 406 depicts joint relationship between text spans 460 and 462. An example of a joint scheme is shown in FIG. 4 for the three text spans below:

1. Skies will be partly sunny in the New York metropolitan area today.
2. It will be more humid, with temperatures in the middle 80's.
3. Tonight will be mostly cloudy, with the low temperature between 65 and 70.

While FIGS. 2-4 depict some graphical representations of a discourse tree, other representations are possible.

Figure 5:
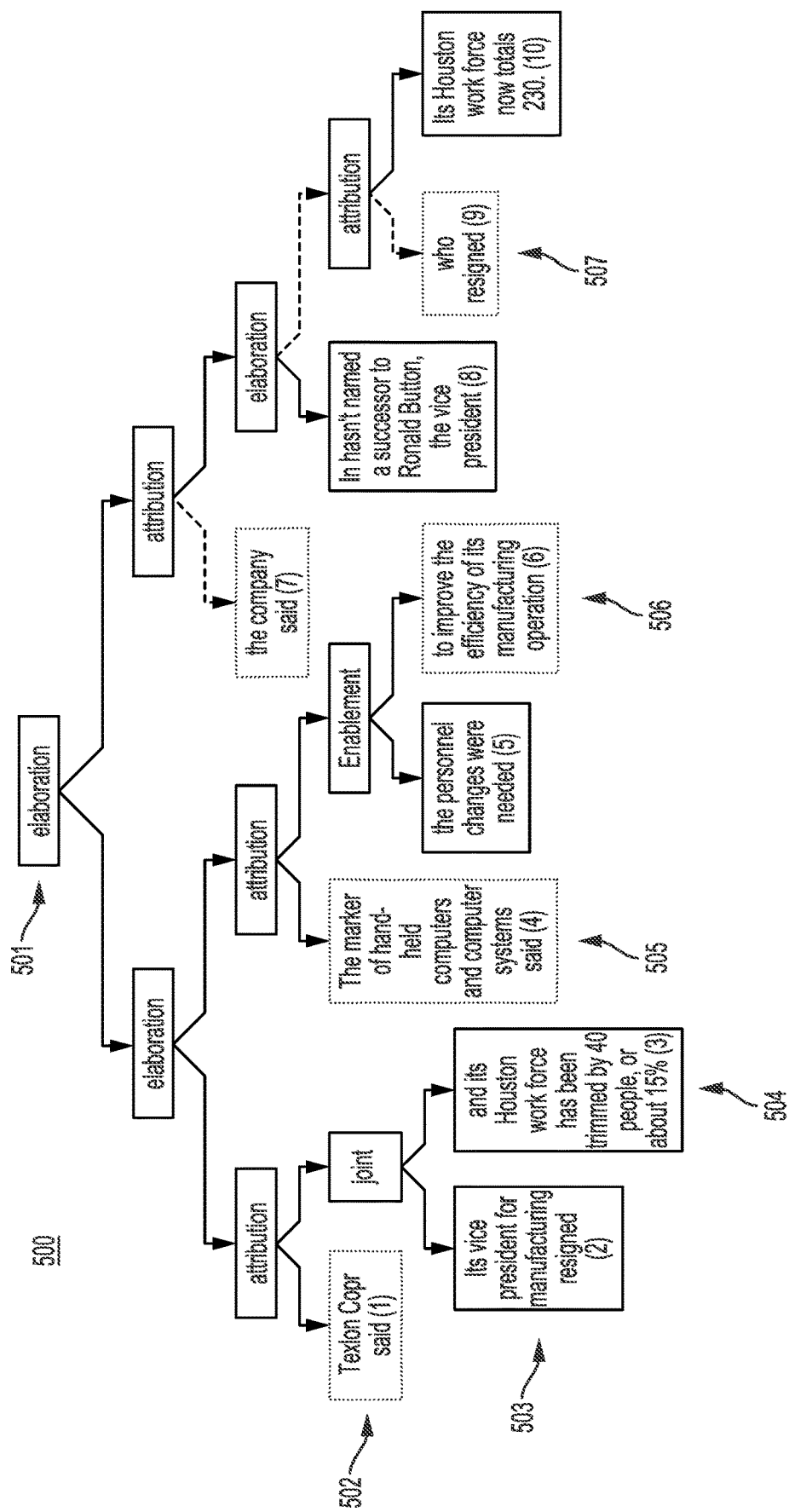
FIG. 5 depicts a node-link representation of the hierarchical binary tree in accordance with an aspect.

FIG. 5 depicts a node-link representation of the hierarchical binary tree in accordance with an aspect. As can be seen from FIG. 6, the leaves of a DT correspond to contiguous non-overlapping text spans called Elementary Discourse Units (EDUs). Adjacent EDUs are connected by relations (e.g., elaboration, attribution . . . ) and form larger discourse units, which are also connected by relations. "Discourse analysis in RST involves two sub-tasks: discourse segmentation is the task of identifying the EDUs, and discourse parsing is the task of linking the discourse units into a labeled tree."

FIG. 5 depicts text spans that are leaves, or terminal nodes, on the tree, each numbered in the order they appear in the full text, shown in FIG. 6. FIG. 5 includes tree 500. Tree 500 includes, for example, nodes 501-507. The nodes indicate relationships. Nodes are non-terminal, such as node 501, or terminal, such as nodes 502-507. As can be seen, nodes 503 and 504 are related by a joint relationship. Nodes 502, 505, 506, and 508 are nuclei. The dotted lines indicate that the branch or text span is a satellite. The relations are nodes in gray boxes. FIG. 6 depicts an exemplary indented text encoding of the representation in FIG. 5 in accordance with an aspect. FIG. 6 includes text 600 that is more amenable to computer programming. "N" is a nucleus and "S" is a satellite.

Examples of Discourse Parsers

Automatic discourse segmentation can be performed with different methods. For example, given a sentence, a segmentation model identifies the boundaries of the composite elementary discourse units by predicting whether a boundary should be inserted before each particular token in the sentence. For example, one framework considers each token in the sentence sequentially and independently. In this framework, the segmentation model scans the sentence token by token, and uses a binary classifier, such as a support vector machine or logistic regression, to predict whether it is appropriate to insert a boundary before the token being examined. In another example, the task is a sequential labeling problem. Once text is segmented into elementary discourse units, sentence-level discourse parsing can be performed to construct the discourse tree. Machine learning techniques can be used.

In one aspect of the present invention, two Rhetorical Structure Theory (RST) discourse parsers are used: CoreNLPProcessor which relies on constituent syntax, and FastNLPProcessor which uses dependency syntax. They are described in Mihai Surdeanu, Thomas Hicks, and Marco A. Valenzuela-Escarcega. "Two Practical Rhetorical Structure Theory Parsers," Proceedings of the Conference of the North American Chapter of the Association for Computational Linguistics—Human Language Technologies: Software Demonstrations (NAACL HLT), 2015.

In addition, the above two discourse parsers, i.e., CoreNLPProcessor and FastNLPProcessor use Natural Language Processing (NLP) for syntactic parsing. For example, the Stanford CoreNLP gives the base forms of words, their parts of speech, whether they are names of companies, people, etc., normalize dates, times, and numeric quantities, mark up the structure of sentences in terms of phrases and syntactic dependencies, indicate which noun phrases refer to the same entities. Practically, RST is a still theory that may work in many cases of discourse, but in some cases, it may not work. There are many variables including, but not limited to, what EDU's are in a coherent text, i.e., what discourse segmenters are used, what relations inventory is used and what relations are selected for the EDUs, the corpus of documents used for training and testing, and even what parsers are used. So for example, in Surdeanu, et al., "Two Practical Rhetorical Structure Theory Parsers," paper cited above, tests must be run on a particular corpus using specialized metrics to determine which parser gives better performance. Thus unlike computer language parsers which give predictable results, discourse parsers (and segmenters) can give unpredictable results depending on the training and/or test text corpus. Thus, discourse trees are a mixture of the predicable arts (e.g., compilers) and the unpredictable arts (e.g., like chemistry were experimentation is needed to determine what combinations will give you the desired results).

In order to objectively determine how good a Discourse analysis is, a series of metrics are being used, e.g., Precision/Recall/F1 metrics from Daniel Marcu, "The Theory and Practice of Discourse Parsing and Summarization," MIT Press, November 2000, ISBN: 9780262123722. Precision, or positive predictive value is the fraction of relevant instances among the retrieved instances, while recall (also known as sensitivity) is the fraction of relevant instances that have been retrieved over the total amount of relevant instances. Both precision and recall are therefore based on an understanding and measure of relevance. Suppose a computer program for recognizing dogs in photographs identifies eight dogs in a picture containing 12 dogs and some cats. Of the eight dogs identified, five actually are dogs (true positives), while the rest are cats (false positives). The program's precision is $5/8$ while its recall is $5/12$. When a search engine returns 30 pages only 20 of which were relevant while failing to return 40 additional relevant pages, its precision is $20/30=2/3$ while its recall is $20/60=1/3$. Therefore, in this case, precision is 'how useful the search results are', and recall is 'how complete the results are.' The F1 score (also F-score or F-measure) is a measure of a test's accuracy. It considers both the precision and the recall of the test to compute the score: F1=2×((precision×recall)/(precision+recall)) and is the harmonic mean of precision and recall. The F1 score reaches its best value at 1 (perfect precision and recall) and worst at 0.

Autonomous Agents or Chatbots

A conversation between Human A and Human B is a form of discourse. For example, applications exist such as Face-Book® Messenger, WhatsApp®, Slack,® SMS, etc., a conversation between A and B may typically be via messages in addition to more traditional email and voice conversations. A chatbot (which may also be called intelligent bots or virtual assistant, etc.) is an "intelligent" machine that, for example, replaces human B and to various degrees mimics the conversation between two humans. An example ultimate goal is that human A cannot tell whether B is a human or a machine (the Turning test, developed by Alan Turing in 1950). Discourse analysis, artificial intelligence, including machine learning, and natural language processing, have made great strides toward the long-term goal of passing the Turing test. Of course, with computers being more and more capable of searching and processing vast repositories of data and performing complex analysis on the data to include predictive analysis, the long-term goal is the chatbot being human-like and a computer combined.

For example, users can interact with the Intelligent Bots Platform through a conversational interaction. This interaction, also called the conversational user interface (UI), is a dialog between the end user and the chatbot, just as between two human beings. It could be as simple as the end user saying "Hello" to the chatbot and the chatbot responding with a "Hi" and asking the user how it can help, or it could be a transactional interaction in a banking chatbot, such as transferring money from one account to the other, or an informational interaction in a HR chatbot, such as checking for vacation balance, or asking an FAQ in a retail chatbot, such as how to handle returns. Natural language processing (NLP) and machine learning (ML) algorithms combined with other approaches can be used to classify end user intent. An intent at a high level is what the end user would like to accomplish (e.g., get account balance, make a purchase). An intent is essentially, a mapping of customer input to a unit of work that the backend should perform. Therefore, based on the phrases uttered by the user in the chatbot, these are mapped that to a specific and discrete use case or unit of work, for e.g. check balance, transfer money and track spending are all "use cases" that the chatbot should support and be able to work out which unit of work should be triggered from the free text entry that the end user types in a natural language.

The underlying rational for having an AI chatbot respond like a human is that the human brain can formulate and understand the request and then give a good response to the human request much better than a machine. Thus, there should be significant improvement in the request/response of a chatbot, if human B is mimicked. So an initial part of the problem is how does the human brain formulate and understand the request? To mimic, a model is used. RST and DT allow a formal and repeatable way of doing this.

At a high level, there are typically two types of requests: (1) A request to perform some action; and (2) a request for information, e.g., a question. The first type has a response in which a unit of work is created. The second type has a response that is, e.g., a good answer, to the question. The answer could take the form of, for example, in some aspects, the AI constructing an answer from its extensive knowledge base(s) or from matching the best existing answer from searching the internet or intranet or other publically/privately available data sources.

Analyzing Request and Response Pairs

Figure 7:
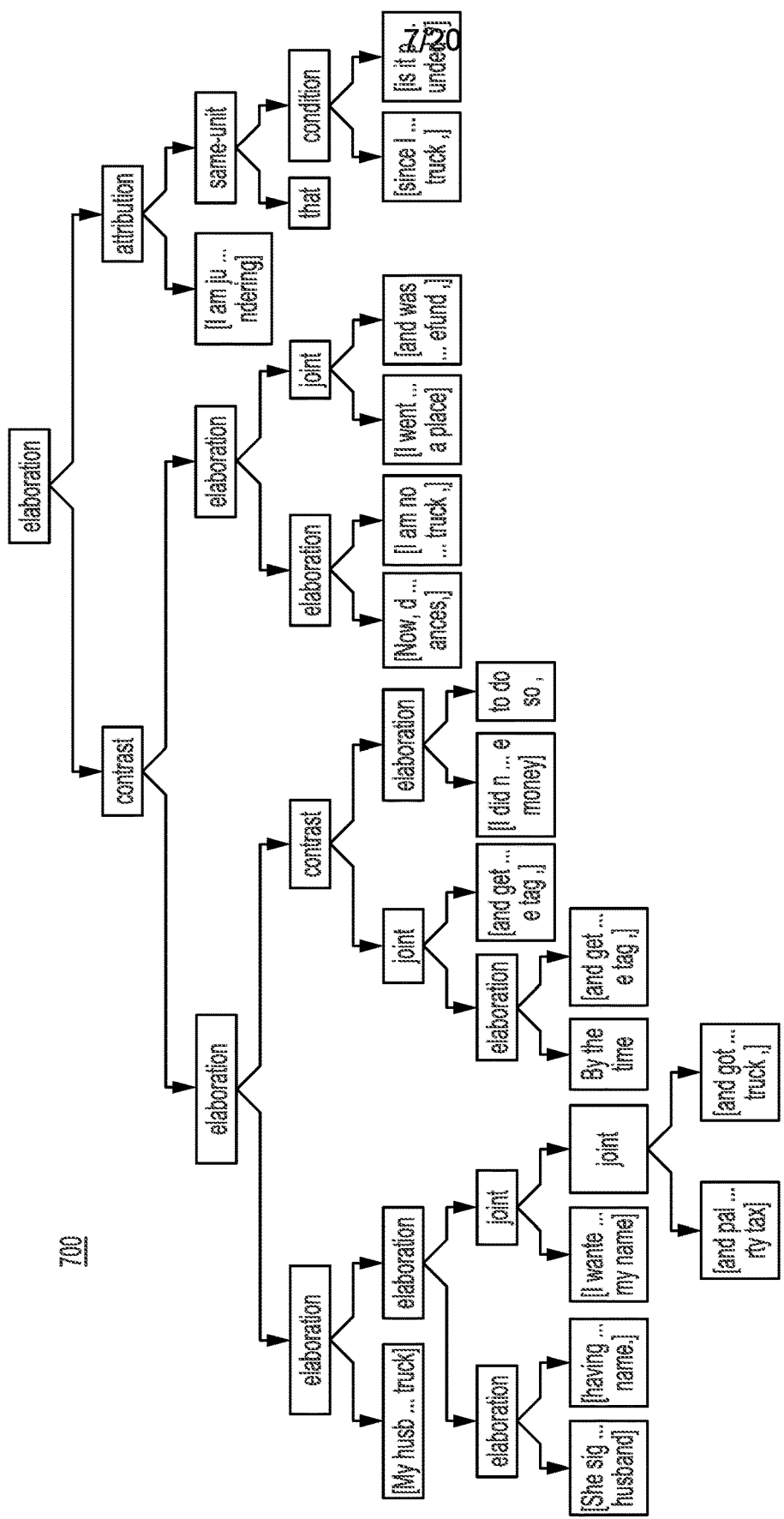
FIG. 7 depicts an exemplary DT for an example request about property tax in accordance with an aspect.

FIG. 7 depicts an exemplary DT for an example request about property tax in accordance with an aspect. The node labels are the relations and the arrowed line points to the satellite. The nucleus is a solid line. FIG. 7 depicts the following text.

Request: "My husband's grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so. Now, due to circumstances, I am not going to be able to afford the truck. I went to the insurance place and was refused a refund. I am just wondering that since I am not going to have a tag on this truck, is it possible to get the property tax refunded?"

Response: "The property tax is assessed on property that you own. Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax. If you apply late, there will be penalties on top of the normal taxes and fees.

You don't need to register it at the same time, but you absolutely need to title it within the period of time stipulated in state law."

Analyzing the above text gives: "My husband's grandmother gave him his grandfather's truck" is elaborated by "She signed the title over but due to my husband" elaborated by "having unpaid fines on his license, he was not able to get the truck put in his name." which is elaborated by "I wanted to put in my name," "and paid the property tax", and "and got insurance for the truck."

"My husband's grandmother gave him his grandfather's truck. She signed the title over but due to my husband having unpaid fines on his license, he was not able to get the truck put in his name. I wanted to put in my name and paid the property tax and got insurance for the truck." is elaborated by;

"I didn't have the money" elaborated by "to do so" contrasted with

"By the time" elaborated by "it came to sending off the title"

"and getting the tag"

"My husband's grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so" is contrasted with "Now, due to circumstances," elaborated with "I am not going to be able to afford the truck." which is elaborated with "I went to the insurance place"

"and was refused a refund"

"My husband's grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so. Now, due to circumstances, I am not going to be able to afford the truck. I went to the insurance place and was refused a refund." is elaborated with "I am just wondering that since I am not going to have a tag on this truck, is it possible to get the property tax refunded?"

"I am just wondering" has attribution to

"that" is the same unit as "is it possible to get the property tax refunded?" which has condition "since I am not going to have a tag on this truck"

As can be seen, the main subject of the topic is "Property tax on a car". The question includes the contradiction: on one hand, all properties are taxable, and on the other hand, the ownership is somewhat incomplete. A good response has to address both topic of the question and clarify the inconsistency. To do that, the responder is making even stronger claim concerning the necessity to pay tax on whatever is owned irrespectively of the registration status. This example is a member of positive training set from our Yahoo! Answers evaluation domain. The main subject of the topic is "Property tax on a car". The question includes the contradiction: on one hand, all properties are taxable, and on the other hand, the ownership is somewhat incomplete. A good answer/response has to address both topic of the question and clarify the inconsistency. The reader can observe that since the question includes rhetoric relation of contrast, the answer has to match it with a similar relation to be convincing. Otherwise, this answer would look incomplete even to those who are not domain experts.

Figure 8:
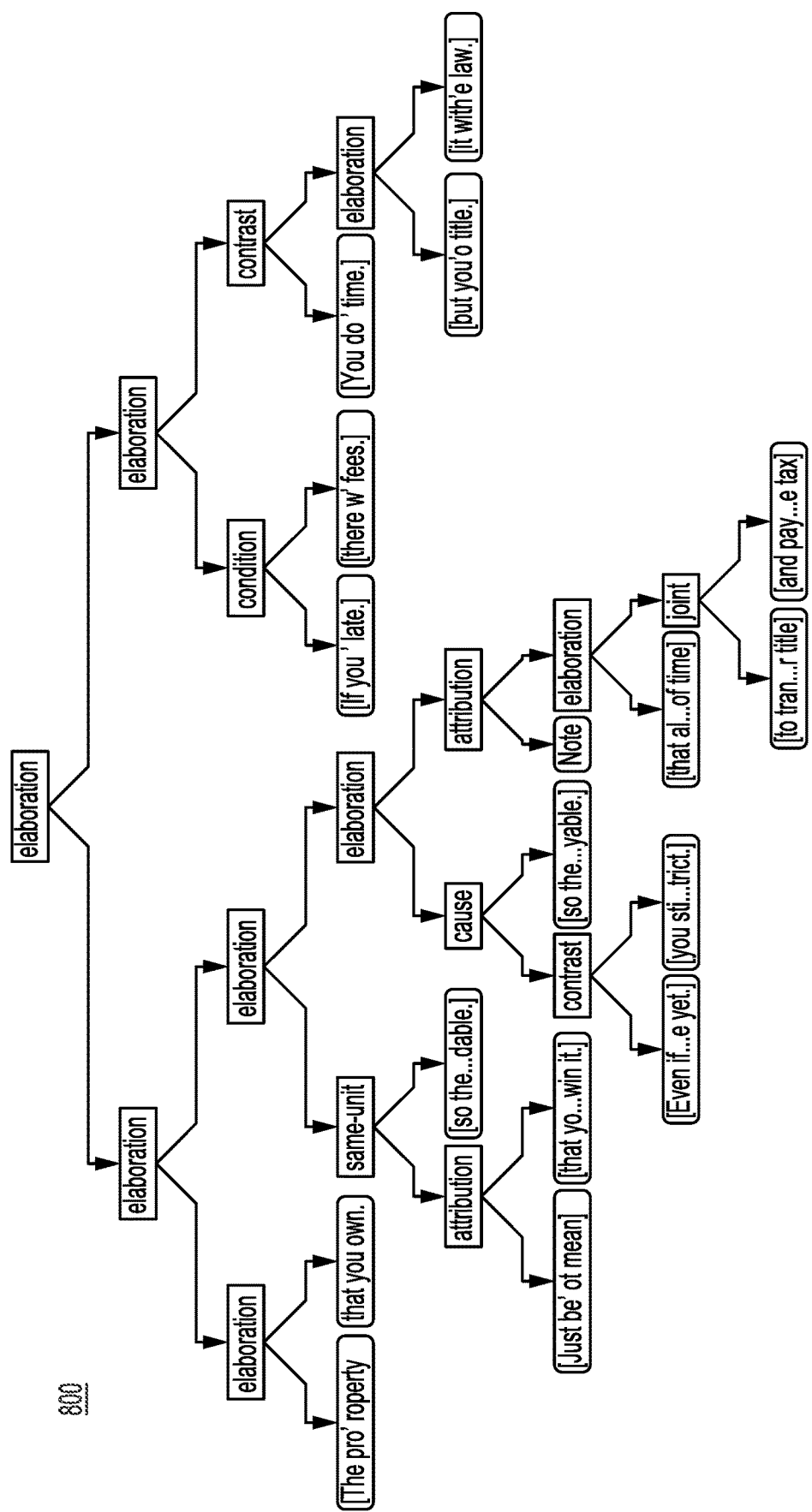
FIG. 8 depicts an exemplary response for the question represented in FIG. 7.

FIG. 8 depicts an exemplary response for the question represented in FIG. 7, according to certain aspects of the present invention. The central nucleus is "the property tax is assessed on property" elaborated by "that you own". "The property tax is assessed on property that you own" is also a nucleus elaborated by "Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax."

The nucleus "The property tax is assessed on property that you own. Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax." is elaborated by "there will be penalties on top of the normal taxes and fees" with condition "If you apply late," which in turn is elaborated by the contrast of "but you absolutely need to title it within the period of time stipulated in state law." and "You don't need to register it at the same time.".

Comparing the DT of FIG. 7 and DT of FIG. 8, enables a determination of how well matched the response (FIG. 8) is to the request (FIG. 7). In some aspects of the present invention, the above framework is used, at least in part, to determine the DTs for the request/response and the rhetoric agreement between the DTs.

Figure 9:
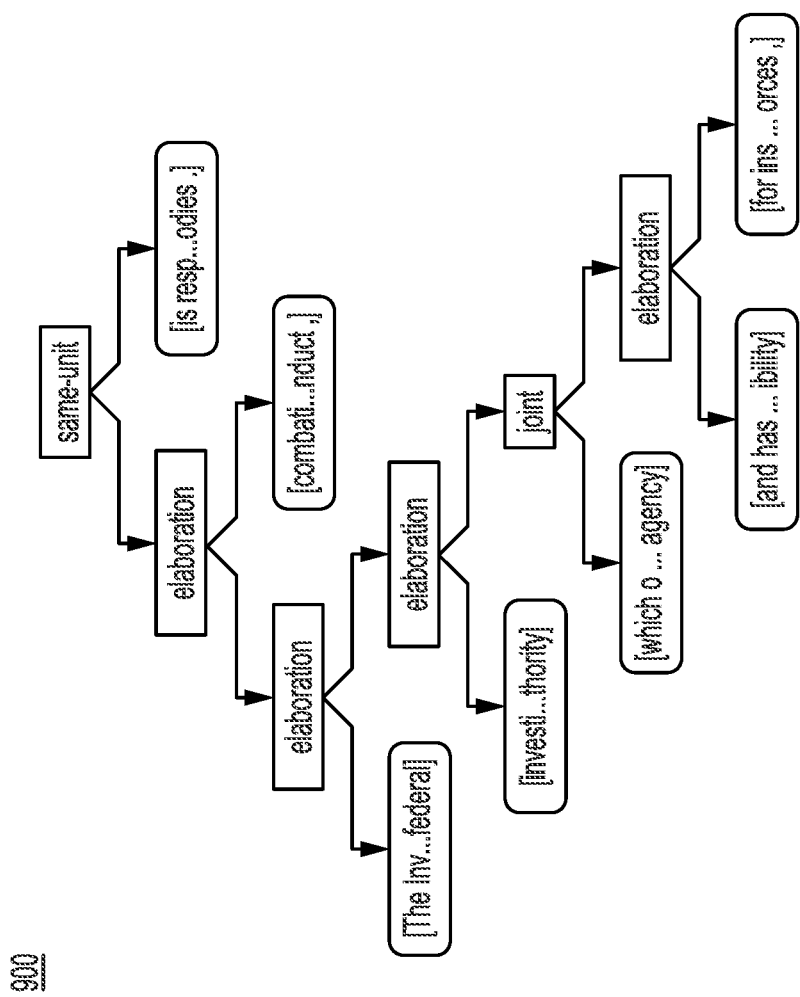
FIG. 9 illustrates a discourse tree for an official answer in accordance with an aspect.

FIG. 9 illustrates a discourse tree for an official answer in accordance with an aspect. As depicted in FIG. 9, an official answer, or mission statement states that "The Investigative Committee of the Russian Federation is the main federal investigating authority which operates as Russia's Anti-corruption agency and has statutory responsibility for inspecting the police forces, combating police corruption and police misconduct, is responsible for conducting investigations into local authorities and federal governmental bodies."

Figure 10:
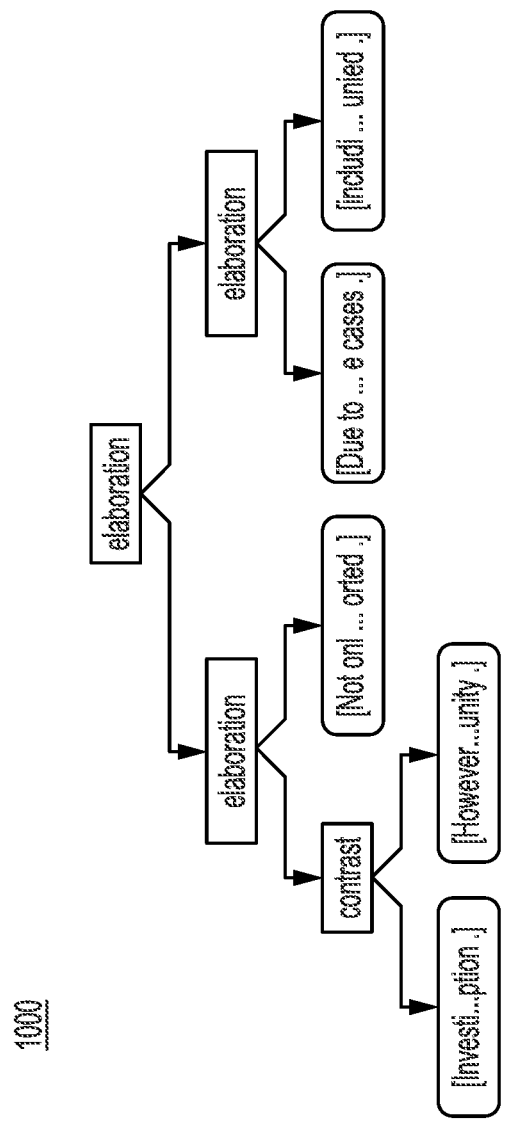
FIG. 10 illustrates a discourse tree for a raw answer in accordance with an aspect.

FIG. 10 illustrates a discourse tree for a raw answer in accordance with an aspect. As depicted in FIG. 10, another, perhaps more honest, answer states that "Investigative Committee of the Russian Federation is supposed to fight corruption. However, top-rank officers of the Investigative Committee of the Russian Federation are charged with creation of a criminal community. Not only that, but their involvement in large bribes, money laundering, obstruction of justice, abuse of power, extortion, and racketeering has been reported. Due to the activities of these officers, dozens of high-profile cases including the ones against criminal lords had been ultimately ruined."

The choice of answers depends on context. Rhetoric structure allows differentiating between "official", "politically correct", template-based answers and "actual", "raw", "reports from the field", or "controversial" answers. (See FIG. 9 and FIG. 10). Sometimes, the question itself can give a hint about which category of answers is expected. If a question is formulated as a factoid or definitional one, without a second meaning, then the first category of answers is suitable. Otherwise, if a question has the meaning "tell me what it really is", then the second category is appropriate. In general, after extracting a rhetoric structure from a question, selecting a suitable answer that would have a similar, matching, or complementary rhetoric structure is easier.

The official answer is based on elaboration and joints, which are neutral in terms of controversy a text might contain (See FIG. 9). At the same time, the row answer includes the contrast relation. This relation is extracted between the phrase for what an agent is expected to do and what this agent was discovered to have done.

Classification of Request-Response Pairs

Rhetoric agreement application 112 can determine whether a given answer or response, such as an answer obtained from answer database 105 or a public database, is responsive to a given question, or request. More specifically, rhetoric agreement application 112 analyzes whether a request and response pair is correct or incorrect by determining one or both of (i) relevance or (ii) rhetoric agreement between the request and the response. Rhetoric agreement can be analyzed without taking into account relevance, which can be treated orthogonally.

Rhetoric agreement application 112 can determine similarity between question-answer pairs using different methods. For example, rhetoric agreement application 112 can determine level of similarity between an individual question and an individual answer. Alternatively, rhetoric agreement application 112 can determine a measure of similarity between a first pair including a question and an answer, and a second pair including a question and answer.

For example, rhetoric agreement application 112 uses rhetoric agreement classifier 120 trained to predict matching or non-matching answers. Rhetoric agreement application 112 can process two pairs at a time, for example <q1, a1> and <q2, a2>. Rhetoric agreement application 112 compares q1 with q2 and a1 with a1, producing a combined similarity score. Such a comparison allows a determination of whether an unknown question/answer pair contains a correct answer or not by assessing a distance from another question/answer pair with a known label. In particular, an unlabeled pair <q2, a2> can be processed so that rather than "guessing" correctness based on words or structures shared by q2 and a2, both q2 and a2 can be compared with their corresponding components q1 and a2 of the labeled pair <q2, a2> on the grounds of such words or structures. Because this approach targets a domain-independent classification of an answer, only the structural cohesiveness between a question and answer can be leveraged, not 'meanings' of answers.

In an aspect, rhetoric agreement application 112 uses training data 125 to train rhetoric agreement classifier 120. In this manner, rhetoric agreement classifier 120 is trained to determine a similarity between pairs of questions and answers. This is a classification problem. Training data 125 can include a positive training set and a negative training set. Training data 125 includes matching request-response pairs in a positive dataset and arbitrary or lower relevance or appropriateness request-response pairs in a negative dataset. For the positive dataset, various domains with distinct acceptance criteria are selected that indicate whether an answer or response is suitable for the question.

Each training data set includes a set of training pairs. Each training set includes a question communicative discourse tree that represents a question and an answer communicative discourse tree that represents an answer and an expected level of complementarity between the question and answer. By using an iterative process, rhetoric agreement application 112 provides a training pair to rhetoric agreement classifier 120 and receives, from the model, a level of complementarity. Rhetoric agreement application 112 calculates a loss function by determining a difference between the determined level of complementarity and an expected level of complementarity for the particular training pair. Based on the loss function, rhetoric agreement application 112 adjusts internal parameters of the classification model to minimize the loss function.

Acceptance criteria can vary by application. For example, acceptance criteria may be low for community question answering, automated question answering, automated and manual customer support systems, social network communications and writing by individuals such as consumers about their experience with products, such as reviews and complaints. RR acceptance criteria may be high in scientific texts, professional journalism, health and legal documents in the form of FAQ, professional social networks such as "stackoverflow."

Communicative Discourse Trees (CDTs)

Rhetoric agreement application 112 can create, analyze, and compare communicative discourse trees. Communicative discourse trees are designed to combine rhetoric information with speech act structures. CDTs include with arcs labeled with expressions for communicative actions. By combining communicative actions, CDTs enable the modeling of RST relations and communicative actions. A CDT is a reduction of a parse thicket. See Galitsky, B, Ilvovsky, D. and Kuznetsov S O. Rhetoric Map of an Answer to Compound Queries Knowledge Trail Inc. ACL 2015, 681-686. ("Galitsky 2015"). A parse thicket is a combination of parse trees for sentences with discourse-level relationships between words and parts of the sentence in one graph. By incorporating labels that identify speech actions, learning of communicative discourse trees can occur over a richer features set than just rhetoric relations and syntax of elementary discourse units (EDUs).

In an example, a dispute between three parties concerning the causes of a downing of a commercial airliner, Malaysia Airlines Flight 17 is analyzed. An RST representation of the arguments being communicated is built. In the example, three conflicting agents, Dutch investigators, The Investigative Committee of the Russian Federation, and the self-proclaimed Donetsk People's Republic exchange their opinions on the matter. The example illustrates a controversial conflict where each party does all it can to blame its opponent. To sound more convincing, each party does not just produce its claim but formulates a response in a way to rebuff the claims of an opponent. To achieve this goal, each party attempts to match the style and discourse of the opponents' claims.

Figure 11:
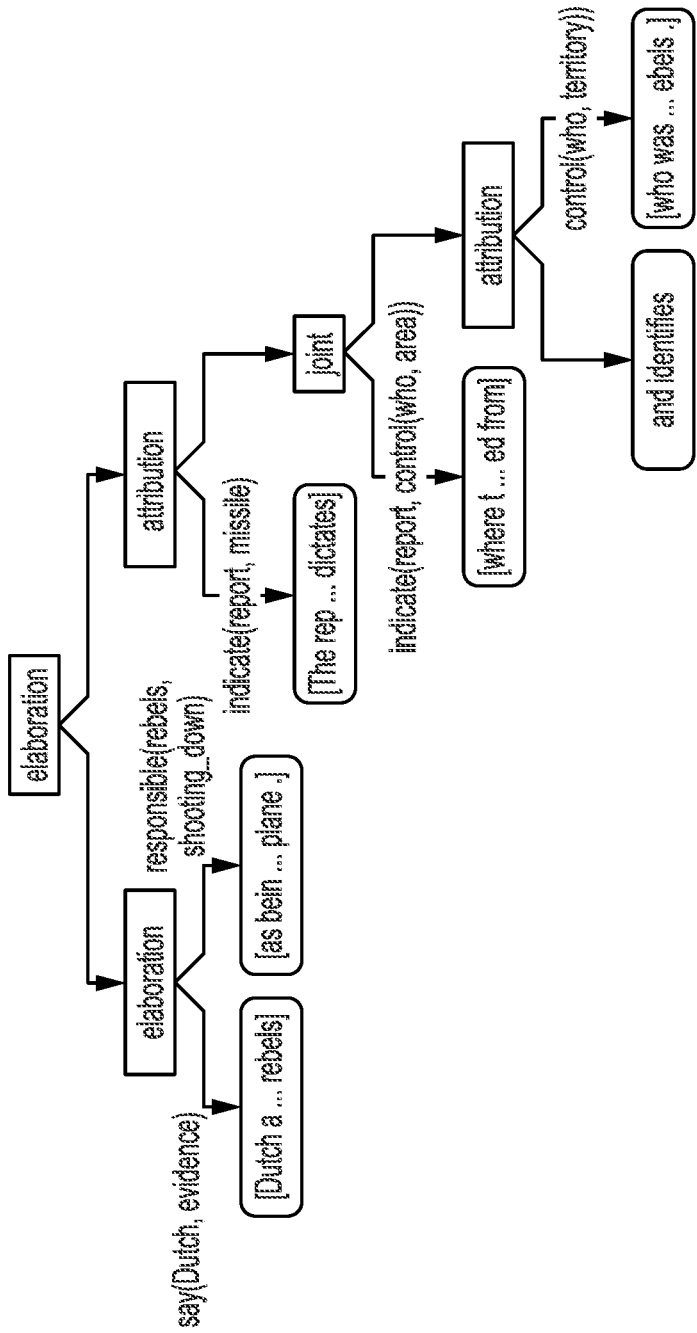
FIG. 11 illustrates a communicative discourse tree for a claim of a first agent in accordance with an aspect.

FIG. 11 illustrates a communicative discourse tree for a claim of a first agent in accordance with an aspect. FIG. 11 depicts communicative discourse tree 100, which represents the following text: "Dutch accident investigators say that evidence points to pro-Russian rebels as being responsible for shooting down plane. The report indicates where the missile was fired from and identifies who was in control of the territory and pins the downing of MH17 on the pro-Russian rebels."

As can be seen from FIG. 11, non-terminal nodes of CDTs are rhetoric relations, and terminal nodes are elementary discourse units (phrases, sentence fragments) which are the subjects of these relations. Certain arcs of CDTs are labeled with the expressions for communicative actions, including the actor agent and the subject of these actions (what is being communicated). For example, the nucleus node for elaboration relation (on the left) are labeled with say (Dutch, evidence), and the satellite with responsible (rebels, shooting down). These labels are not intended to express that the subjects of EDUs are evidence and shooting down but instead for matching this CDT with others for the purpose of finding similarity between them. In this case just linking these communicative actions by a rhetoric relation and not providing information of communicative discourse would be too limited way to represent a structure of what and how is being communicated. A requirement for an RR pair to have the same or coordinated rhetoric relation is too weak, so an agreement of CDT labels for arcs on top of matching nodes is required.

The straight edges of this graph are syntactic relations, and curvy arcs are discourse relations, such as anaphora, same entity, sub-entity, rhetoric relation and communicative actions. This graph includes much richer information than just a combination of parse trees for individual sentences. In addition to CDTs, parse thickets can be generalized at the level of words, relations, phrases and sentences. The speech actions are logic predicates expressing the agents involved in the respective speech acts and their subjects. The arguments of logical predicates are formed in accordance to respective semantic roles, as proposed by a framework such as VerbNet. See Karin Kipper, Anna Korhonen, Neville Ryant, Martha Palmer, A Large-scale Classification of English Verbs, Language Resources and Evaluation Journal, 42(1), pp. 21-40, Springer Netherland, 2008. and/or Karin Kipper Schuler, Anna Korhonen, Susan W. Brown, VerbNet overview, extensions, mappings and apps, Tutorial, NAACL-HLT 2009, Boulder, Colo.

Figure 12:
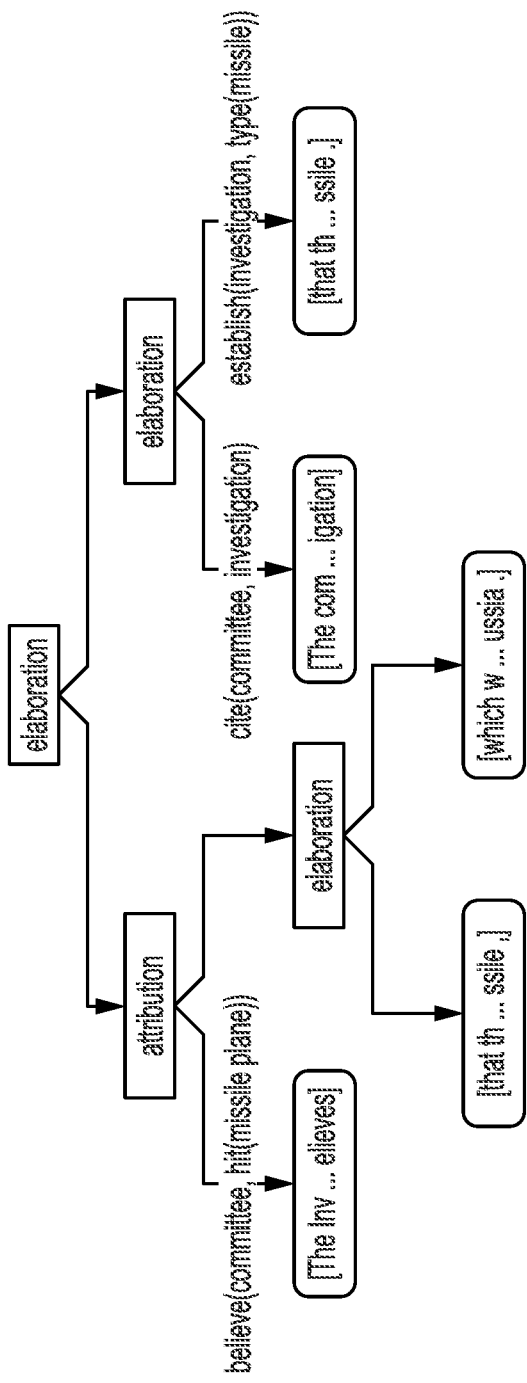
FIG. 12 illustrates a communicative discourse tree for a claim of a second agent in accordance with an aspect.

FIG. 12 illustrates a communicative discourse tree for a claim of a second agent in accordance with an aspect. FIG. 12 depicts communicative discourse tree 1200, which represents the following text: "The Investigative Committee of the Russian Federation believes that the plane was hit by a missile, which was not produced in Russia. The committee cites an investigation that established the type of the missile."

Figure 13:
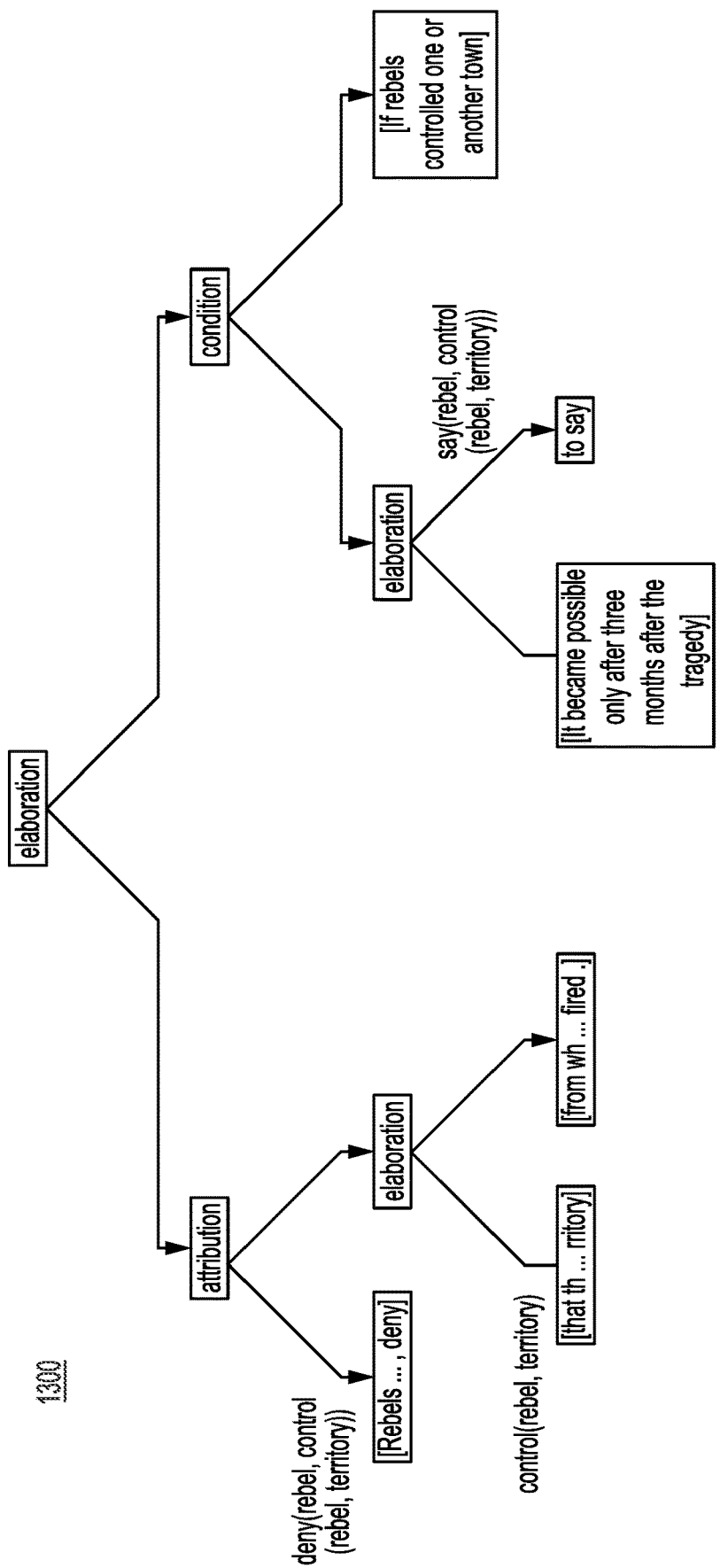
FIG. 13 illustrates a communicative discourse tree for a claim of a third agent in accordance with an aspect.

FIG. 13 illustrates a communicative discourse tree for a claim of a third agent in accordance with an aspect. FIG. 13 depicts communicative discourse tree 1300, which represents the following text: "Rebels, the self-proclaimed Donetsk People's Republic, deny that they controlled the territory from which the missile was allegedly fired. It became possible only after three months after the tragedy to say if rebels controlled one or another town."

As can be seen from communicative discourse trees 1100-1300, a response is not arbitrary. A response talks about the same entities as the original text. For example, communicative discourse trees 1200 and 1300 are related to communicative discourse tree 1100. A response backs up a disagreement with estimates and sentiments about these entities, and about actions of these entities.

More specifically, replies of involved agent need to reflect the communicative discourse of the first, seed message. As a simple observation, because the first agent uses Attribution to communicate his claims, the other agents have to follow the suite and either provide their own attributions or attack the validity of attribution of the proponent, or both. To capture a broad variety of features for how communicative structure of the seed message needs to be retained in consecutive messages, pairs of respective CDTs can be learned.

To verify the agreement of a request-response, discourse relations or speech acts (communicative actions) alone are often insufficient. As can be seen from the example depicted in FIGS. 11-13, the discourse structure of interactions between agents and the kind of interactions are useful. However, the domain of interaction (e.g., military conflicts or politics) or the subjects of these interactions, i.e., the entities, do not need to be analyzed.

Representing Rhetoric Relations and Communicative Actions

In order to compute similarity between abstract structures, two approaches are frequently used: (1) representing these structures in a numerical space, and express similarity as a number, which is a statistical learning approach, or (2) using a structural representation, without numerical space, such as trees and graphs, and expressing similarity as a maximal common sub-structure. Expressing similarity as a maximal common sub-structure is referred to as generalization.

Learning communicative actions helps express and understand arguments. Computational verb lexicons help support acquisition of entities for actions and provide a rule-based form to express their meanings. Verbs express the semantics of an event being described as well as the relational information among participants in that event, and project the syntactic structures that encode that information. Verbs, and in particular communicative action verbs, can be highly variable and can display a rich range of semantic behaviors. In response, verb classification helps a learning systems to deal with this complexity by organizing verbs into groups that share core semantic properties.

VerbNet is one such lexicon, which identifies semantic roles and syntactic patterns characteristic of the verbs in each class and makes explicit the connections between the syntactic patterns and the underlying semantic relations that can be inferred for all members of the class. See Karin Kipper, Anna Korhonen, Neville Ryant and Martha Palmer, *Language Resources and Evaluation*, Vol. 42, No. 1 (March 2008), at 21. Each syntactic frame, or verb signature, for a class has a corresponding semantic representation that details the semantic relations between event participants across the course of the event.

For example, the verb amuse is part of a cluster of similar verbs that have a similar structure of arguments (semantic roles) such as amaze, anger, arouse, disturb, and irritate. The roles of the arguments of these communicative actions are as follows: Experiencer (usually, an animate entity), Stimulus, and Result. Each verb can have classes of meanings differentiated by syntactic features for how this verb occurs in a sentence, or frames. For example, the frames for amuse are as follows, using the following key noun phrase (NP), noun (N), communicative action (V), verb phrase (VP), adverb (ADV):

NP V NP. Example: "The teacher amused the children." Syntax: Stimulus V Experiencer. Clause: amuse(Stimulus, E, Emotion, Experiencer), cause(Stimulus, E), emotional_state(result(E), Emotion, Experiencer).

NP V ADV-Middle. Example: "Small children amuse quickly." Syntax: Experiencer V ADV. Clause: amuse(Experiencer, Prop):-, property(Experiencer, Prop), adv(Prop).

NP V NP-PRO-ARB. Example "The teacher amused." Syntax Stimulus V. amuse(Stimulus, E, Emotion, Experiencer):. cause(Stimulus, E), emotional_state(result(E), Emotion, Experiencer).

NP.cause V NP. Example "The teacher's dolls amused the children." syntax Stimulus <+genitive> ('s) V Experiencer. amuse(Stimulus, E, Emotion, Experiencer):. cause(Stimulus, E), emotional_state(during(E), Emotion, Experiencer).

NP V NP ADJ. Example "This performance bored me totally." syntax Stimulus V Experiencer Result. amuse(Stimulus, E, Emotion, Experiencer). cause(Stimulus, E), emotional_state(result(E), Emotion, Experiencer), Pred(result(E), Experiencer).

Communicative actions can be characterized into clusters, for example:
Verbs with Predicative Complements (Appoint, characterize, dub, declare, conjecture, masquerade, orphan, captain, consider, classify), Verbs of Perception (See, sight, peer). Verbs of Psychological State (Amuse, admire, marvel, appeal), Verbs of Desire (Want, long).
Judgment Verbs (Judgment), Verbs of Assessment (Assess, estimate), Verbs of Searching (Hunt, search, stalk, investigate, rummage, ferret), Verbs of Social Interaction (Correspond, marry, meet, battle), Verbs of Communication (Transfer(message), inquire, interrogate, tell, manner(speaking), talk, chat, say, complain, advise, confess, lecture, overstate, promise). Avoid Verbs (Avoid), Measure Verbs, (Register, cost, fit, price, bill), Aspectual Verbs (Begin, complete, continue, stop, establish, sustain.

Aspects described herein provide advantages over statistical learning models. In contrast to statistical solutions, aspects use a classification system can provide a verb or a verb-like structure which is determined to cause the target feature (such as rhetoric agreement). For example, statistical machine learning models express similarity as a number, which can make interpretation difficult.

Representing Request-Response Pairs

Representing request-response pairs facilitates classification based operations based on a pair. In an example, request-response pairs can be represented as parse thickets. A parse thicket is a representation of parse trees for two or more sentences with discourse-level relationships between words and parts of the sentence in one graph. See Galitsky (2015). Topical similarity between question and answer can expressed as common sub-graphs of parse thickets. The higher the number of common graph nodes, the higher the similarity.

Figure 14:
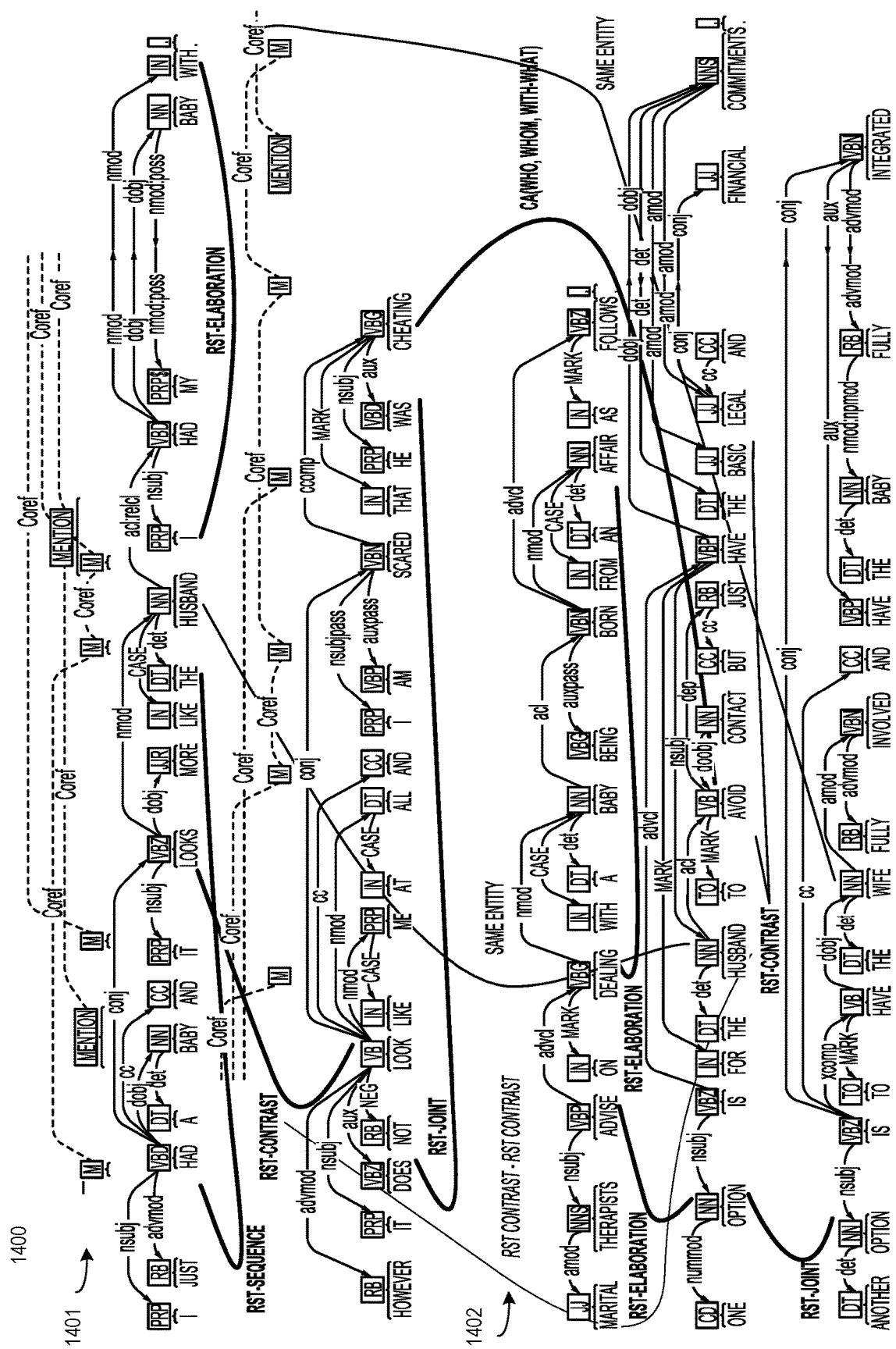
FIG. 14 illustrates parse thickets in accordance with an aspect.

FIG. 14 illustrates parse thickets in accordance with an aspect. FIG. 14 depicts parse thicket 1400 including a parse tree 1401, and a parse tree for a corresponding response 1402.

Parse tree 1401 represents the question "I just had a baby and it looks more like the husband I had my baby with. However it does not look like me at all and I am scared that he was cheating on me with another lady and I had her kid. This child is the best thing that has ever happened to me and I cannot imagine giving my baby to the real mom."

Response 1402 represents the response "Marital therapists advise on dealing with a child being born from an affair as follows. One option is for the husband to avoid contact but just have the basic legal and financial commitments. Another option is to have the wife fully involved and have the baby fully integrated into the family just like a child from a previous marriage."

FIG. 14 represents a greedy approach to representing linguistic information about a paragraph of text. The straight edges of this graph are syntactic relations, and curvy arcs are discourse relations, such as anaphora, same entity, sub-entity, rhetoric relation and communicative actions. The solid arcs are for same entity/sub-entity/anaphora relations, and the dotted arcs are for rhetoric relations and communicative actions. Oval labels in straight edges denote the syntactic relations. Lemmas are written in the boxes for the nodes, and lemma forms are written on the right side of the nodes.

Parse thicket 1400 includes much richer information than just a combination of parse trees for individual sentences. Navigation through this graph along the edges for syntactic relations as well as arcs for discourse relations allows to transform a given parse thicket into semantically equivalent forms for matching with other parse thickets, performing a text similarity assessment task. To form a complete formal representation of a paragraph, as many links as possible are expressed. Each of the discourse arcs produces a pair of thicket phrases that can be a potential match.

Topical similarity between the seed (request) and response is expressed as common sub-graphs of parse thickets. They are visualized as connected clouds. The higher the number of common graph nodes, the higher the similarity. For rhetoric agreement, common sub-graph does not have to be large as it is in the given text. However, rhetoric relations and communicative actions of the seed and response are correlated and a correspondence is required.

Generalization for Communicative Actions

A similarity between two communicative actions $A_1$ and $A_2$ is defined as a an abstract verb which possesses the features which are common between $A_1$ and $A_2$. Defining a similarity of two verbs as an abstract verb-like structure supports inductive learning tasks, such as a rhetoric agreement assessment. In an example, a similarity between the following two common verbs, agree and disagree, can be generalized as follows: agree^disagree=verb(Interlocutor, Proposed_action, Speaker), where Interlocution is the person who proposed the Proposed_action to the Speaker and to whom the Speaker communicates their response. Proposed_action is an action that the Speaker would perform if they were to accept or refuse the request or offer, and The Speaker is the person to whom a particular action has been proposed and who responds to the request or offer made.

In a further example, a similarity between verbs agree and explain is represented as follows: agree^explain=verb(Interlocutor, *, Speaker). The subjects of communicative actions are generalized in the context of communicative actions and are not be generalized with other "physical" actions. Hence, aspects generalize individual occurrences of communicative actions together with corresponding subjects.

Additionally, sequences of communicative actions representing dialogs can be compared against other such sequences of similar dialogs. In this manner, the meaning of an individual communicative action as well as the dynamic discourse structure of a dialogue is (in contrast to its static structure reflected via rhetoric relations) is represented. A generalization is a compound structural representation that happens at each level. Lemma of a communicative action is generalized with lemma, and its semantic role are generalized with respective semantic role.

Communicative actions are used by text authors to indicate a structure of a dialogue or a conflict. See Searle, J. R. 1969, Speech acts: an essay in the philosophy of language. London: Cambridge University Press. Subjects are generalized in the context of these actions and are not generalized with other "physical" actions. Hence, the individual occurrences of communicative actions together are generalized with their subjects, as well as their pairs, as discourse "steps."

Generalization of communicative actions can also be thought of from the standpoint of matching the verb frames, such as VerbNet. The communicative links reflect the discourse structure associated with participation (or mentioning) of more than a single agent in the text. The links form a sequence connecting the words for communicative actions (either verbs or multi-words implicitly indicating a communicative intent of a person).

Communicative actions include an actor, one or more agents being acted upon, and the phrase describing the features of this action. A communicative action can be described as a function of the form: verb (agent, subject, cause), where verb characterizes some type of interaction between involved agents (e.g., explain, confirm, remind, disagree, deny, etc.), subject refers to the information transmitted or object described, and cause refers to the motivation or explanation for the subject.

A scenario (labeled directed graph) is a sub-graph of a parse thicket G=(V, A), where V={action$_1$, action$_2$ . . . action$_n$} is a finite set of vertices corresponding to communicative actions, and A is a finite set of labeled arcs (ordered pairs of vertices), classified as follows:

Each arc action$_i$, action$_j \in A_{sequence}$ corresponds to a temporal precedence of two actions $v_i$, $ag_i$, $s_i$, $c_i$ and $v_j$, $ag_j$, $s_j$, $c_j$ that refer to the same subject, e.g., $s_j=s_i$ or different subjects. Each arc action$_i$, action$_j \in A_{cause}$ corresponds to an attack relationship between action$_i$ and action$_j$ indicating that the cause of action$_i$ in conflict with the subject or cause of action$_j$.

Subgraphs of parse thickets associated with scenarios of interaction between agents have some distinguishing features. For example, (1) all vertices are ordered in time, so that there is one incoming arc and one outgoing arc for all vertices (except the initial and terminal vertices), (2) for $A_{sequence}$ arcs, at most one incoming and only one outgoing arc are admissible, and (3) for $A_{cause}$ arcs, there can be many outgoing arcs from a given vertex, as well as many incoming arcs. The vertices involved may be associated with different agents or with the same agent (i.e., when he contradicts himself). To compute similarities between parse thickets and their communicative action, induced subgraphs, the subgraphs of the same configuration with similar labels of arcs and strict correspondence of vertices are analyzed.

The following similarities exist by analyzing the arcs of the communicative actions of a parse thicket: (1) one communicative action from with its subject from T1 against another communicative action with its subject from T2 (communicative action arc is not used), and (2) a pair of communicative actions with their subjects from T1 compared to another pair of communicative actions from T2 (communicative action arcs are used).

Generalizing two different communicative actions is based on their attributes. See (Galitsky et al 2013). As can be seen in the example discussed with respect to FIG. 14, one communicative action from T1, cheating(husband, wife, another lady) can be compared with a second from T2, avoid(husband, contact(husband, another lady)). A generalization results in communicative_action(husband, *) which introduces a constraint on A in the form that if a given agent (=husband) is mentioned as a subject of CA in Q, he(she) should also be a subject of (possibly, another) CA in A. Two communicative actions can always be generalized, which is not the case for their subjects: if their generalization result is empty, the generalization result of communicative actions with these subjects is also empty.

Generalization of RST Relations

Some relations between discourse trees can be generalized, such as arcs that represent the same type of relation (presentation relation, such as antithesis, subject matter relation, such as condition, and multinuclear relation, such as list) can be generalized. A nucleus or a situation presented by a nucleus is indicated by "N." Satellite or situations presented by a satellite, are indicated by "S." "W" indicates a writer. "R" indicates a reader (hearer). Situations are propositions, completed actions or actions in progress, and communicative actions and states (including beliefs, desires, approve, explain, reconcile and others). Generalization of two RST relations with the above parameters is expressed as:

$$rst1(N1,S1,W1,R1)\hat{}\,rst2(N2,S2,W2,R2)=(rst1\hat{}\,rst2)$$
$$(N1\hat{}\,N2,S1\hat{}\,S2,W1\hat{}\,W2,R1\hat{}\,R2).$$

The texts in N1, S1, W1, R1 are subject to generalization as phrases. For example, rst1^rst2 can be generalized as follows: (1) if relation_type(rst1)!=relation_type(rst2) then a generalization is empty. (2) Otherwise, the signatures of rhetoric relations are generalized as sentences: sentence(N1, S1, W1, R1)^sentence(N2, S2, W2, R2). See Iruskieta, Mikel, Iria da Cunha and Maite Taboada. A qualitative comparison method for rhetorical structures: identifying different discourse structures in multilingual corpora. Lang Resources & Evaluation. June 2015, Volume 49, Issue 2.

For example, the meaning of rst-background^rst-enablement=(S increases the ability of R to comprehend an element in N)^(R comprehending S increases the ability of R to perform the action in N)=increase-VB the-DT ability-NN of-IN R-NN to-IN.

Because the relations rst-background^rst-enablement differ, the RST relation part is empty. The expressions that are the verbal definitions of respective RST relations are then generalized. For example, for each word or a placeholder for a word such as an agent, this word (with its POS) is retained if the word the same in each input phrase or remove the word if the word is different between these phrases. The resultant expression can be interpreted as a common meaning between the definitions of two different RST relations, obtained formally.

Two arcs between the question and the answer depicted in FIG. 14 show the generalization instance based on the RST relation "RST-contrast". For example, "I just had a baby" is a RST-contrast with "it does not look like me," and related to "husband to avoid contact" which is a RST-contrast with "have the basic legal and financial commitments." As can be seen, the answer need not have to be similar to the verb phrase of the question but the rhetoric structure of the question and answer are similar. Not all phrases in the answer must match phrases in question. For example, the phrases that do not match have certain rhetoric relations with the phrases in the answer which are relevant to phrases in question.

Building a Communicative Discourse Tree

Figure 15:
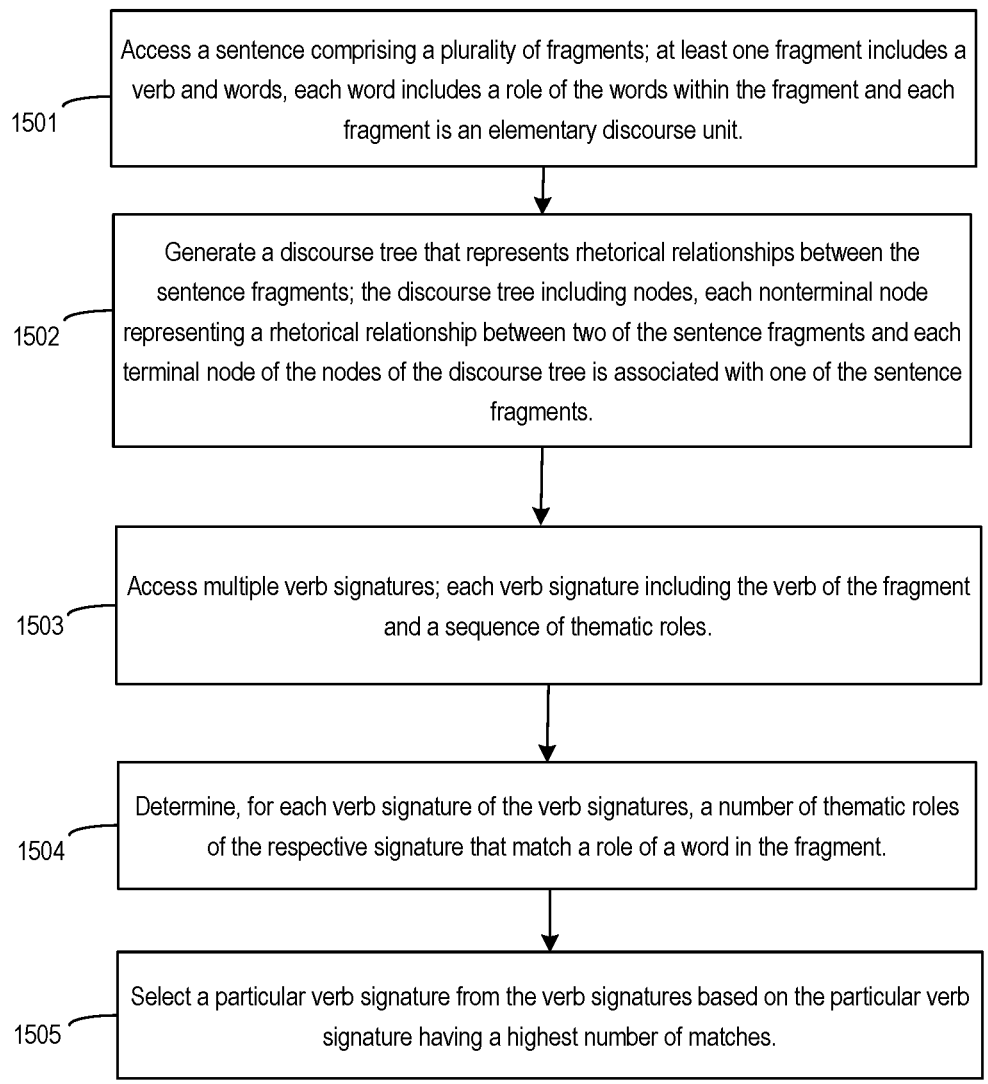
FIG. 15 illustrates an exemplary process for building a communicative discourse tree in accordance with an aspect.

FIG. 15 illustrates an exemplary process for building a communicative discourse tree in accordance with an aspect. Rhetoric agreement application 112 can implement process 1500. As discussed, communicative discourse trees enable improved search engine results.

At block 1501, process 1500 involves accessing a sentence comprising fragments. At least one fragment includes a verb and words and each word includes a role of the words within the fragment, and each fragment is an elementary discourse unit. For example, rhetoric agreement application 112 accesses a sentence such as "Rebels, the self-proclaimed Donetsk People's Republic, deny that they controlled the territory from which the missile was allegedly fired" as described with respect to FIG. 13.

Continuing the example, rhetoric agreement application 112 determines that the sentence includes several fragments. For example, a first fragment is "rebels . . . deny." A second fragment is "that they controlled the territory." A third fragment is "from which the missile was allegedly fired." Each fragment includes a verb, for example, "deny" for the first fragment and "controlled" for the second fragment. Although, a fragment need not include a verb.

At block 1502, process 1500 involves generating a discourse tree that represents rhetorical relationships between the sentence fragments. The discourse tree including nodes, each nonterminal node representing a rhetorical relationship between two of the sentence fragments and each terminal node of the nodes of the discourse tree is associated with one of the sentence fragments.

Continuing the example, rhetoric agreement application 112 generates a discourse tree as shown in FIG. 13. For example, the third fragment, "from which the missile was allegedly fired" elaborates on "that they controlled the territory." The second and third fragments together relate to attribution of what happened, i.e., the attack cannot have been the rebels because they do not control the territory.

At block 1503, process 1500 involves accessing multiple verb signatures. For example, rhetoric agreement application 112 accesses a list of verbs, e.g., from VerbNet. Each verb matches or is related to the verb of the fragment. For example, the for the first fragment, the verb is "deny." Accordingly, rhetoric agreement application 112 accesses a list of verb signatures that relate to the verb deny.

As discussed, each verb signature includes the verb of the fragment and one or more of thematic roles. For example, a signature includes one or more of noun phrase (NP), noun (N), communicative action (V), verb phrase (VP), or adverb (ADV). The thematic roles describing the relationship between the verb and related words. For example "the teacher amused the children" has a different signature from "small children amuse quickly." For the first fragment, the verb "deny," rhetoric agreement application 112 accesses a list of frames, or verb signatures for verbs that match "deny." The list is "NP V NP to be NP," "NP V that S" and "NP V NP."

Each verb signature includes thematic roles. A thematic role refers to the role of the verb in the sentence fragment. Rhetoric agreement application 112 determines the thematic roles in each verb signature. Example thematic roles include actor, agent, asset, attribute, beneficiary, cause, location destination source, destination, source, location, experiencer, extent, instrument, material and product, material, product, patient, predicate, recipient, stimulus, theme, time, or topic. [0186] At block 1504, process 1500 involves determining, for each verb signature of the verb signatures, a number of thematic roles of the respective signature that match a role of a word in the fragment. For the first fragment, rhetorical agreement application 112 determines that the verb "deny" has only three roles, "agent", "verb" and "theme."

At block 1505, process 1500 involves selecting a particular verb signature from the verb signatures based on the particular verb signature having a highest number of matches. For example, referring again to FIG. 13, deny in the first fragment "the rebels deny . . . that they control the territory" is matched to verb signature deny "NP V NP", and "control" is matched to control (rebel, territory). Verb signatures are nested, resulting in a nested signature of "deny (rebel, control(rebel, territory))."

Imaginary Discourse Trees

Certain aspects described herein use imaginary discourse trees to improve question-answering (Q/A) recall for complex, multi-sentence, convergent questions. By augmenting a discourse tree of an answer with tree fragments obtained from ontologies, aspects obtain a canonical discourse representation of an answer that is independent of a thought structure of a given author.

As discussed, discourse trees (DTs) can represent how text is organized, in particular, with a paragraph of text. Discourse-level analysis can be used in a number of natural language processing tasks where learning linguistic structures may be essential. DTs outline the relationship between entities. There are different manners in which entities and associated attributes are introduced within text. Not all rhetoric relations that exist between these entities occur in a DT of a given paragraph. For example, a rhetoric relation between two entities may be outside the DT of the given paragraph, in another body of text.

Therefore, to completely relate questions and answers to each other, a more complete discourse tree for an answer is desired. Such a discourse tree would include all rhetoric relations between involved entities. To accomplish this, an initial, or best-match discourse tree of an answer that at least partially addresses a question is augmented with certain rhetoric relations that are identified as missing in the answer.

These missing rhetoric relations can be obtained from text corpora or from searching external databases such as the Internet. Hence, instead of relying on an ontology which would have definitions of entities missing in a candidate answer, aspects mine for the rhetoric relations between these entities online. This procedure avoids a need to build an ontology and can be implemented on top of a conventional search engine.

More specifically, a baseline requirement for an answer A to be relevant to a question Q is that entities (En) of A cover the entities of Q: E-Q⊆E-A. Naturally, some answer entities E-A are not explicitly mentioned in Q, but are needed to provide a complete answer A. Accordingly, the logical flow of Q by A can be analyzed. But because establishing relations between En can be challenging, an approximate logical flow of Q and A can be modeled, expressible in domain-independent terms EnDT-Q~EnDT-A, and later verified and/or augmented.

Different deficiencies can exist in initial answers used to answer a question. For example, one case is that some entities E are not explicitly mentioned in Q, but instead, are assumed. Another case is when some entities in A used to answer Q do not occur in A, but instead, more specific entities or more general entities occur in A. To determine that some more specific entities are indeed addressing issues from Q, an some external or additional source, referred to herein as an imaginary EnDT-A, can be used to establish these relationships. This source contains the information on inter-relationships between En which is omitted in Q and/or A, but is assumed to be known by the peer. Therefore, for a computer-implemented system, the following knowledge is desired at the discourse level:

EnDT-$Q$~EnDT-$A$+imaginary EnDT-$A$.

For discussion purposes, the following examples are introduced. A first example is the question "What is an advantage of electric car?" with corresponding answer "No need to for gas." To establish that a particular answer is suitable for a particular question, general-sense entity advantage and regular noun entity car are used. More specifically, explicit entities in A {need, gas} are linked. Fragments of a possible imaginary EnDT-A are shown: [ . . . No need . . . -Elaborate-Advantage] . . . [gas-Enablement-engine] . . . [engine-Enablement-car]. Only evidence that these rhetorical links exist is needed.

In a second example, an imaginary discourse tree is used to improve a search. A user asks an autonomous agent for information regarding "a faulty brake switch can affect the automatic transmission Munro." Existing search engines may identify certain keywords that were not found in a given search result. However, it is possible to indicate how these keywords are relevant to the search result by finding documents where these unidentified keywords are rhetorically connected with the ones occurring in the query. This feature would naturally improve the answer relevance on one hand and provide explainability for the user on how her keywords are addressed in the answer.

Figure 16:
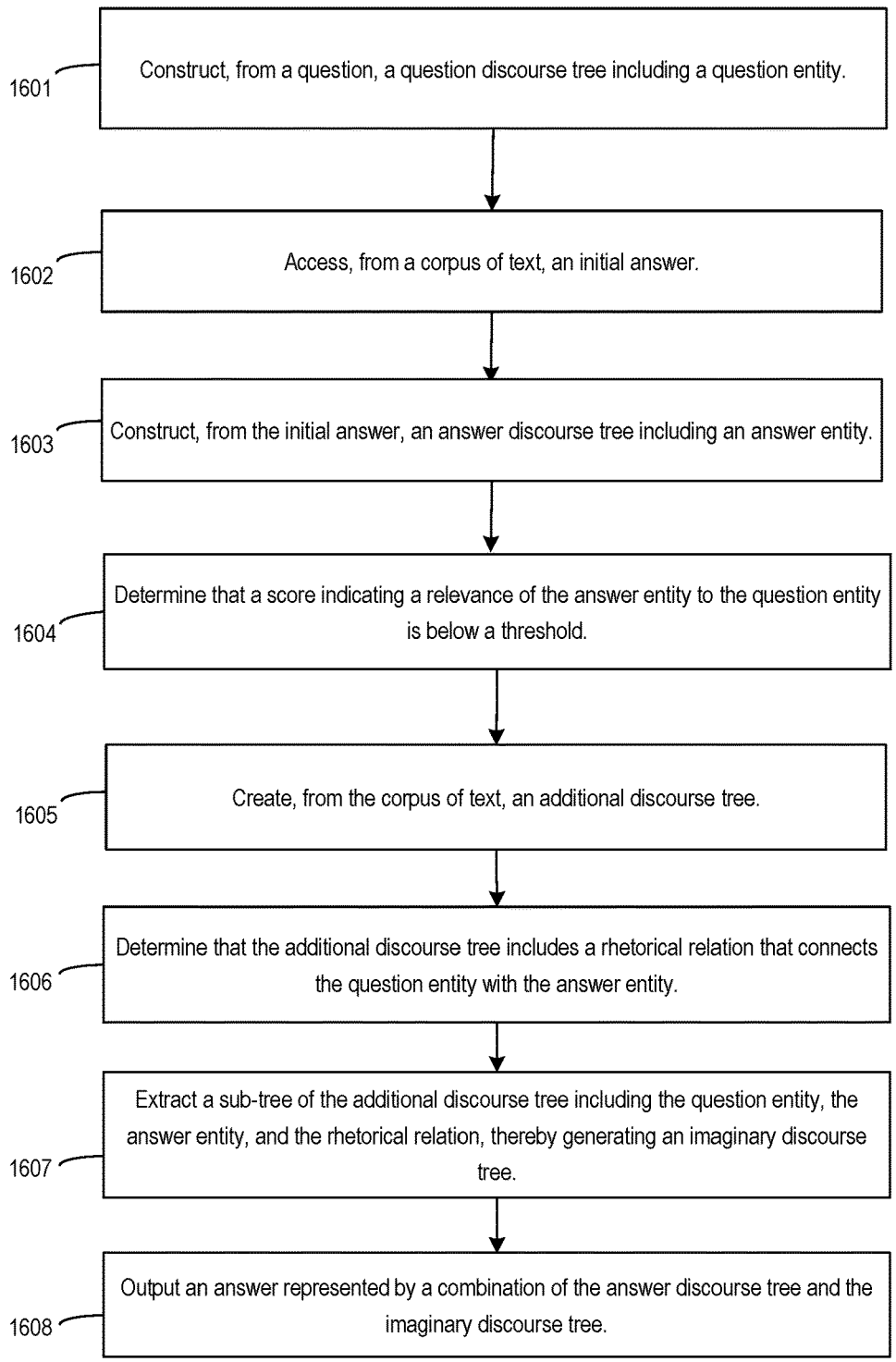
FIG. 16 illustrates an exemplary process for building an imaginary discourse tree in accordance with an aspect.

Imaginary discourse trees can enable a search engine to explain missing keywords in the search results. In the default search, munro is missing. However, by trying to rhetorically connect munro with the entities in the question, autonomous agent application 102 learns that Munro is a person who is an inventor of automatic transmission. FIG. 16 depicts an example process that can be used by autonomous agent application 102.

FIG. 16 illustrates an exemplary process 1600 for building an imaginary discourse tree in accordance with an aspect. Autonomous agent application 102 can implement process 1600. Process 1600 explains how an improved match between a question and an answer is facilitated by discourse trees (DTs). For example, to verify that an answer A (or an initial answer) is appropriate for a given question Q, autonomous agent application 102 verifies that DT-A and DT-Q agree, then optionally augments the DT-A with fragments of other DTs to ensure all entities in Q are addressed in augmented DT-A. For discussion purposes, process 1600 is discussed with respect to FIG. 17.

Figure 17:
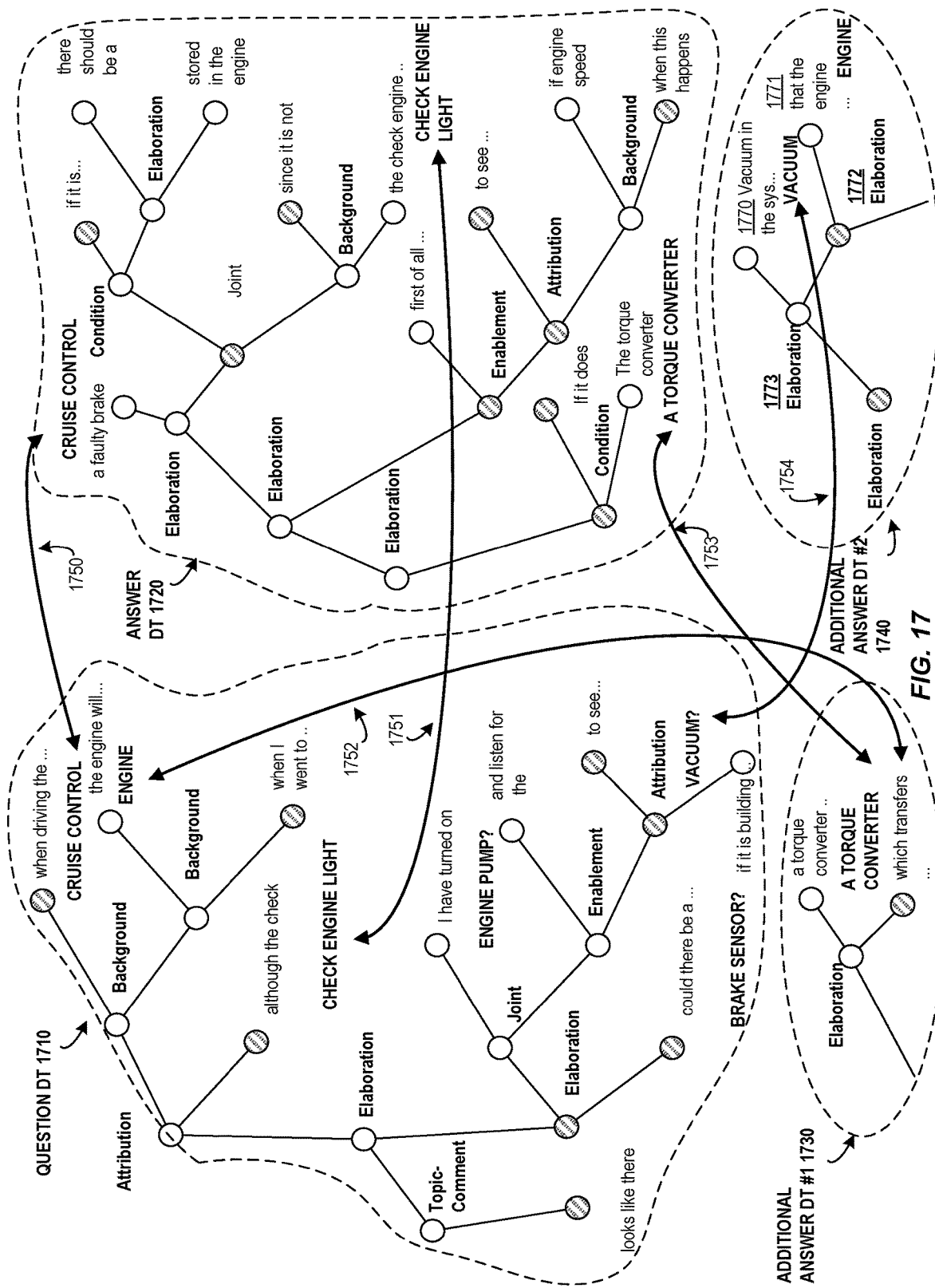
FIG. 17 depicts example discourse trees of a question, an answer, and two imaginary discourse trees in accordance with an aspect.

FIG. 17 depicts example discourse trees of a question, an answer, and two imaginary discourse trees in accordance with an aspect. FIG. 17 depicts question discourse tree 1710, answer discourse tree 1720, additional answer discourse tree 1730, additional answer discourse tree 1740, links 1750-1754, and nodes 1170-1174.

Question discourse tree 1710 is formed from the following question: "[When driving the cruise control] [the engine will turn off] [when I want to accelerate,][although the check engine light was off.] [I have turned on the ignition][and listen for the engine pump running][to see][if it is building up vacuum.] [Could there be a problem with the brake sensor under the dash?] [Looks like there could be a little play in the plug.]." For discussion purposes, the square brackets [ ] indicate elementary discourse units.

Returning to FIG. 16, at block 1601, process 1600 involves constructing, from a question, a question discourse tree (DT-Q). The question can include fragments (or elementary discourse units). Each of the words indicate a role of the respective within the fragment.

Autonomous agent application 102 generates a question discourse tree. The question discourse tree represents rhetorical relationships between the fragments and includes nodes. Each nonterminal node represents a rhetorical relationship between two of the fragments. Each terminal node of the nodes of the discourse tree is associated with one of the fragments.

The question discourse tree can include one or more question entities. Autonomous agent application 102 can identify these entities. As can be seen in FIG. 17, the question contains entities such as "CRUISE CONTROL," "CHECK ENGINE LIGHT," "ENGINE PUMP." "VACUUM," "BRAKE SENSOR." As later discussed, some of these entities are addressed by the answer and some are not.

At block 1602, process 1600 accessing, from a corpus of text, an initial answer. An initial answer can be obtained from existing documents such as files or databases. Initial answers can also be obtained via searching a local or external system. For example, autonomous agent application 102 can obtain an additional set of answers by submitting a search query. The search query can be derived from the question, for example, formulated by one or more keywords identified in the question. Autonomous agent application 102 can determine a relevance score for each of the plurality of answers. The answer score, or rank, indicates a level of match between the question and the respective answer. Autonomous agent application 102 selects an answer having a score that is above a threshold as the initial answer.

Continuing the example, autonomous agent application 102 accesses the following initial answer "[A faulty brake switch can affect the cruise control.] [If it is,][there should be a code][stored in the engine control module.] [Since it is not an emissions fault,][the check engine light will not illuminate.] [First of all, watch the tachometer][to see][if engine speed increases 200 rpm][when this happens.] [If it does,][the torque converter is unlocking transmission.]"

At block 1603, process 1600 involves constructing, from the initial answer, an answer discourse tree including an answer entity. Autonomous agent application 102 forms a discourse tree for the initial answer. At block 1603, autonomous agent application 102 performs similar steps as described with respect to block 1601.

Continuing the example, autonomous agent application 102 generates answer discourse tree 1720, which represents the text that is the initial answer to the question. Answer discourse tree 1720 includes some of the question entities, specifically "CRUISE CONTROL," "CHECK ENGINE LIGHT," and "TORQUE CONVERTER."

At block 1604, process 1600 involves determining, using the computing device, that a score indicating a relevance of the answer entity to the question entity is below a threshold. Entities in the question Q may be addressed (e.g., by one or more entities in the answer) or unaddressed, i.e., no entity in the answer A addresses the particular entity. Unaddressed entities in the question are indicated by $E_0$.

Different methods can be used to determine how relevant a particular answer entity is to a particular question entity. For example, in one aspect, autonomous agent application 102 can determine whether an exact text match of a question entity appears in the answer entities. In other cases, the autonomous agent application 102 can determine a score that indicates a proportion of keywords of the question entity appear in the answer entity.

Different reasons can exist for an entity being unaddressed. As depicted, $E_0$-Q includes {ENGINE PUMP, BRAKE SENSOR, and VACUUM}. For example, either the answer A is not fully relevant to the question Q in that the answer omits some of the entities $E_0$. Alternatively, the answer uses different entities instead. $E_0$-Q are possibly ignored in the answer A. To verify the latter possibility, background knowledge is used to find entities $E_{img}$ that are linked to both $E_0$-Q and E-A.

For example, it may be unclear how E-A=TORQUE CONVERTER is connected to Q. To verify this connection, a fragment of text from Wikipedia about Torque Convertor is obtained, and DT-$A_{img1}$ (1730) is built. Aspects can determine that the torque converter is connected with the engine via rhetoric relation of elaboration.

Hence, E-A=Torque Convertor is indeed relevant for the question as shown by a vertical blue arc. Such a determination can be made without building an offline ontology linking entities and learning relations between them. Instead, discourse-level context is used to confirm that A includes relevant entities.

Continuing the example, autonomous agent application 102 determines that other entities in question discourse tree 1710, specifically, those that refer to "ENGINE PUMP." "VACUUM," "BRAKE SENSOR," and "TORQUE CONVERTER" are not addressed in answer discourse tree 1720.

Accordingly, these correspondences between E-Q and E-A are illustrated by links 1750 and 1751 respectively.

At block 1605, process 1600 involves creating, from the corpus of text, an additional discourse tree. The additional discourse tree is created from text. In some cases, autonomous agent application 102 selects an appropriate text from one or more texts according to a scoring mechanism.

For example, autonomous agent application 102 can access a set of additional answers. Autonomous agent application 102 can generate a set of additional imaginary discourse trees. Each of the additional discourse trees correspond to a respective additional answer. Autonomous agent application 102 calculates, for each of the additional discourse trees, a score that indicates a number of question entities that include a mapping to one or more answer entities in the respective additional discourse tree. Autonomous agent application 102 selects an additional discourse tree with a highest score from the set of additional discourse trees. Search relevance is then measured as the inverse number of unaddressed E0-Q once DT-A is augmented with imaginary DT-Aimg.

For example, autonomous agent application 102 obtains a set of candidate $A_s$. Then, for each candidate Ac in As, autonomous agent application 102 performs the following operations:

(a) Build DT-$A_c$;
(b) Establish mapping E-Q→E-$A_c$;
(c) Identify $E_0$-Q;
(d) Form queries from $E_0$-Q and $E_0$-Ac (entities which are not in $E_0$-Q);
(e) Obtain search results from B for queries d) and build imaginary DTs-$A_c$; and
(f) calculate the score $|E_0|$ remaining.

The autonomous agent application 102 then can select the A with the best score.

In some cases, a machine learning approach can be used to classify <EDT-Q, EDT-A> pair as correct or incorrect. An example training set includes good (positive) Q/A pairs and bad (negative) Q/A pairs. Therefore a DT-kernel learning approach (SVM TK, Joty and Moschitti 2014, Galitsky 2017) is selected, which applies SVM learning to a set of all sub-DTs of the DT for Q/A pair. A tree kernel family of approaches is not very sensitive to errors in parsing (syntactic and rhetoric) because erroneous sub-trees are mostly random and will unlikely be common among different elements of a training set.

An DT can be represented by a vector V of integer counts of each sub-tree type (without taking into account its ancestors):

V(T)=(number of subtrees of type 1, . . . ).

Given two tree segments $DT_1$ and $DT_2$, the tree kernel function $K(EDT_1, EDT_2) \leq V(EDT_1)$ and $V(EDT_2) = \Sigma_i V(EDT_1)[i]$, $V(EDT_2)[i] = \Sigma_{n1} \Sigma_{n2} \Sigma_i I_i * I_i(n_2)$ where $n_1 \in N_1$, $n_2 \in N_2$, where $N_1$ and $N_2$ are the sets of all nodes in $DT_1$ and $DT_2$, respectively.

$I_i(n)$ is the indicator function.
$I_i(n)=\{1$ off a subtree of type i occurs with a root at node; 0 otherwise}.

Continuing the example, it is unclear how the E-Q "ENGINE PUMP" from the question is addressed in the initial answer. Hence, autonomous agent application 102 can determine additional resources that can address the ENGINE PUMP entity.

At block 1606, process 1600 involves determining that the additional discourse tree comprises a rhetorical relation that connects the question entity with the answer entity. Continuing the example, as depicted in FIG. 17, node 1770 identifies entity "VACUUM" and node 1171 identifies entity "ENGINE." Therefore, nodes 1172 and 1173, both of which represent a rhetorical relation "elaboration," relate nodes 1170 and 1171. In this manner, nodes 1172 and 1773 provide the missing link between "ENGINE," which is in the question, and "VACUUM" which is in the question but not previously addressed.

Autonomous agent application 102 connects the additional discourse tree to E-A. As shown, DT-$A_{img2}$ connects VACUUM and ENGINE via elaboration. Hence the combined DT-A includes real DT-A plus DT-$A_{img1}$ and DT-$A_{img2}$. Both real and imaginary DTs are necessary to demonstrate that an answer is relevant by employing background knowledge in a domain independent manner.

At block 1607, process 1600 involves extracting a sub-tree of the additional discourse tree comprising the question entity, the answer entity, and the rhetorical relation, thereby generating an imaginary discourse tree. In some cases, the autonomous agent application 102 can extract a sub-tree, or a portion of the additional discourse tree that relates the question entity with the answer entity. The sub-tree includes at least one node. In some cases, autonomous agent application 102 can integrate the sub-tree from the imaginary discourse tree into the answer discourse tree by connecting the node to the answer entity or another entity.

At block 1608, process 1600 involves outputting an answer represented by a combination of the answer discourse tree and the imaginary discourse tree. The autonomous agent application 102 can combine the sub-tree identified at block 1607 with the answer discourse tree. The autonomous agent application 102 can then output an answer that corresponds to the combined tree.

Experimental Results

Traditional Q/A datasets for factoid and non-factoid questions, as well as SemEval and neural Q/A evaluations are not suitable since the questions are sorted and not as complicated to observe a potential contribution of discourse-level analysis. For evaluation, two convergent Q/A sets are formed:

1. Yahoo! Answer (Webscope 2017) set of question-answer pairs with broad topics. Out of the set of 140 k user questions 3300 are selected, which included three to five sentences. Answers for most questions are fairly detailed, so no filtering by sentence length was applied to the answers.

2. Car repair conversations including 9300 Q/A pairs of car problem descriptions vs recommendation on how to rectify them.

For each of these sets, we form the positive one from actual Q/A pairs and the negative one from Q/$A_{similar-entities}$: E-$A_{similar-entities}$ has a strong overlap with E-A, although $A_{similar-entities}$ is not really the correct, comprehensive and exact answer. Hence, Q/A is reduced to a classification task measured via precision and recall of relating a Q/A pair into a class of correct pairs.

| | Source | | | | | |
|---|---|---|---|---|---|---|
| | Yahoo! Answers | | | Car Repair | | |
| Search method | | | | | | |
| | P | R | F1 | P | R | F1 |
| Baseline TF*IDF | 41.8 | 42.9 | 42.3 | 42.5 | 37.4 | 39.8 |
| \|E-Q ∩ E-A\| | 53.0 | 57.8 | 55.3 | 54.6 | 49.3 | 51.8 |
| \|EDT-Q ∩ EDT-A\| | 66.3 | 64.1 | 65.1 | 66.8 | 60.3 | 63.4 |

-continued

| | Source | | | | | |
|---|---|---|---|---|---|---|
| | Yahoo! Answers | | | Car Repair | | |
| | Search method | | | | | |
| | P | R | F1 | P | R | F1 |
| \|EDT-Q ∩ EDT-A + EDT-A$_{imgi}$\| | 76.3 | 78.1 | 77.2 | 72.1 | 72.0 | 72.0 |
| SVM TK for | 83.5 | 82.1 | 82.8 | 80.8 | 78.5 | 79.6 |

Evaluation of Q/A accuracy.

Top two rows in Table 1 show the baseline performance of Q/A and demonstrates that in a complicated domain transition from keyword to matched entities delivers more than 12% performance boost. The bottom three rows show the Q/A accuracy when discourse analysis is applied. Assuring a rule-based correspondence between DT-A and DT-Q gives 12% increase over the base line, and using imaginary DT—further 10%. Finally, proceeding from rule-based to machine learned Q/A correspondence (SVM TK) gives the performance gain of about 7%.

Supplementing Imaginary Discourse Trees with the Rhetoric Agreement Classifier

By using communicative discourse trees, rhetoric agreement application 112 can determine the complementarity between two sentences. For example, the rhetoric agreement application 112 can determine a level of complementarity between a discourse tree for a question and a discourse tree for an initial answer, between a discourse tree for a question and a discourse tree for an additional or candidate answer, or between a discourse tree of an answer and a discourse tree of an additional answer. In this manner, autonomous agent application 102 ensures that complex questions are addressed by complete answers that are in rhetorical agreement, or style.

In an example, rhetoric agreement application 112 constructs question communicative discourse tree from a question and answer communicative discourse tree from an initial answer. Rhetoric agreement application 112 determines for a question sentence, a question communicative discourse tree. The question discourse tree can include a root node. For example, referring back to FIGS. 13 and 15, an example question sentence is "are rebels responsible for the downing of the flight." Rhetoric classification application 102 can use process 1500 described with respect to FIG. 15. The example question has a root node of "elaborate."

Rhetoric agreement application 112 determines, for an answer sentence, a second communicative discourse tree. The answer communicative discourse tree can include root node. Continuing the above example, rhetoric agreement application creates communicative discourse tree, as depicted in FIG. 13, which also has a root node labeled "elaborate."

Rhetoric agreement application 112 associates the communicative discourse trees by identifying that the question root node and the answer root node are identical. Rhetoric agreement application 112 determines that the question communicative discourse tree and answer communicative discourse tree have an identical root node. The resulting associated communicative discourse tree is depicted in FIG. 17 and can be labeled as a "request-response pair."

Rhetoric agreement application 112 computes a level of complementarity between the question communicative discourse tree and the answer communicative discourse tree by applying a predictive model to the merged discourse tree.

Different machine learning techniques can be used. In an aspect, the rhetoric agreement application 112 trains and uses rhetoric agreement classifier 120. For example, rhetoric agreement application 112 can define positive and negative classes of request-response pairs. The positive class includes rhetorically correct request-response pairs and the negative class includes relevant, but rhetorically foreign, request-response pairs. For each request-response pair, the rhetoric agreement application 112 can build a CDT by parsing each sentence and obtaining verb signatures for the sentence fragments. Rhetoric agreement application 112 provides the associated communicative discourse tree pair to rhetoric agreement classifier 120, which in turn outputs a level of complementarity.

Rhetoric agreement application 112 determines that the level of complementarity is above a threshold and then identifies the question and answer sentences as complementary. Rhetoric agreement application 112 can use a threshold level of complementarity to determine whether the question-answer pair is sufficiently complementary. For example, if a classification score is greater than a threshold, then rhetoric agreement application 112 can use the answer. Alternatively, rhetoric agreement application 112 can discard the answer and access answer database 105 or a public database for another candidate answer and repeat as necessary.

In another aspect, rhetoric agreement application 112 applies thicket kernel learning to the representations. Thicket kernel learning can take place in place of classification-based learning described above. The rhetoric agreement application 112 builds a parse thicket pair for the parse tree of the request-response pair. The rhetoric agreement application 112 applies discourse parsing to obtain a discourse tree pair for the request-response pair. The rhetoric agreement application 112 aligns elementary discourse units of the discourse tree request-response and the parse tree request-response. The rhetoric agreement application 112 merges the elementary discourse units of the discourse tree request-response and the parse tree request-response.

Related Work

At any point in the discourse, some entities are considered more salient than others (occurring in nucleus parts of DTs), and consequently are expected to exhibit different properties. In Centering Theory (Grosz et al., 1995; Poesio et al., 2004), entity importance determines how they are realized in an utterance, including a pronominalized relation between them. In other discourse theories, entity importance can be defined via topicality (Prince 1978), and cognitive accessibility (Gundel et al. 1993).

Barzilay and Lapata (2008) automatically abstract a text into a set of entity transition sequences and records distributional, syntactic, and referential information about discourse entities. The authors formulated the coherence assessment as a learning task and show that their entity-based representation is well-suited for ranking-based generation and text classification tasks.

(Nguyen and Joty 2017) presented a local coherence model based on a convolutional neural network that operates over the distributed representation of entity transitions in the grid representation of a text. The local coherence model can model sufficiently long entity transitions, and can incorporate entity-specific features without losing generalization power. Kuyten et al 2015 developed a search engine that leverages the discourse structure in documents to overcome the limitations associated with the bag-of-words document representations in information retrieval. This system does not address the problem of rhetoric coordination between Q and A, but given a Q, this search engine can retrieve both relevant A and individual statements from A that describe some rhetorical relations to the query.

Answering questions in the domain of this study is a significantly more complex task than factoid QA such as Stanford QA database (Rajpurkar et al., 2016), where it is just necessary to involve one or two entities and their parameters. To answer a "how to solve a problem" question, one needs to maintain the logical flow connecting the entities in the questions. Since some entities from Q are inevitably omitted, these would need to be restored from some background knowledge text about these omitted entities and the ones presented in Q. Moreover, a logical flow needs to complement that of the Q.

Domain-specific ontologies such as the ones related to mechanical problems with cars are very hard and costly to build. In this work, a substitute via domain-independent discourse level analysis is proposed. More specifically, unaddressed parts of DT-A are addressed, for example by finding text fragments in a background knowledge corpus such as Wikipedia. Hence an ontology that would have to maintain relations between involved entities is not required.

The proposed imaginary DT feature of a Q/A system delivers a substantial increase of accuracy answering complex convergent questions. Whereas using for answer style matching DTs improves Q/A accuracy by more than 10% compared to the relevance-focused baseline, relying on imaginary DTs gives further 10% improvement.

Aspects described herein analyze the complementarity relation between DT-A and DT-Q, thereby substantially reducing the learning feature space, thereby making learning from an available dataset of a limited size, such as a list of car repairs, plausible.

Figure 18:
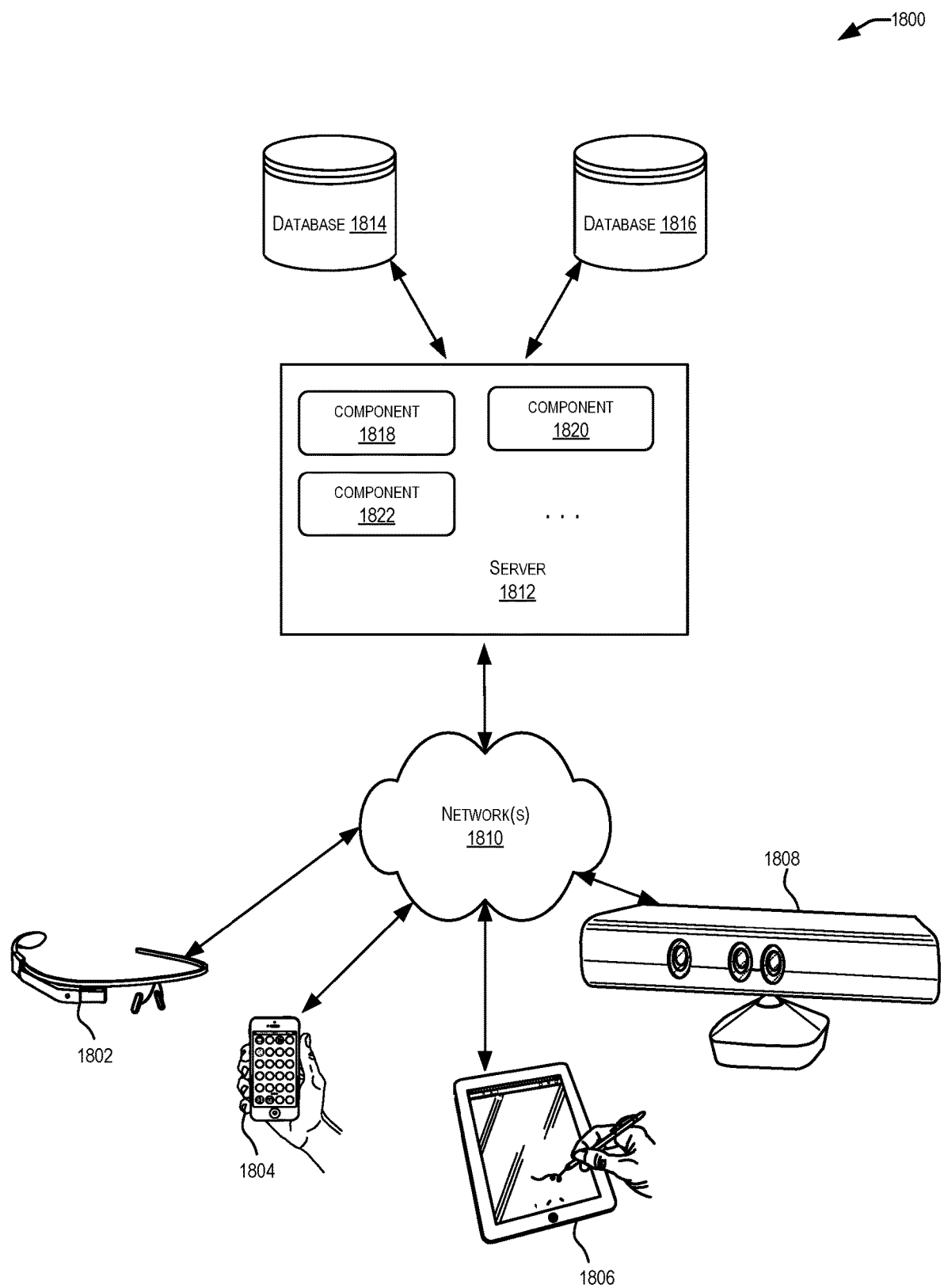
FIG. 18 depicts a simplified diagram of a distributed system for implementing one of the aspects.

FIG. 18 depicts a simplified diagram of a distributed system 1800 for implementing one of the aspects. In the illustrated aspect, distributed system 1800 includes one or more client computing devices 1802, 1804, 1806, and 1808, which are configured to execute and operate a client application such as a web browser, proprietary client (e.g., Oracle Forms), or the like over one or more network(s) 1810. Server 1812 may be communicatively coupled with remote client computing devices 1802, 1804, 1806, and 1808 via network 1810.

In various aspects, server 811 may be adapted to run one or more services or software applications provided by one or more of the components of the system. The services or software applications can include nonvirtual and virtual environments. Virtual environments can include those used for virtual events, tradeshows, simulators, classrooms, shopping exchanges, and enterprises, whether two- or three-dimensional (3D) representations, page-based logical environments, or otherwise. In some aspects, these services may be offered as web-based or cloud services or under a Software as a Service (SaaS) model to the users of client computing devices 1802, 1804, 1806, and/or 1808. Users operating client computing devices 1802, 1804, 1806, and/or 1808 may in turn utilize one or more client applications to interact with server 1812 to utilize the services provided by these components.

In the configuration depicted in the figure, the software components 1818, 1820 and 1822 of distributed system 1800 are shown as being implemented on server 1812. In other aspects, one or more of the components of distributed system 1800 and/or the services provided by these components may also be implemented by one or more of the client computing devices 1802, 1804, 1806, and/or 1808. Users operating the client computing devices may then utilize one or more client applications to use the services provided by these components. These components may be implemented in hardware, firmware, software, or combinations thereof. It should be appreciated that various different system configurations are possible, which may be different from distributed system 1800. The aspect shown in the figure is thus one example of a distributed system for implementing an aspect system and is not intended to be limiting.

Client computing devices 1802, 1804, 1806, and/or 1808 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 18, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1802, 1804, 1806, and 1808 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1810.

Although exemplary distributed system 1800 is shown with four client computing devices, any number of client computing devices may be supported. Other devices, such as devices with sensors, etc., may interact with server 1812.

Network(s) 1810 in distributed system 1800 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1810 can be a local area network (LAN), such as one based on Ethernet, Token-Ring and/or the like. Network(s) 1810 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.18 suite of protocols, Bluetooth®, and/or any other wireless protocol); and/or any combination of these and/or other networks.

Server 1812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1812 can include one or more virtual machines running virtual operating systems, or other computing architectures involving virtualization. One or more flexible pools of logical storage devices can be virtualized to maintain virtual storage devices for the server. Virtual networks can be controlled by server 1812 using software defined networking. In various aspects, server 1812 may be adapted to run one or more services or software applications described in the foregoing disclosure. For example, server 1812 may correspond to a server for performing processing described above according to an aspect of the present disclosure.

Server 1812 may run an operating system including any of those discussed above, as well as any commercially available server operating system. Server 1812 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1812 may include one or more applications to analyze and consolidate data feeds and/or event updates received from users of client computing devices 802, 804, 806, and 808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1812 may also include one or more applications to display the data feeds and/or real-time events via one or more display devices of client computing devices 1802, 1804, 1806, and 1808.

Distributed system 1800 may also include one or more databases 1814 and 1816. Databases 1814 and 1816 may reside in a variety of locations. By way of example, one or more of databases 1814 and 1816 may reside on a non-transitory storage medium local to (and/or resident in) server 1812. Alternatively, databases 1814 and 1816 may be remote from server 1812 and in communication with server 1812 via a network-based or dedicated connection. In one set of aspects, databases 1814 and 1816 may reside in a storage-area network (SAN). Similarly, any necessary files for performing the functions attributed to server 1812 may be stored locally on server 1812 and/or remotely, as appropriate. In one set of aspects, databases 1814 and 1816 may include relational databases, such as databases provided by Oracle, that are adapted to store, update, and retrieve data in response to SQL-formatted commands.

Figure 19:
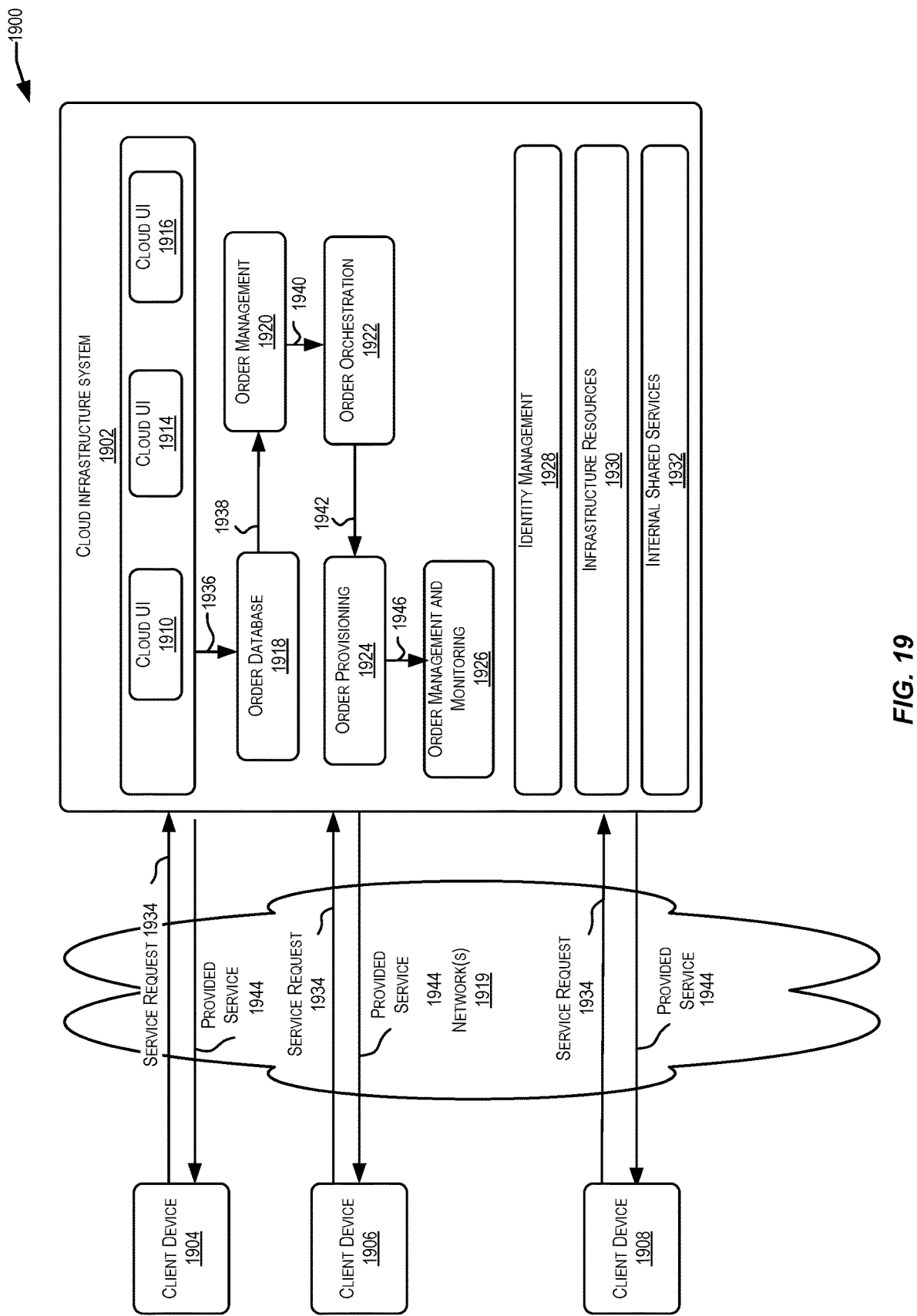
FIG. 19 is a simplified block diagram of components of a system environment by which services provided by the components of an aspect system may be offered as cloud services in accordance with an aspect.

FIG. 19 is a simplified block diagram of one or more components of a system environment 1900 by which services provided by one or more components of an aspect system may be offered as cloud services, in accordance with an aspect of the present disclosure. In the illustrated aspect, system environment 1900 includes one or more client computing devices 1904, 1906, and 1908 that may be used by users to interact with a cloud infrastructure system 1902 that provides cloud services. The client computing devices may be configured to operate a client application such as a web browser, a proprietary client application (e.g., Oracle Forms), or some other application, which may be used by a user of the client computing device to interact with cloud infrastructure system 1902 to use services provided by cloud infrastructure system 1902.

It should be appreciated that cloud infrastructure system 1902 depicted in the figure may have other components than those depicted. Further, the aspect shown in the figure is only one example of a cloud infrastructure system that may incorporate an aspect of the invention. In some other aspects, cloud infrastructure system 1902 may have more or fewer components than shown in the figure, may combine two or more components, or may have a different configuration or arrangement of components.

Client computing devices 1904, 1906, and 1908 may be devices similar to those described above for 1002, 1004, 1006, and 1008.

Although exemplary system environment 1900 is shown with three client computing devices, any number of client computing devices may be supported. Other devices such as devices with sensors, etc. may interact with cloud infrastructure system 1902.

Network(s) 1910 may facilitate communications and exchange of data between client computing devices 1904, 1906, and 1908 and cloud infrastructure system 1902. Each network may be any type of network familiar to those skilled in the art that can support data communications using any of a variety of commercially-available protocols, including those described above for network(s) 1810.

Cloud infrastructure system 1002 may comprise one or more computers and/or servers that may include those described above for server 1812.

In certain aspects, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain aspects, cloud infrastructure system 1902 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Large volumes of data, sometimes referred to as big data, can be hosted and/or manipulated by the infrastructure system on many levels and at different scales. Such data can include data sets that are so large and complex that it can be difficult to process using typical database management tools or traditional data processing applications. For example, terabytes of data may be difficult to store, retrieve, and process using personal computers or their rack-based counterparts. Such sizes of data can be difficult to work with using most current relational database management systems and desktop statistics and visualization packages. They can require massively parallel processing software running thousands of server computers, beyond the structure of commonly used software tools, to capture, curate, manage, and process the data within a tolerable elapsed time.

Extremely large data sets can be stored and manipulated by analysts and researchers to visualize large amounts of data, detect trends, and/or otherwise interact with the data. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an aspect to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various aspects, cloud infrastructure system 1002 may be adapted to automatically provision, manage and track a customer's subscription to services offered by cloud infrastructure system 1902. Cloud infrastructure system 1002 may provide the cloud services via different deployment models. For example, services may be provided under a public cloud model in which cloud infrastructure system 1002 is owned by an organization selling cloud services (e.g., owned by Oracle) and the services are made available to the general public or different industry enterprises. As another example, services may be provided under a private cloud model in which cloud infrastructure system 1002 is operated solely for a single organization and may provide services for one or more entities within the organization. The cloud services may also be provided under a community cloud model in which cloud infrastructure system 1002 and the services provided by cloud infrastructure system 1002 are shared by several organizations in a related community. The cloud services may also be provided under a hybrid cloud model, which is a combination of two or more different models.

In some aspects, the services provided by cloud infrastructure system 1002 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1902. Cloud infrastructure system 1002 then performs processing to provide the services in the customer's subscription order.

In some aspects, the services provided by cloud infrastructure system 1002 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some aspects, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some aspects, platform services provided by the cloud infrastructure system may include database cloud services, middleware cloud services (e.g., Oracle Fusion Middleware services), and Java cloud services. In one aspect, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain aspects, cloud infrastructure system 1002 may also include infrastructure resources 1930 for providing the resources used to provide various services to customers of the cloud infrastructure system. In one aspect, infrastructure resources 1930 may include pre-integrated and optimized combinations of hardware, such as servers, storage, and networking resources to execute the services provided by the PaaS platform and the SaaS platform.

In some aspects, resources in cloud infrastructure system 1002 may be shared by multiple users and dynamically re-allocated per demand. Additionally, resources may be allocated to users in different time zones. For example, cloud infrastructure system 1002 may enable a first set of users in a first time zone to utilize resources of the cloud infrastructure system for a specified number of hours and then enable the re-allocation of the same resources to another set of users located in a different time zone, thereby maximizing the utilization of resources.

In certain aspects, a number of internal shared services 1932 may be provided that are shared by different components or modules of cloud infrastructure system 1902 and by the services provided by cloud infrastructure system 1902. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain aspects, cloud infrastructure system 1902 may provide comprehensive management of cloud services (e.g., SaaS, PaaS, and IaaS services) in the cloud infrastructure system. In one aspect, cloud management functionality may include capabilities for provisioning, managing and tracking a customer's subscription received by cloud infrastructure system 1902, and the like.

In one aspect, as depicted in the figure, cloud management functionality may be provided by one or more modules, such as an order management module 1920, an order orchestration module 1922, an order provisioning module 1924, an order management and monitoring module 1926, and an identity management module 1928. These modules may include or be provided using one or more computers and/or servers, which may be general purpose computers, specialized server computers, server farms, server clusters, or any other appropriate arrangement and/or combination.

In exemplary operation 1934, a customer using a client computing device, such as client computing device 1904, 1906 or 1908, may interact with cloud infrastructure system 1902 by requesting one or more services provided by cloud infrastructure system 1902 and placing an order for a subscription for one or more services offered by cloud infrastructure system 1902. In certain aspects, the customer may access a cloud User Interface (UI), cloud UI 1919, cloud UI 1914 and/or cloud UI 1916 and place a subscription order via these UIs. The order information received by cloud infrastructure system 1902 in response to the customer placing an order may include information identifying the customer and one or more services offered by the cloud infrastructure system 1902 that the customer intends to subscribe to.

After an order has been placed by the customer, the order information is received via the cloud UIs, 1010, 1014 and/or 1014.

At operation 1936, the order is stored in order database 1918. Order database 1918 can be one of several databases operated by cloud infrastructure system 1902 and operated in conjunction with other system elements.

At operation 1938, the order information is forwarded to an order management module 1920. In some instances, order management module 1920 may be configured to perform billing and accounting functions related to the order, such as verifying the order, and upon verification, booking the order.

At operation 1940, information regarding the order is communicated to an order orchestration module 1922. Order orchestration module 1922 may utilize the order information to orchestrate the provisioning of services and resources for the order placed by the customer. In some instances, order orchestration module 1922 may orchestrate the provisioning of resources to support the subscribed services using the services of order provisioning module 1924.

In certain aspects, order orchestration module 1922 enables the management of business processes associated with each order and applies business logic to determine whether an order should proceed to provisioning. At operation 1942, upon receiving an order for a new subscription, order orchestration module 1922 sends a request to order provisioning module 1924 to allocate resources and configure those resources needed to fulfill the subscription order. Order provisioning module 1924 enables the allocation of resources for the services ordered by the customer. Order provisioning module 1924 provides a level of abstraction between the cloud services provided by cloud infrastructure system 1902 and the physical implementation layer that is used to provision the resources for providing the requested services. Order orchestration module 1922 may thus be isolated from implementation details, such as whether or not services and resources are actually provisioned on the fly or pre-provisioned and only allocated/assigned upon request.

At operation 1944, once the services and resources are provisioned, a notification of the provided service may be sent to customers on client computing devices 1904, 1906 and/or 1908 by order provisioning module 1924 of cloud infrastructure system 1902.

At operation 1946, the customer's subscription order may be managed and tracked by an order management and monitoring module 1926. In some instances, order management and monitoring module 1926 may be configured to collect usage statistics for the services in the subscription order, such as the amount of storage used, the amount data transferred, the number of users, and the amount of system up time and system down time.

In certain aspects, cloud infrastructure system 1902 may include an identity management module 1928. Identity management module 1928 may be configured to provide identity services, such as access management and authorization services in cloud infrastructure system 1902. In some aspects, identity management module 1928 may control information about customers who wish to utilize the services provided by cloud infrastructure system 1902. Such information can include information that authenticates the identities of such customers and information that describes which actions those customers are authorized to perform relative to various system resources (e.g., files, directories, applications, communication ports, memory segments, etc.). Identity management module 1928 may also include the management of descriptive information about each customer and about how and by whom that descriptive information can be accessed and modified.

Figure 20:
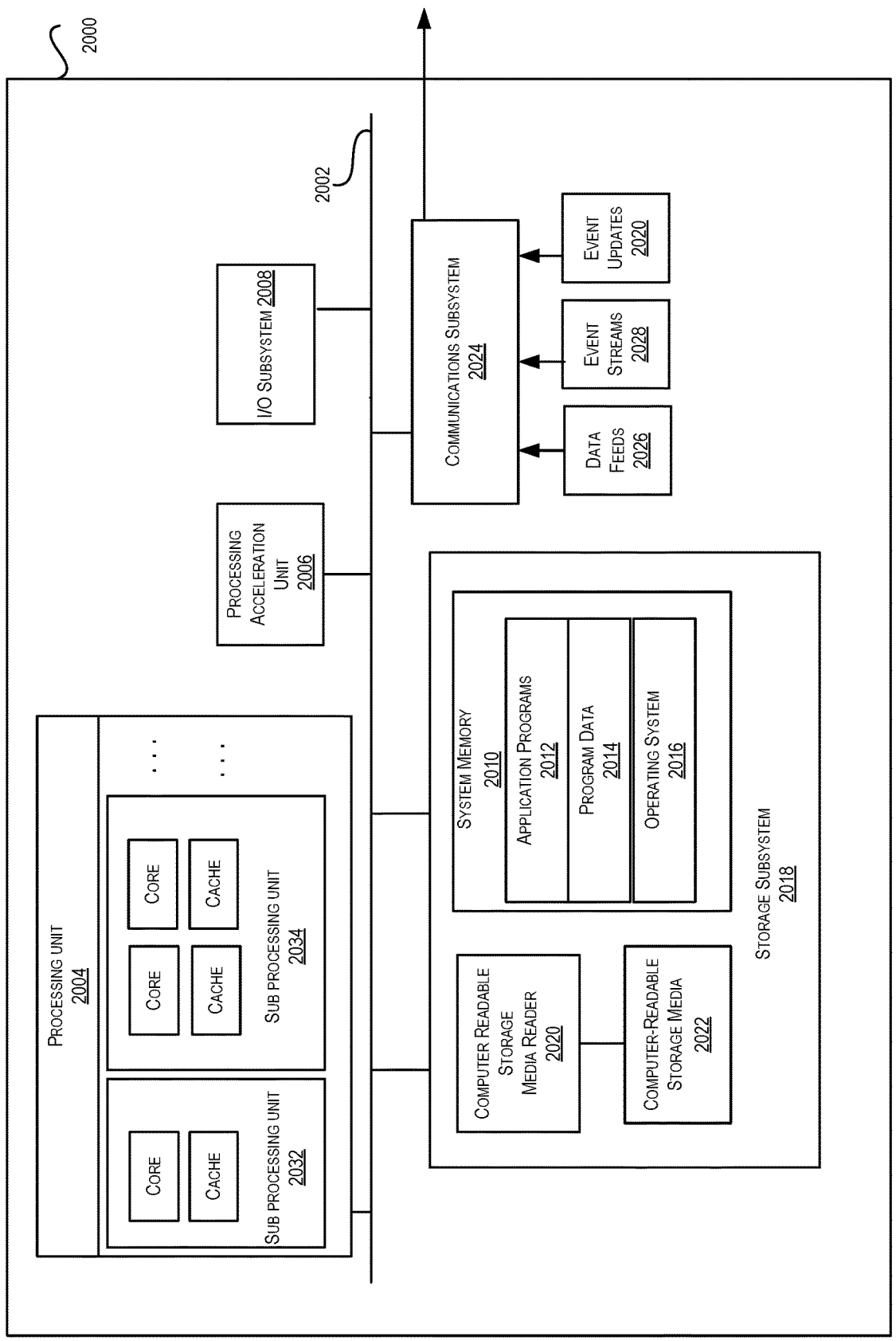
FIG. 20 illustrates an exemplary computer system, in which various aspects of the present invention may be implemented.

FIG. 20 illustrates an exemplary computer system 2000, in which various aspects of the present invention may be implemented. The computer system 2000 may be used to implement any of the computer systems described above. As shown in the figure, computer system 2000 includes a processing unit 2004 that communicates with a number of peripheral subsystems via a bus subsystem 2002. These peripheral subsystems may include a processing acceleration unit 2006, an I/O subsystem 2008, a storage subsystem 2018 and a communications subsystem 2024. Storage subsystem 2018 includes computer-readable storage media 2022 and a system memory 2010.

Bus subsystem 2002 provides a mechanism for letting the various components and subsystems of computer system 2000 communicate with each other as intended. Although bus subsystem 2002 is shown schematically as a single bus, alternative aspects of the bus subsystem may utilize multiple buses. Bus subsystem 2002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA)

bus, Video Electronics Standards Association (VESA) local bus, and Peripheral Component Interconnect (PCI) bus, which can be implemented as a Mezzanine bus manufactured to the IEEE P2086.1 standard.

Processing unit 2004, which can be implemented as one or more integrated circuits (e.g., a conventional microprocessor or microcontroller), controls the operation of computer system 2000. One or more processors may be included in processing unit 2004. These processors may include single core or multicore processors. In certain aspects, processing unit 2004 may be implemented as one or more independent processing units 2032 and/or 2034 with single or multicore processors included in each processing unit. In other aspects, processing unit 2004 may also be implemented as a quad-core processing unit formed by integrating two dual-core processors into a single chip.

In various aspects, processing unit 2004 can execute a variety of programs in response to program code and can maintain multiple concurrently executing programs or processes. At any given time, some or all of the program code to be executed can be resident in processing unit(s) 2004 and/or in storage subsystem 2018. Through suitable programming, processing unit(s) 2004 can provide various functionalities described above. Computer system 2000 may additionally include a processing acceleration unit 2006, which can include a digital signal processor (DSP), a special-purpose processor, and/or the like.

I/O subsystem 2008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 2000 may comprise a storage subsystem 2018 that comprises software elements, shown as being currently located within a system memory 2010. System memory 2010 may store program instructions that are loadable and executable on processing unit 2004, as well as data generated during the execution of these programs.

Depending on the configuration and type of computer system 2000, system memory 2010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 2004. In some implementations, system memory 2010 may include multiple different types of memory, such as static random access memory (SRAM) or dynamic random access memory (DRAM). In some implementations, a basic input/output system (BIOS), containing the basic routines that help to transfer information between elements within computer system 2000, such as during start-up, may typically be stored in the ROM. By way of example, and not limitation, system memory 2010 also illustrates application programs 2012, which may include client applications, Web browsers, mid-tier applications, relational database management systems (RDBMS), etc., program data 2014, and an operating system 2016. By way of example, operating system 2016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 2018 may also provide a tangible computer-readable storage medium for storing the basic programming and data constructs that provide the functionality of some aspects. Software (programs, code modules, instructions) that when executed by a processor provide the functionality described above may be stored in storage subsystem 2018. These software modules or instructions may be executed by processing unit 2004. Storage subsystem 2018 may also provide a repository for storing data used in accordance with the present invention.

Storage subsystem 2018 may also include a computer-readable storage media reader 2020 that can further be connected to computer-readable storage media 2022. Together and, optionally, in combination with system memory 2010, computer-readable storage media 2022 may comprehensively represent remote, local, fixed, and/or removable storage devices plus storage media for temporarily and/or more permanently containing, storing, transmitting, and retrieving computer-readable information.

Computer-readable storage media 2022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computer system 2000.

By way of example, computer-readable storage media 2022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 2022 may include, but is not limited to, Zip® drives, flash memory cards, universal serial bus (USB) flash drives, secure digital (SD) cards, DVD disks, digital video tape, and the like. Computer-readable storage media 2022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 2000.

Communications subsystem 2024 provides an interface to other computer systems and networks. Communications subsystem 2024 serves as an interface for receiving data from and transmitting data to other systems from computer system 2000. For example, communications subsystem 2024 may enable computer system 2000 to connect to one or more devices via the Internet. In some aspects, communications subsystem 2024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.10 family standards, or other mobile communication technologies, or any combination thereof), global positioning system (GPS) receiver components, and/or other components. In some aspects, communications subsystem 2024 can provide wired network connectivity (e.g., Ethernet) in addition to or instead of a wireless interface.

In some aspects, communications subsystem 2024 may also receive input communication in the form of structured and/or unstructured data feeds 2026, event streams 2028, event updates 2030, and the like on behalf of one or more users who may use computer system 2000.

By way of example, communications subsystem 2024 may be configured to receive unstructured data feeds 2026 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 2024 may also be configured to receive data in the form of continuous data streams, which may include event streams 2028 of real-time events and/or event updates 2030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 2024 may also be configured to output the structured and/or unstructured data feeds 2026, event streams 2028, event updates 2030, and the like to one or more databases that may be in communication with one or more streaming data source computers coupled to computer system 2000.

Computer system 2000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 2000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various aspects.

In the foregoing specification, aspects of the invention are described with reference to specific aspects thereof, but those skilled in the art will recognize that the invention is not limited thereto. Various features and aspects of the above-described invention may be used individually or jointly. Further, aspects can be utilized in any number of environments and applications beyond those described herein without departing from the broader spirit and scope of the specification. The specification and drawings are, accordingly, to be regarded as illustrative rather than restrictive.

What is claimed is:

1. A method comprising:
   constructing, using a computing device and from a question, a question discourse tree comprising a question entity, wherein the question discourse tree represents rhetorical relationships between elementary discourse units of the question;
   accessing, using the computing device and from a corpus of text, an initial answer;
   constructing, using the computing device, from the initial answer, an answer discourse tree comprising an answer entity, wherein the answer discourse tree represents rhetorical relationships between elementary discourse units of the initial answer;
   determining, using the computing device, that a score indicating a relevance of the answer entity to the question entity is below a threshold;
   generating an imaginary discourse tree by:
   creating, from the corpus of text, an additional discourse tree;

determining that the additional discourse tree comprises a rhetorical relation that connects the question entity with the answer entity;
extracting a sub-tree of the additional discourse tree comprising the question entity, the answer entity, and the rhetorical relation, thereby generating an imaginary discourse tree; and
outputting an answer represented by a combination of the answer discourse tree and the imaginary discourse tree.

2. The method of claim 1, wherein accessing the initial answer comprises:
determining an answer relevance score for a portion of text; and
responsive to determining that the answer relevance score is greater than a threshold, selecting the portion of text as the initial answer.

3. The method of claim 1, wherein the imaginary discourse tree comprises a node representing the rhetorical relation, the method further comprising integrating the imaginary discourse tree into the answer discourse tree by connecting the node to the answer entity.

4. The method of claim 1, wherein creating the additional discourse tree comprises:
calculating, for each of a plurality of additional discourse trees, a score that indicates a number of question entities that comprise a mapping to one or more answer entities in the respective additional discourse tree; and
selecting, from the plurality of additional discourse trees, an additional discourse tree with a highest score.

5. The method of claim 1, wherein creating the additional discourse tree comprises:
calculating, for each of a plurality of additional discourse trees, a score by applying a trained classification model to one or more of (a) the question discourse tree and (b) the respective additional answer discourse tree; and
selecting, from the plurality of additional discourse trees, an additional discourse tree with a highest score.

6. The method of claim 1, wherein the question comprises a plurality of keywords, and wherein accessing the initial answer comprises:
obtaining a plurality of answers based on a search query comprising the keywords by performing a search of a plurality of electronic documents;
determining, for each of the plurality of answers, an answer score indicating a level of match between the question and the respective answer; and
selecting, from the plurality of answers, an answer having a highest score as the initial answer.

7. The method of claim 1, wherein calculating the score comprises:
applying a trained classification model to one or more of (a) the question discourse tree and (b) the answer discourse tree; and
receiving the score from the classification model.

8. The method of claim 1, wherein constructing a discourse tree comprises:
accessing a sentence comprising a plurality of fragments, wherein at least one fragment comprises a verb and a plurality of words, each word comprising a role of the words within the fragment, wherein each fragment is an elementary discourse unit; and
generating a discourse tree that represents rhetorical relationships between the plurality of fragments, wherein the discourse tree comprises a plurality of nodes, each nonterminal node representing a rhetorical relationship between two of the plurality of fragments, each terminal node of the nodes of the discourse tree is associated with one of the plurality of fragments.

9. The method of claim 1, further comprising:
determining, from the question discourse tree, a question communicative discourse tree comprising a question root node, wherein a communicative discourse tree is a discourse tree that includes communicative actions, and wherein the generating further comprises:
determining, from the an imaginary discourse tree, an answer communicative discourse tree, wherein the answer communicative discourse tree comprises an answer root node;
merging the communicative discourse trees by identifying that the question root node and the answer root node are identical;
computing a level of complementarity between the question communicative discourse tree and the answer communicative discourse tree by applying a predictive model to the merged communicative discourse tree; and
responsive to determining that the level of complementarity is above a threshold, outputting a final answer corresponding to the imaginary discourse tree.

10. The method of claim 1, wherein a discourse tree represents rhetorical relationships between a plurality of fragments of text, wherein the discourse tree comprises a plurality of nodes, each nonterminal node representing a rhetorical relationship between two of the plurality of fragments, each terminal node of the nodes of the discourse tree is associated with one of the plurality of fragments; and wherein constructing a communicative discourse tree comprises:
matching each fragment that has a verb to a verb signature by:
accessing a plurality of verb signatures, wherein each verb signature comprises the verb of the fragment and a sequence of thematic roles, wherein thematic roles describe the relationship between the verb and related words;
determining, for each verb signature of the plurality of verb signatures, a plurality of thematic roles of the respective signature that match a role of a word in the fragment;
selecting a particular verb signature from the plurality of verb signatures based on the particular verb signature comprising a highest number of matches; and
associating the particular verb signature with the fragment.

11. A computer-implemented method comprising:
constructing, for a question, a question discourse tree comprising a plurality of question entities;
constructing, from an initial answer, an answer discourse tree comprising a plurality of answer entities;
establishing, between a first question entity of the plurality of question entities and an answer entity of the plurality of answer entities, a mapping that establishes a relevance of the answer entity to the first question entity;
responsive to determining that a second question entity of the plurality of question entities is not addressed by any of the plurality of answer entities, generating an imaginary discourse tree by combining an additional discourse tree corresponding to an additional answer with the answer discourse tree;
determining, from the question discourse tree, a question communicative discourse tree;

determining, from the an imaginary discourse tree, an answer communicative discourse tree;

computing a level of complementarity between the question communicative discourse tree and the answer communicative discourse tree by applying a predictive model to the question communicative discourse tree and the answer communicative discourse tree; and responsive to determining that the level of complementarity is above a threshold, outputting a final answer corresponding to the imaginary discourse tree.

12. A system comprising:

a non-transitory computer-readable medium storing computer-executable program instructions; and a processing device communicatively coupled to the non-transitory computer-readable medium for executing the computer-executable program instructions, wherein executing the computer-executable program instructions configures the processing device to perform operations comprising:

constructing, using a computing device and from a question, a question discourse tree comprising a question entity, wherein the question discourse tree represents rhetorical relationships between elementary discourse units of the question;

accessing, using the computing device and from a corpus of text, an initial answer;

constructing, using the computing device, from the initial answer, an answer discourse tree comprising an answer entity, wherein the answer discourse tree represents rhetorical relationships between elementary discourse units of the initial answer;

determining, using the computing device, that a score indicating a relevance of the answer entity to the question entity is below a threshold;

generating an imaginary discourse tree by:

creating, from the corpus of text, an additional discourse tree;

determining that the additional discourse tree comprises a rhetorical relation that connects the question entity with the answer entity;

extracting a sub-tree of the additional discourse tree comprising the question entity, the answer entity, and the rhetorical relation, thereby generating an imaginary discourse tree; and outputting an answer represented by a combination of the answer discourse tree and the imaginary discourse tree.

13. The system of claim 12, wherein accessing the initial answer comprises:

determining an answer relevance score for a portion of text; and responsive to determining that the answer relevance score is greater than a threshold, selecting the portion of text as the initial answer.

14. The system of claim 12, wherein the imaginary discourse tree comprises a node representing the rhetorical relation, the operations further comprising integrating the imaginary discourse tree into the answer discourse tree by connecting the node to the answer entity.

15. The system of claim 12, wherein creating the additional discourse tree comprises:

calculating, for each of a plurality of additional discourse trees, a score that indicates a number of question entities that comprise a mapping to one or more answer entities in the respective additional discourse tree; and selecting, from the plurality of additional discourse trees, an additional discourse tree with a highest score.

16. The system of claim 12, wherein creating the additional discourse tree comprises:

calculating, for each of a plurality of additional discourse trees, a score by applying a trained classification model to one or more of (a) the question discourse tree and (b) the respective additional answer discourse tree; and selecting, from the plurality of additional discourse trees, an additional discourse tree with a highest score.

17. The system of claim 12, wherein the question comprises a plurality of keywords, and wherein accessing the initial answer comprises:

obtaining a plurality of answers based on a search query comprising the keywords by performing a search of a plurality of electronic documents;

determining, for each of the plurality of answers, an answer score indicating a level of match between the question and the respective answer; and selecting, from the plurality of answers, an answer having a highest score as the initial answer.

18. The system of claim 12, wherein calculating the score comprises:

applying a trained classification model to one or more of (a) the question discourse tree and (b) the answer discourse tree; and receiving the score from the classification model.

19. The system of claim 12, wherein constructing a discourse tree comprises:

accessing a sentence comprising a plurality of fragments, wherein at least one fragment comprises a verb and a plurality of words, each word comprising a role of the words within the fragment, wherein each fragment is an elementary discourse unit; and generating a discourse tree that represents rhetorical relationships between the plurality of fragments, wherein the discourse tree comprises a plurality of nodes, each nonterminal node representing a rhetorical relationship between two of the plurality of fragments, each terminal node of the nodes of the discourse tree is associated with one of the plurality of fragments.

20. The system of claim 12, wherein executing computer-executable program instructions configures the processing device to perform operations comprising:

determining, from the question discourse tree, a question communicative discourse tree comprising a question root node, wherein a communicative discourse tree is a discourse tree that includes communicative actions, and wherein the generating further comprises:

determining, from the an imaginary discourse tree, an answer communicative discourse tree, wherein the answer communicative discourse tree comprises an answer root node;

merging the communicative discourse trees by identifying that the question root node and the answer root node are identical;

computing a level of complementarity between the question communicative discourse tree and the answer communicative discourse tree by applying a predictive model to the merged communicative discourse tree; and responsive to determining that the level of complementarity is above a threshold, outputting a final answer corresponding to the imaginary discourse tree.

* * * * *

UNITED STATES PATENT AND TRADEMARK OFFICE
CERTIFICATE OF CORRECTION

| | |
|---|---|
| PATENT NO. | : 11,328,016 B2 |
| APPLICATION NO. | : 16/408224 |
| DATED | : May 10, 2022 |
| INVENTOR(S) | : Boris Galitsky |

It is certified that error appears in the above-identified patent and that said Letters Patent is hereby corrected as shown below:

On the Title Page

On page 3, item (56), Column 2, Line 52, delete "Contraints" and insert --Constraints--.

On page 5, item (56), Column 1, Lines 55-56, delete "Summaization," and insert --Summarization,--.

In the Specification

In Column 3, Line 3, delete "the an" and insert --the--.

In Column 3, Line 53, delete "the an" and insert --the--.

In Column 5, Line 48, delete "the a" and insert --a--.

In Column 8, Line 25, delete "nuclearality" and insert --nuclearity--.

In Column 22, Line 16, delete "a an" and insert --an--.

In Column 27, Line 55, delete "PUMP."" and insert --PUMP,"--.

In Column 28, Line 65, delete "PUMP."" and insert --PUMP,"--.

In Column 29, Line 53, delete "$\Sigma_i l_i$" and insert -- $\Sigma_i l_i(n_1)$ --.

In Column 29, Line 54, delete "$n_1 E$" and insert --$n_1 \in$--.

In Column 29, Line 54, delete "$n_2 E$" and insert --$n_2 \in$--.

Signed and Sealed this
Thirtieth Day of May, 2023

*Katherine Kelly Vidal*
Katherine Kelly Vidal
*Director of the United States Patent and Trademark Office*

CERTIFICATE OF CORRECTION (continued)
U.S. Pat. No. 11,328,016 B2

In the Claims

In Claim 1, Line 3, delete "entity;" and insert --entity; and--.

In Claim 7, Line 55, delete "the" and insert --the trained--.

In Claim 9, Line 9, delete "the an" and insert --the--.

In Claim 10, Line 29-30, delete "fragments," and insert --fragments of text,--.

In Claim 10, Line 31, delete "fragments;" and insert --fragments of text,--.

In Claim 10, Line 39, delete "the" and insert --a--.

In Claim 11, Line 1, delete "the an" and insert --the--.

In Claim 12, Line 40, delete "entity;" and insert --entity; and--.

In Claim 18, Line 27, delete "the" and insert --the trained--.

In Claim 20, Line 50, delete "the an" and insert --the--.